(12) United States Patent
Imaoka et al.

(10) Patent No.: US 8,537,249 B2
(45) Date of Patent: *Sep. 17, 2013

(54) ZOOM LENS SYSTEM, INTERCHANGEABLE LENS APPARATUS AND CAMERA SYSTEM

(75) Inventors: Takuya Imaoka, Kanagawa (JP); Kyoichi Miyazaki, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 49 days.

This patent is subject to a terminal disclaimer.

(21) Appl. No.: 13/215,256

(22) Filed: Aug. 23, 2011

(65) Prior Publication Data

US 2012/0050603 A1    Mar. 1, 2012

(30) Foreign Application Priority Data

Aug. 24, 2010   (JP) ................................. 2010-187333

(51) Int. Cl.
| | |
|---|---|
| H04N 5/262 | (2006.01) |
| H04N 5/228 | (2006.01) |
| G02B 27/64 | (2006.01) |
| G02B 15/14 | (2006.01) |

(52) U.S. Cl.
USPC ................... 348/240.3; 348/208.11; 359/557; 359/684

(58) Field of Classification Search
USPC ............ 348/208.99, 240.3, 335, 340, 208.11; 359/676, 683, 684, 557
See application file for complete search history.

(56) References Cited

U.S. PATENT DOCUMENTS

2012/0050602 A1*   3/2012   Imaoka et al. ................ 348/347

FOREIGN PATENT DOCUMENTS

| JP | H04-158325 A | 6/1992 |
|---|---|---|
| JP | H10-111455 | 4/1998 |
| JP | 2007-279077 | 10/2007 |
| JP | 2008-203453 A | 9/2008 |
| JP | 2009-163066 A | 7/2009 |
| JP | 2009-186983 A | 8/2009 |

\* cited by examiner

*Primary Examiner* — David N Spector
(74) *Attorney, Agent, or Firm* — Judge Patent Associates

(57) ABSTRACT

A zoom lens system of lens units, the system including, in object-side-to-image-side order: a first lens unit having positive optical power; a second lens unit; an aperture diaphragm; one or more additional lens units, with a first of the additional lens units being a first focusing-lens unit having negative optical power and moving along the optical axis in the zoom lens system focusing; an image blur compensating lens unit, adjacent the first focusing-lens unit and movable in a direction perpendicular to the optical axis in order to optically compensate image blur; with the lens system satisfying: $0.1 < (T_1+T_2)/H < 2.0$ ($T_1$ being the axial thickness of the first lens unit, $T_2$ being the axial thickness of the second lens unit, and H being the height of an image the zoom lens system forms on an image surface on the image-side end of the zoom lens system).

14 Claims, 57 Drawing Sheets

1

ZOOM LENS SYSTEM, INTERCHANGEABLE LENS APPARATUS AND CAMERA SYSTEM

CROSS-REFERENCE TO RELATED APPLICATION

This application is based on application No. 2010-187333 filed in Japan on Aug. 24, 2010, the contents of which are hereby incorporated by reference.

BACKGROUND OF THE INVENTION

1. Field of the Invention

The present invention relates to a zoom lens system, an interchangeable lens apparatus, and a camera system. In particular, the present invention relates to: a compact and lightweight zoom lens system having a relatively high zooming ratio, less fluctuation in aberrations associated with focusing, excellent optical performance over the entire focusing function, with sufficiently compensated aberrations particularly in close-object in-focus situations, and excellent blur compensation; and an interchangeable lens apparatus and a camera system each employing the zoom lens system.

2. Description of the Background Art

In recent years, interchangeable-lens type digital camera systems (also referred to simply as "camera systems", hereinafter) have been spreading rapidly. Such interchangeable-lens type digital camera systems can realize: high-quality pictures taken with high-sensitivity; high-speed focusing, and high-speed image processing after a picture is taken; and easy exchange of interchangeable lenses in accordance with the scene to be shot. Furthermore, interchangeable lens apparatuses having a zoom lens system that forms an optical image with variable magnification are popular because they make it possible to vary the focal length freely without the necessity of interchanging lenses.

A compact zoom lens system having a high zooming ratio and excellent optical performance from a wide-angle limit to a telephoto limit has been desired as a zoom lens system to be used in an interchangeable lens apparatus. Various kinds of zoom lens systems having multiple-unit configurations, such as four-unit and five-unit configurations, have been proposed. In such zoom lens systems, focusing can be performed such that some lens units in the lens system are moved in a direction along the optical axis.

For example, Japanese Patent No. 3054185 discloses a zoom lens having a six-unit configuration in which the optical power of the lens units is positive, negative, positive, negative, positive, and positive. With this zoom lens, in zooming from a wide-angle limit to a middle position, magnification is varied using the fourth lens unit with the second lens unit being fixed on the object side, and the sixth lens unit is moved to perform focusing.

Japanese Laid-Open Patent Publication No. 10-111455 discloses a zoom lens having a five-unit configuration in which the optical power of the lens units is positive, negative, positive, negative, and positive. With this zoom lens, the focal length at the wide-angle limit is shorter than the diagonal length of the display. In zooming from a wide-angle limit to a telephoto limit, at least the fifth lens unit is moved to the object side to vary the intervals between the respective lens units. The second lens unit, or a whole or part of a vibration-proof lens unit for optically compensating image blur, is moved along the optical axis to perform focusing.

Japanese Laid-Open Patent Publication No. 2007-279077 discloses a variable magnification optical system having at least four-unit configuration in which the optical power of the lens units is negative, positive, negative, and positive. With this system, in zooming from a wide-angle limit to a telephoto limit, at least the second lens unit and the fourth lens unit are moved to decrease the interval between the first and second lens units, increase the interval between the second and third lens units, and decrease the interval between the third and fourth lens units. In the case of adopting, for example, a five-unit configuration or a six-unit configuration, the fifth lens unit is moved along the optical axis to perform focusing.

In each of the zoom lenses as well as the variable magnification optical system disclosed in the above-described patent documents, since the amount of movement of the lens unit responsible for focusing is determined by the paraxial power configuration in the entire lens system, the amount of fluctuation in aberrations during focusing is not sufficiently compensated from the wide-angle limit to the telephoto limit, and particularly, compensation of various aberrations in a close-object in-focus situation is insufficient. Therefore, neither the zoom lenses nor the variable magnification optical system has excellent optical performance over the entire object distances, from infinite object distance to close object distance. Further, neither the zoom lenses nor the variable magnification optical system disclosed in the patent documents is capable of performing blur compensation, nor has a blur compensation function that satisfies recent requirements for zoom lens systems.

SUMMARY OF THE INVENTION

An object of the present invention is to provide: a compact and lightweight zoom lens system having a relatively high zooming ratio, less fluctuation in aberrations associated with focusing, excellent optical performance over the entire focusing function, with sufficiently compensated aberrations particularly in close-object in-focus situations, and excellent blur compensation; and an interchangeable lens apparatus and a camera system each employing the zoom lens system.

The novel concepts disclosed herein were achieved in order to solve the foregoing problems in the conventional art, and herein is disclosed: a zoom lens system of lens units each constituted by at least one lens element, and arranged along the lens system's optical axis to define an object side of the lens system on one end thereof, and an image side on an opposite end of the lens system from the object-side end thereof, the zoom lens system comprising, in object-side-to-image-side order: a first lens unit, the first lens unit having positive optical power; a second lens unit; an aperture diaphragm; one or more additional lens units; a first of said one or more additional lens units being a first focusing-lens unit, the first focusing-lens unit having negative optical power and moving along the optical axis in the zoom lens system focusing from an infinity in-focus condition to a close-object in-focus condition; an image blur compensating lens unit provided adjacent the first focusing-lens unit, the image blur compensating lens unit movable in a direction perpendicular to the optical axis in order to optically compensate image blur; wherein the following condition (6) is satisfied:

$$0.1 < (T_1 + T_2)/H < 2.0 \tag{6}$$

where $T_1$ is an axial thickness of the first lens unit, $T_2$ is an axial thickness of the second lens unit, and $H$ is the height of an image the zoom lens system forms on an image surface on the image-side end of the zoom lens system.

The novel concepts disclosed herein were achieved in order to solve the foregoing problems in the conventional art, and herein is disclosed: an interchangeable lens apparatus comprising: a zoom lens system; and a lens mount section which is connectable to a camera body including an image sensor for receiving an optical image formed by the zoom lens system and converting the optical image into an electric image signal, wherein the zoom lens system is a system of lens units each constituted by at least one lens element and arranged along the lens system's optical axis to define an object side of the lens system on one end thereof, and an image side on an opposite end of the lens system from the object-side end thereof, the zoom lens system comprising, in object-side-to-image-side order: a first lens unit, the first lens unit having positive optical power; a second lens unit; an aperture diaphragm: one or more additional lens units, a first of said one or more additional lens units being a first focusing-lens unit, the first focusing-lens unit having negative optical power and moving along the optical axis in the zoom lens system focusing from an infinity in-focus condition to a close-object in-focus condition; an image blur compensating lens unit provided adjacent the first focusing-lens unit, the image blur compensating lens unit movable in a direction perpendicular to the optical axis in order to optically compensate image blur; wherein the following condition (6) is satisfied:

$$0.1 < (T_1 + T_2)/H < 2.0 \quad (6)$$

where $T_1$ is an axial thickness of the first lens unit, $T_2$ is an axial thickness of the second lens unit, and H is the height of an image the zoom lens system forms on an image surface on the image-side end of the zoom lens system.

The novel concepts disclosed herein were achieved in order to solve the foregoing problems in the conventional art, and herein is disclosed: a camera system comprising: an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, wherein the zoom lens system is constituted as just described.

According to the present invention, it is possible to provide: a compact and lightweight zoom lens system having a relatively high zooming ratio, less fluctuation in aberrations associated with focusing, excellent optical performance over the entire focusing function, with sufficiently compensated aberrations particularly in close-object in-focus situations, and excellent blur compensation; and an interchangeable lens apparatus and a camera system each employing the zoom lens system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments 1 to 14

Figure 1:
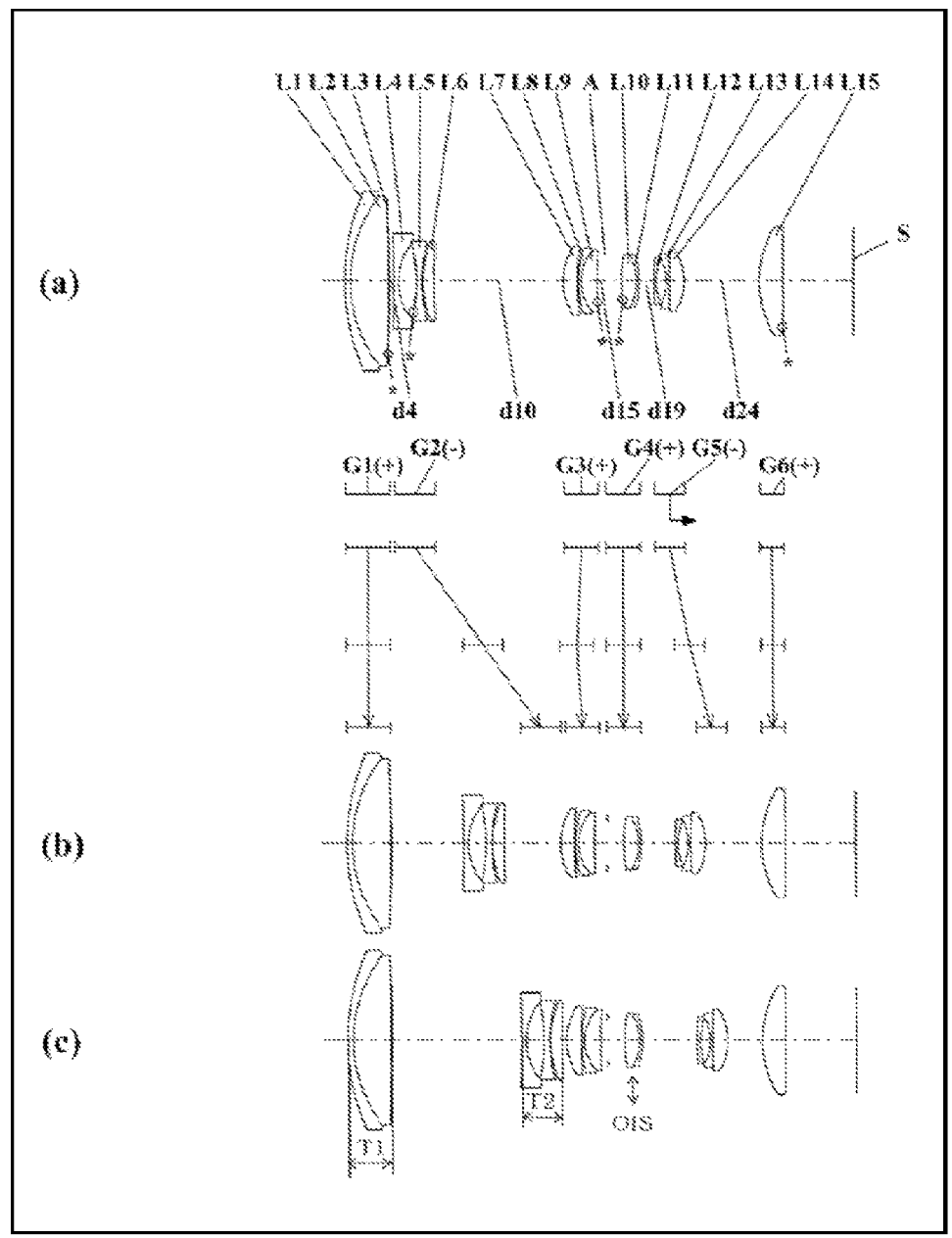
FIG. 1 is a lens arrangement diagram showing an infinity in-focus condition of a zoom lens system according to Embodiment 1 (Example 1)
Figure 2:
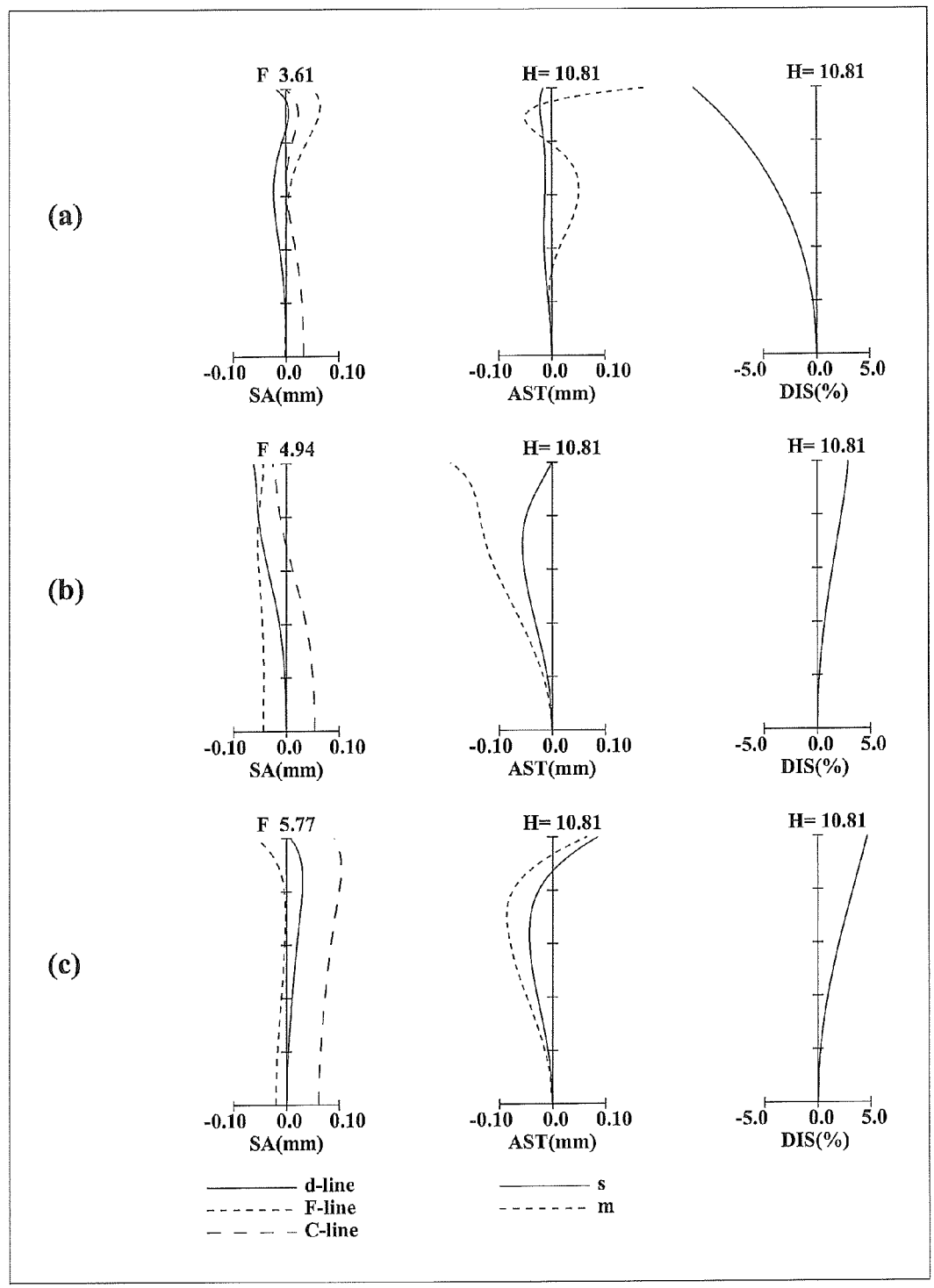
FIG. 2 is a longitudinal aberration diagram of an infinity in-focus condition of a zoom lens system according to Example 1.
Figure 3:
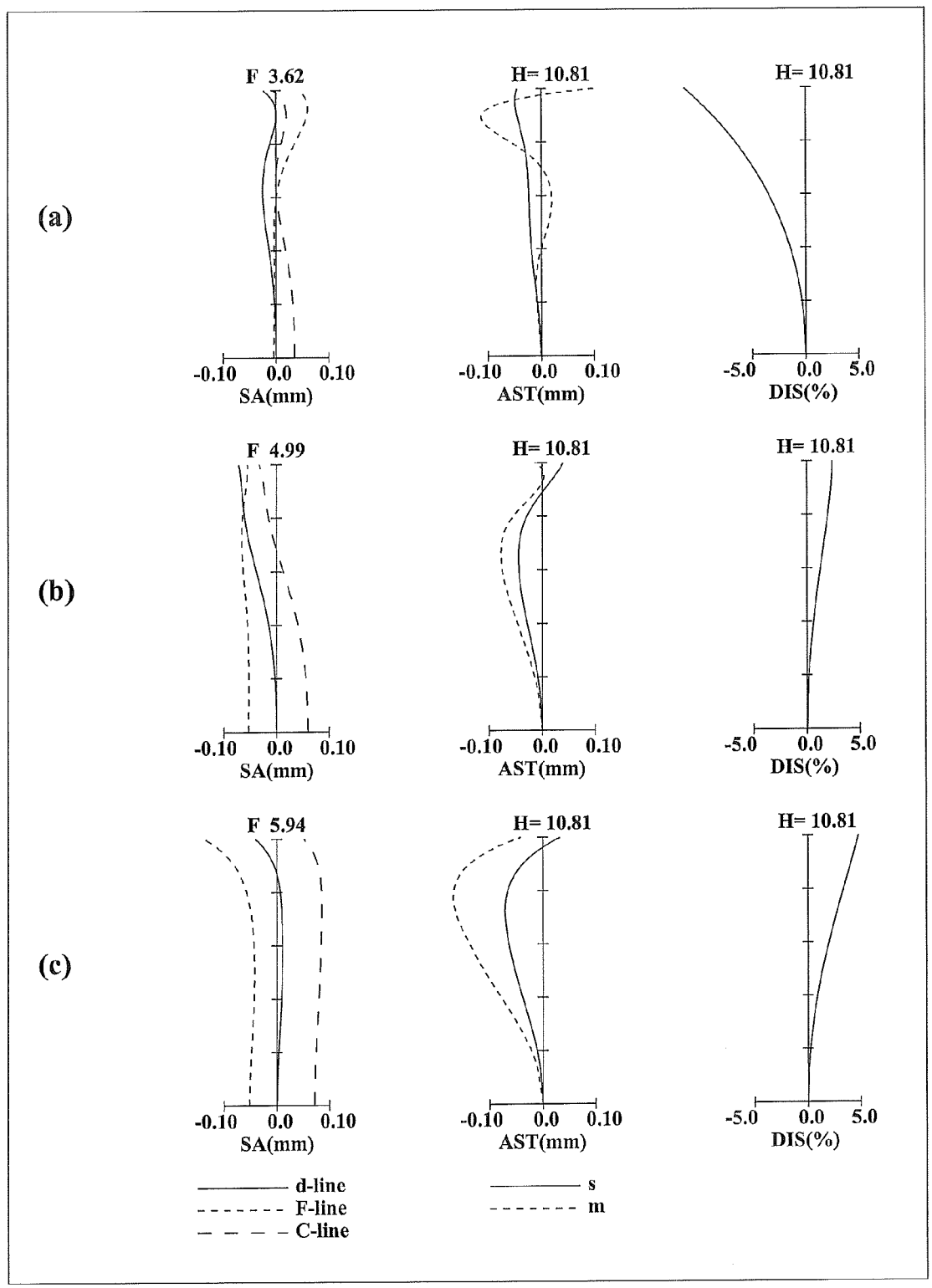
FIG. 3 is a longitudinal aberration diagram of a close-object in-focus condition of a zoom lens system according to Example 1.
Figure 4:
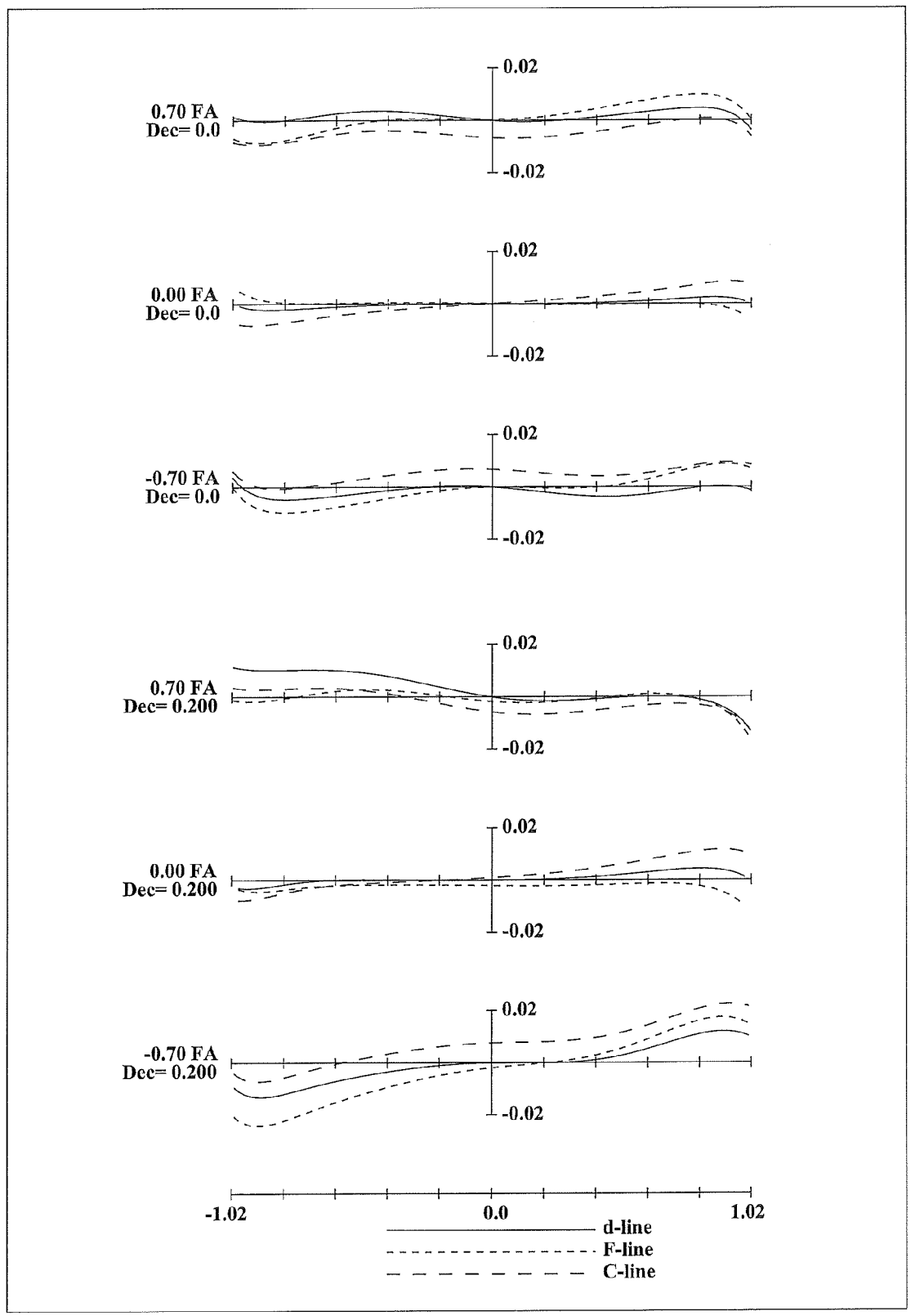
FIG. 4 is a lateral aberration diagram of a zoom lens system according to Example 1 at a telephoto limit in a basic state where image blur compensation is not performed and in an image blur compensation state.

FIGS. 1, 5, 9, 13, 17, 21, 25, 29, 33, 37, 41, 45, 49, and 53 are lens arrangement diagrams of zoom lens systems according to Embodiments 1 to 14, respectively. Each Fig. shows a zoom lens system in an infinity in-focus situation.

In each figure, part (a) shows the lens configuration at the wide-angle limit (in the minimum focal length situation: focal length $f_W$), part (b) shows the lens configuration at a middle position (in an intermediate focal length situation: focal length $f_M = \sqrt{(f_W * f_T)}$), and part (c) shows the lens configuration at the telephoto limit (in the maximum focal length situation: focal length $f_T$). Further, in each figure, the bent arrow located between part (a) and part (b) indicates a line obtained by connecting the positions of each lens unit respectively at the wide-angle limit, a middle position and the telephoto limit, in order from the top. In the part between the wide-angle limit and the middle position, and the part between the middle position and the telephoto limit, the positions are connected simply with a straight line, and hence this line does not indicate actual motion of the lens units. Additionally, the symbol "OIS" appears in certain of the figures in order to label particular lens elements constituting later-described image-blur compensating lens units, and accompanying the "OIS" symbol, a perpendicular double-ended arrow indicating the trajectory of the image-blur compensating lens unit also appears.

Moreover, in each figure, an arrow imparted to a lens unit indicates focusing from an infinity in-focus situation to a close-object in-focus situation. That is, in FIGS. 1 and 5, the arrow indicates the moving direction of a fifth lens unit G5, which is described later, when the system focuses from the infinity in-focus situation to the close-object in-focus situation. In FIGS. 9, 13, 17, 21, 25, 29, 33, and 45, the arrow indicates the moving direction of a fourth lens unit G4, which is described later, when the system focuses from the infinity in-focus situation to the close-object in-focus situation. In FIGS. 37, 41, 49, and 53, the arrow indicates the moving direction of each of a fourth lens unit G4 and a fifth lens unit G5, which are described later, when the system focuses from the infinity in-focus situation to the close-object in-focus situation. In FIGS. 1, 5, 9, 13, 17, 21, 25, 29, 33, 37, 41, 45, 49, and 53, since the symbols of the respective lens units are imparted to part (a), the arrow indicating focusing is placed beneath each symbol of each lens unit for convenience's sake. However, the direction along which each lens unit moves when the system focuses in each zooming situation will be hereinafter described in detail for each embodiment.

Each of the zoom lens systems according to Embodiments 1 and 2, in order from the object side to the image side, comprises: a first lens unit G1 having positive optical power; a second lens unit G2 having negative optical power; a third lens unit G3 having positive optical power; a fourth lens unit G4 having positive optical power; a fifth lens unit G5 having negative optical power; and a sixth lens unit G6 having positive optical power. In the zoom lens systems according to Embodiments 1 and 2, when being zoomed, the second lens unit G2, the third lens unit G3, and the fifth lens unit G5 individually move along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6 vary. In the zoom lens systems according to Embodiments 1 and 2, these lens units are arranged in a desired optical power configuration, and thereby size reduction is achieved in the entire lens system while maintaining high optical performance.

Each of the zoom lens systems according to Embodiments 3, 4, 11, and 14, in order from the object side to the image side, comprises: a first lens unit G1 having positive optical power; a second lens unit G2 having negative optical power; a third lens unit G3 having positive optical power; a fourth lens unit G4 having negative optical power; a fifth lens unit G5 having negative optical power; and a sixth lens unit G6 having positive optical power. In the zoom lens systems according to Embodiments 3, 4, 11, and 14, when being zoomed, the second lens unit G2, the fourth lens unit G4, and the fifth lens unit G5 individually move along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6 vary. In the zoom lens systems according to Embodiments 3, 4, 11, and 14, these lens units are arranged in a desired optical power configuration, and thereby size reduction is achieved in the entire lens system while maintaining high optical performance.

Each of the zoom lens systems according to Embodiments 5 and 6, in order from the object side to the image side, comprises: a first lens unit G1 having positive optical power; a second lens unit G2 having negative optical power; a third lens unit G3 having positive optical power; a fourth lens unit G4 having negative optical power; and a fifth lens unit G5 having positive optical power. In the zoom lens systems according to Embodiments 5 and 6, when being zoomed, the second lens unit G2, the third lens unit G3, and the fourth lens unit G4 individually move along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, and the interval between the fourth lens unit G4 and the fifth lens unit G5 vary. In the zoom lens systems according to Embodiments 5 and 6, these lens units are arranged in a desired optical power configuration, and thereby size reduction is achieved in the entire lens system while maintaining high optical performance.

Each of the zoom lens systems according to Embodiments 7 and 8, in order from the object side to the image side, comprises: a first lens unit G1 having positive optical power; a second lens unit G2 having negative optical power; a third lens unit G3 having positive optical power; a fourth lens unit G4 having negative optical power; and a fifth lens unit G5 having positive optical power. In the zoom lens systems according to Embodiments 7 and 8, when being zoomed, the first lens unit G1, the second lens unit G2, the third lens unit G3, and the fourth lens unit G4 individually move along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, and the interval between the fourth lens unit G4 and the fifth lens unit G5 vary. In the zoom lens systems according to Embodiments 7 and 8, these lens units are arranged in a desired optical power configuration, and thereby size reduction is achieved in the entire lens system while maintaining high optical performance.

Each of the zoom lens systems according to Embodiments 9, 10, 12, and 13, in order from the object side to the image side, comprises: a first lens unit G1 having positive optical power; a second lens unit G2 having negative optical power; a third lens unit G3 having positive optical power; a fourth lens unit G4 having negative optical power; a fifth lens unit G5 having negative optical power; and a sixth lens unit G6 having positive optical power. In the zoom lens systems according to Embodiments 9, 10, 12, and 13, when being zoomed, the first lens unit G1, the second lens unit G2, the fourth lens unit G4, and the fifth lens unit G5 individually move along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6 vary. In the zoom lens systems according to Embodiments 9, 10, 12, and 13, these lens units are arranged in a desired optical power configuration, and thereby size reduction is achieved in the entire lens system while maintaining high optical performance.

Further, in FIGS. 1, 5, 9, 13, 17, 21, 25, 29, 33, 37, 41, 45, 49, and 53, an asterisk "*" imparted to a particular surface indicates that the surface is aspheric. In each Fig., symbol (+) or (−) imparted to the symbol of each lens unit corresponds to the sign of the optical power of the lens unit. In each figure, the straight line located on the most right-hand side indicates the position of the image surface S.

Figure 5:
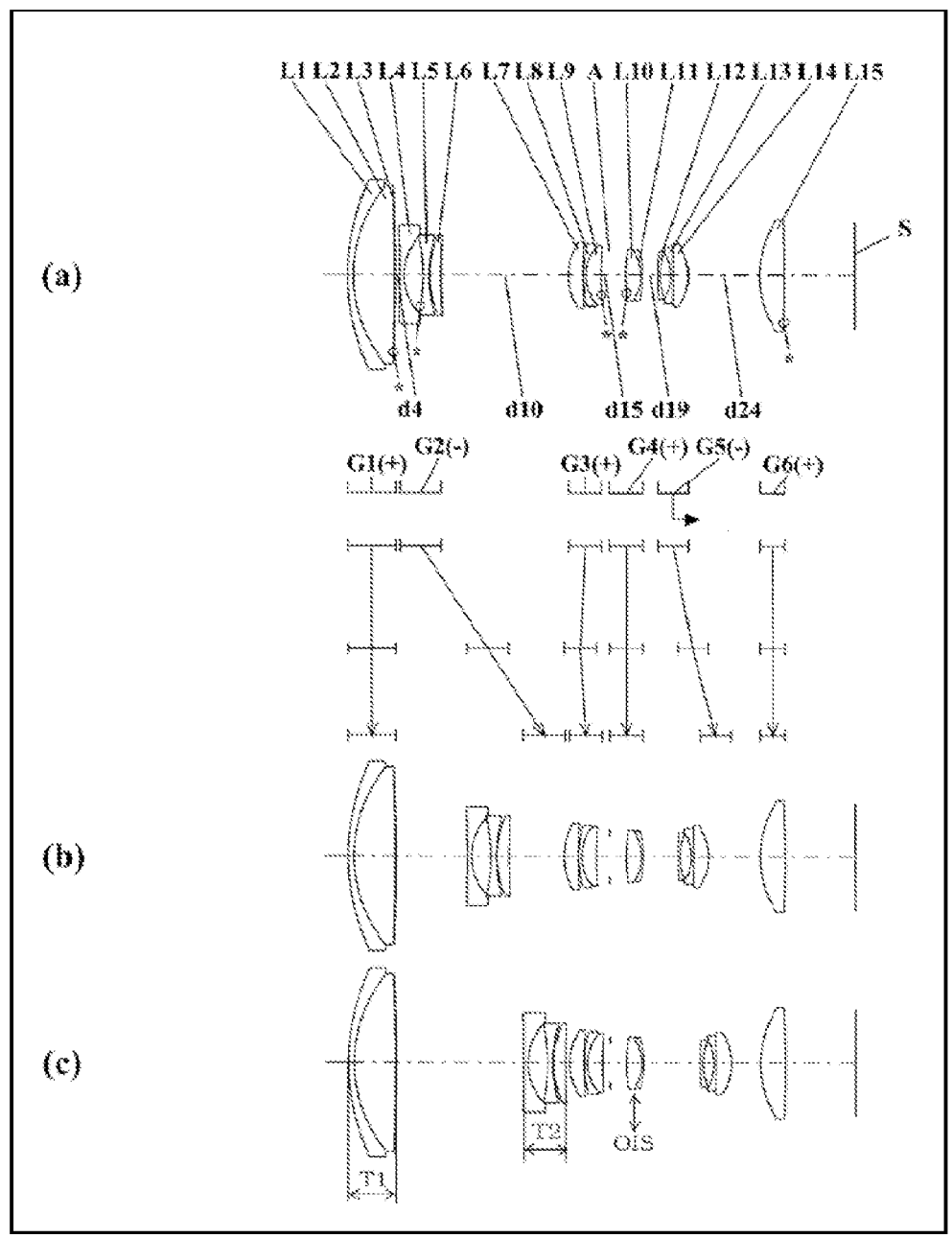
FIG. 5 is a lens arrangement diagram showing an infinity in-focus condition of a zoom lens system according to Embodiment 2 (Example 2)
Figure 6:
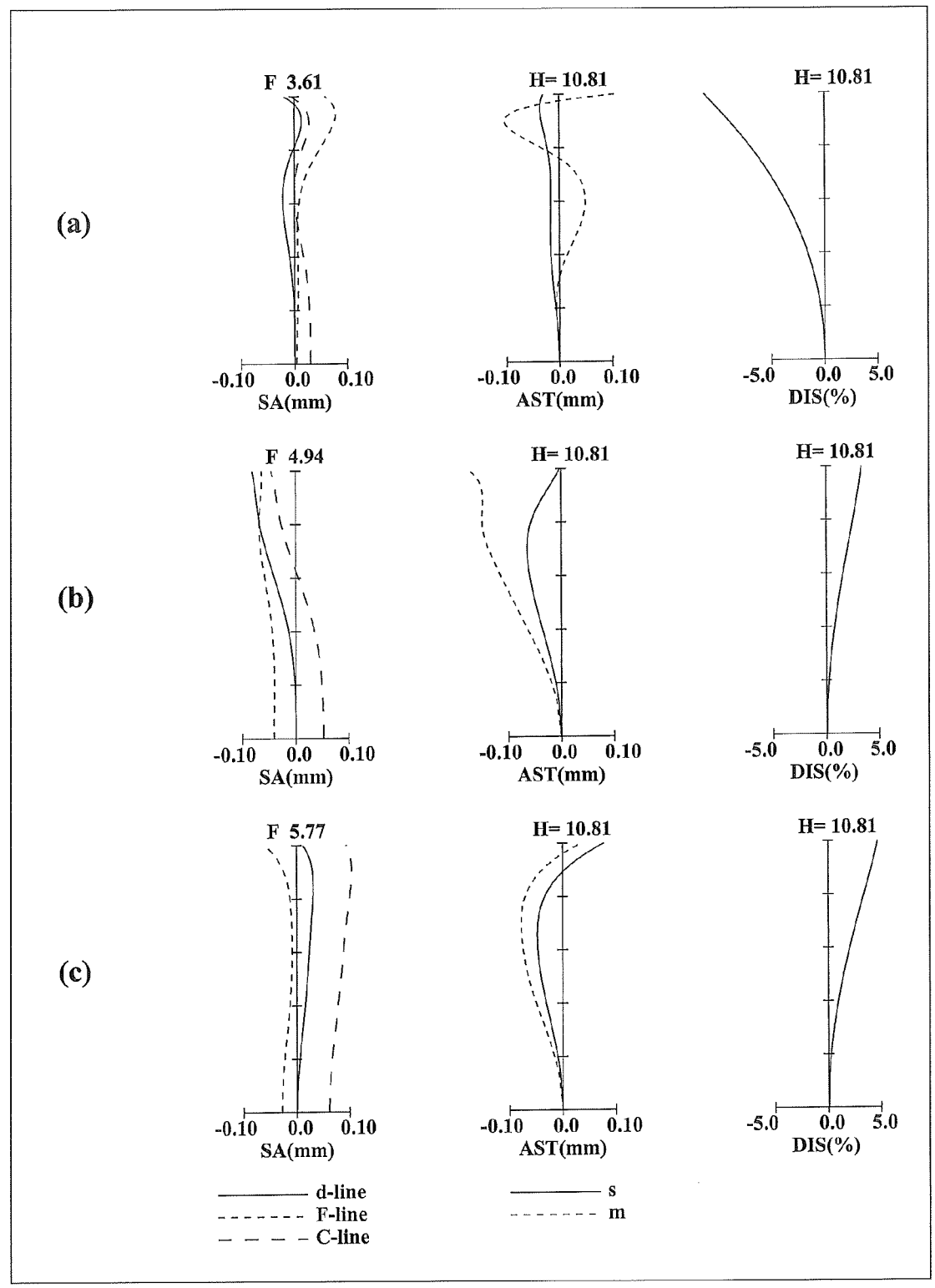
FIG. 6 is a longitudinal aberration diagram showing an infinity in-focus condition of a zoom lens system according to Example 2.
Figure 7:
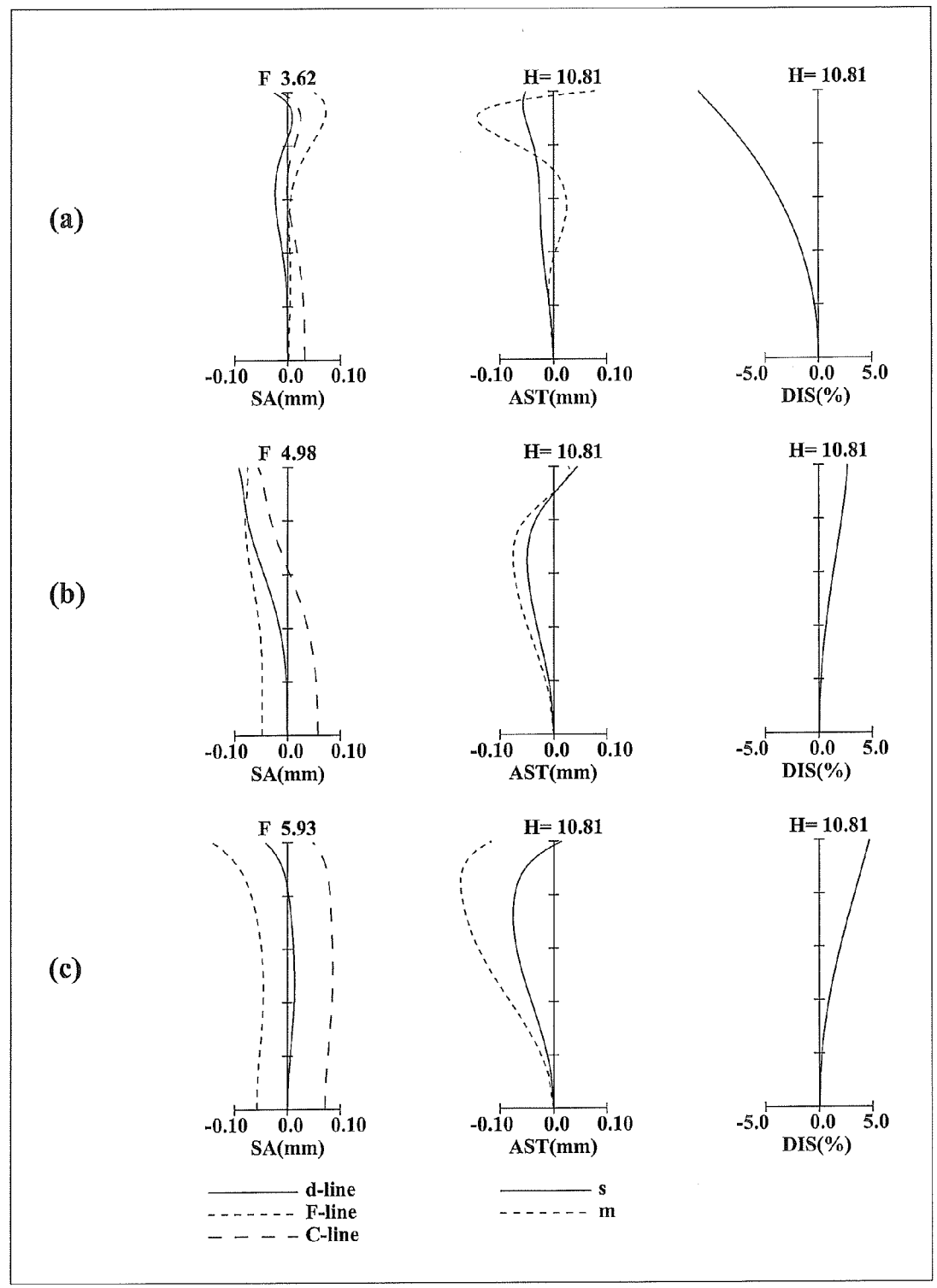
FIG. 7 is a longitudinal aberration diagram of a close-object in-focus condition of a zoom lens system according to Example 2.
Figure 8:
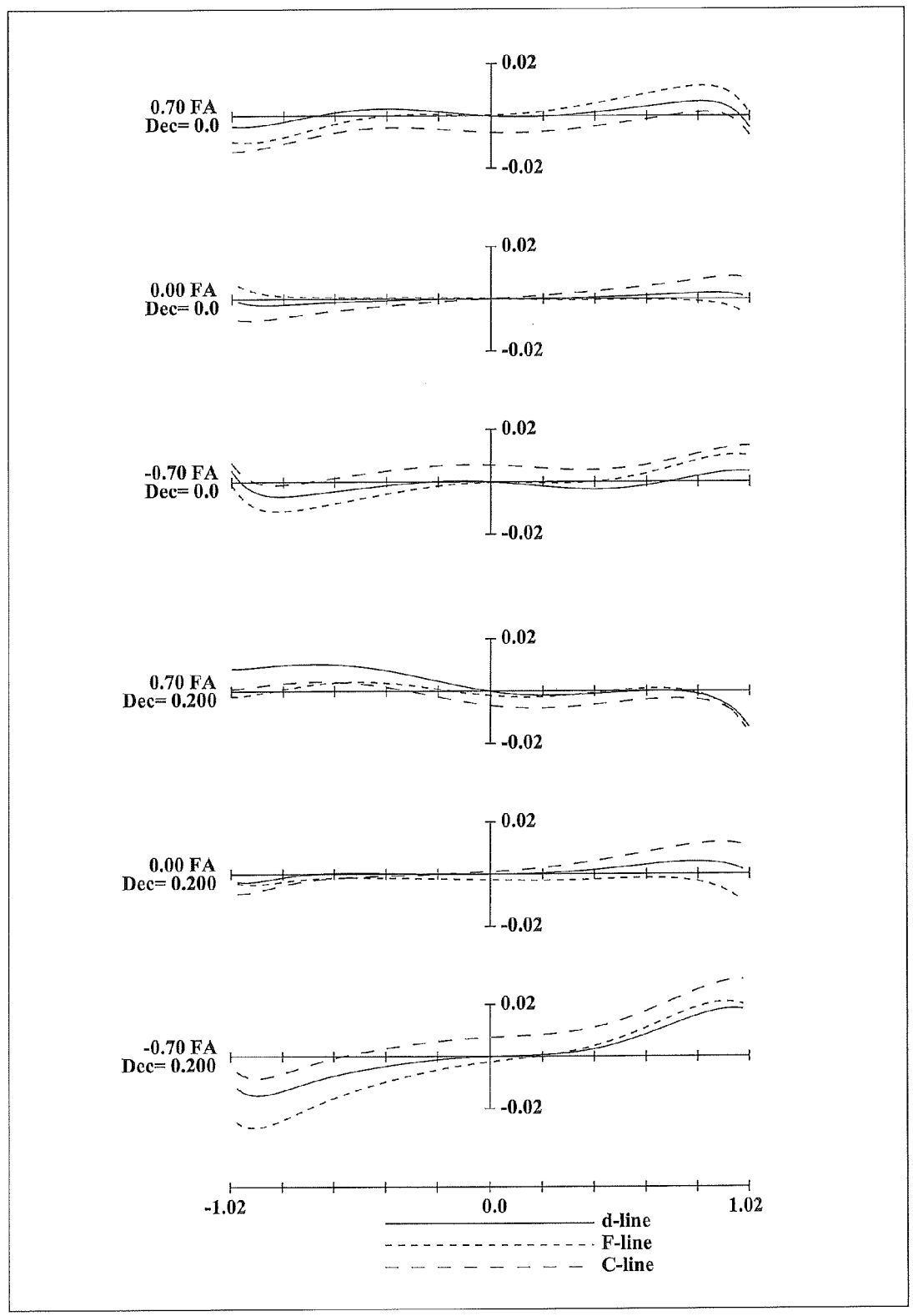
FIG. 8 is a lateral aberration diagram of a zoom lens system according to Example 2 at a telephoto limit in a basic state where image blur compensation is not performed and in an image blur compensation state.
Figure 17:
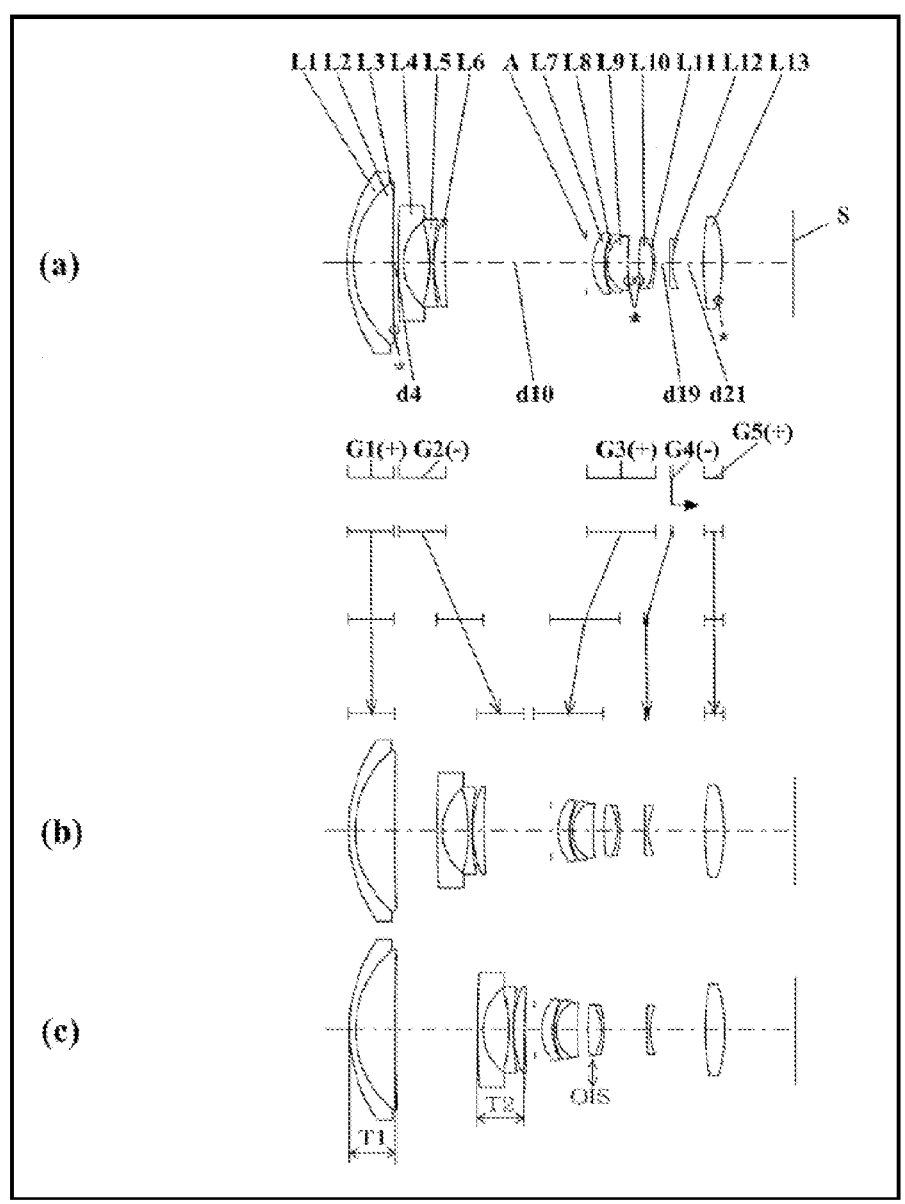
FIG. 17 is a lens arrangement diagram showing an infinity in-focus condition of a zoom lens system according to Embodiment 5 (Example 5)
Figure 18:
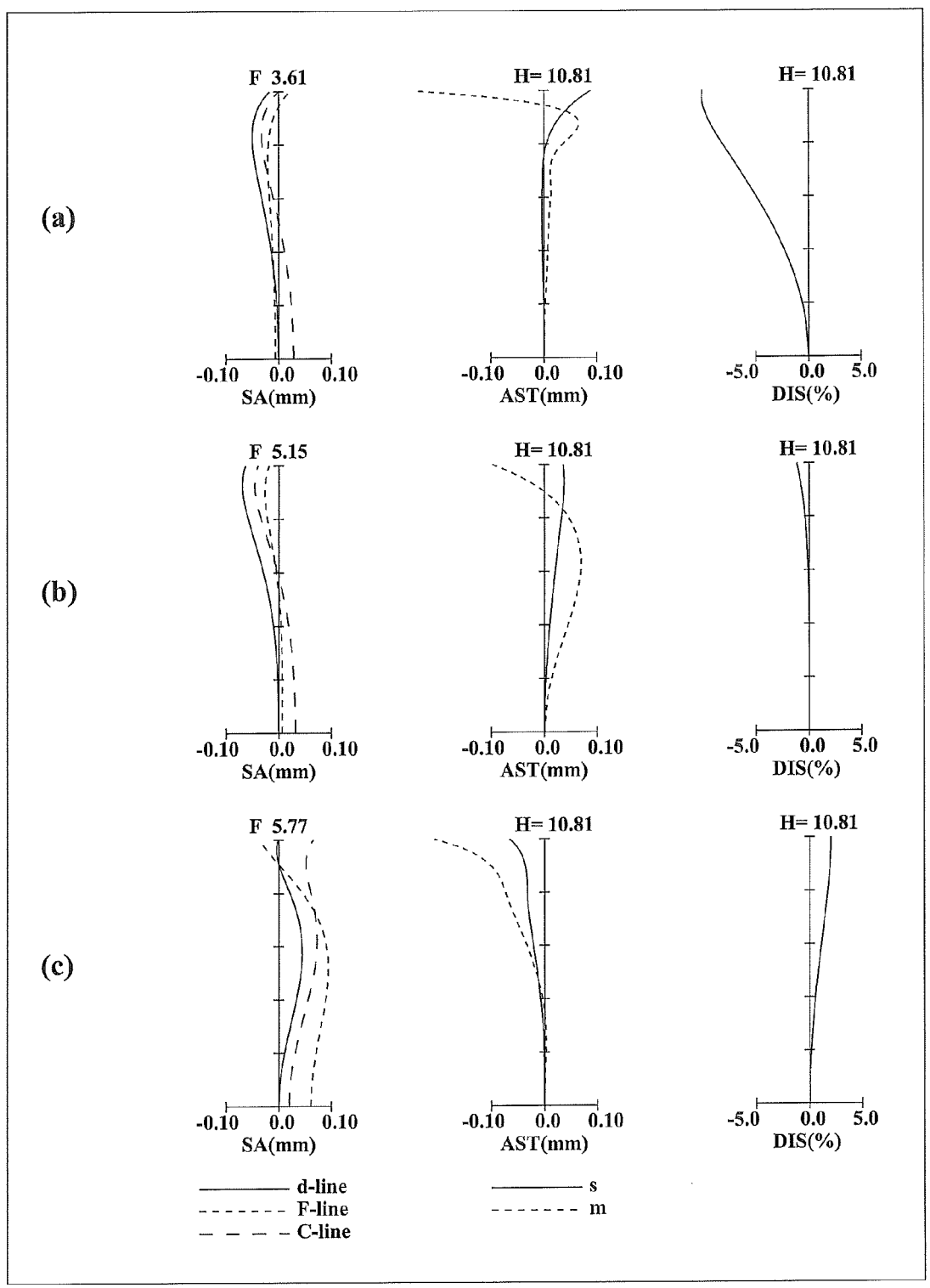
FIG. 18 is a longitudinal aberration diagram showing an infinity in-focus condition of a zoom lens system according to Example 5.
Figure 19:
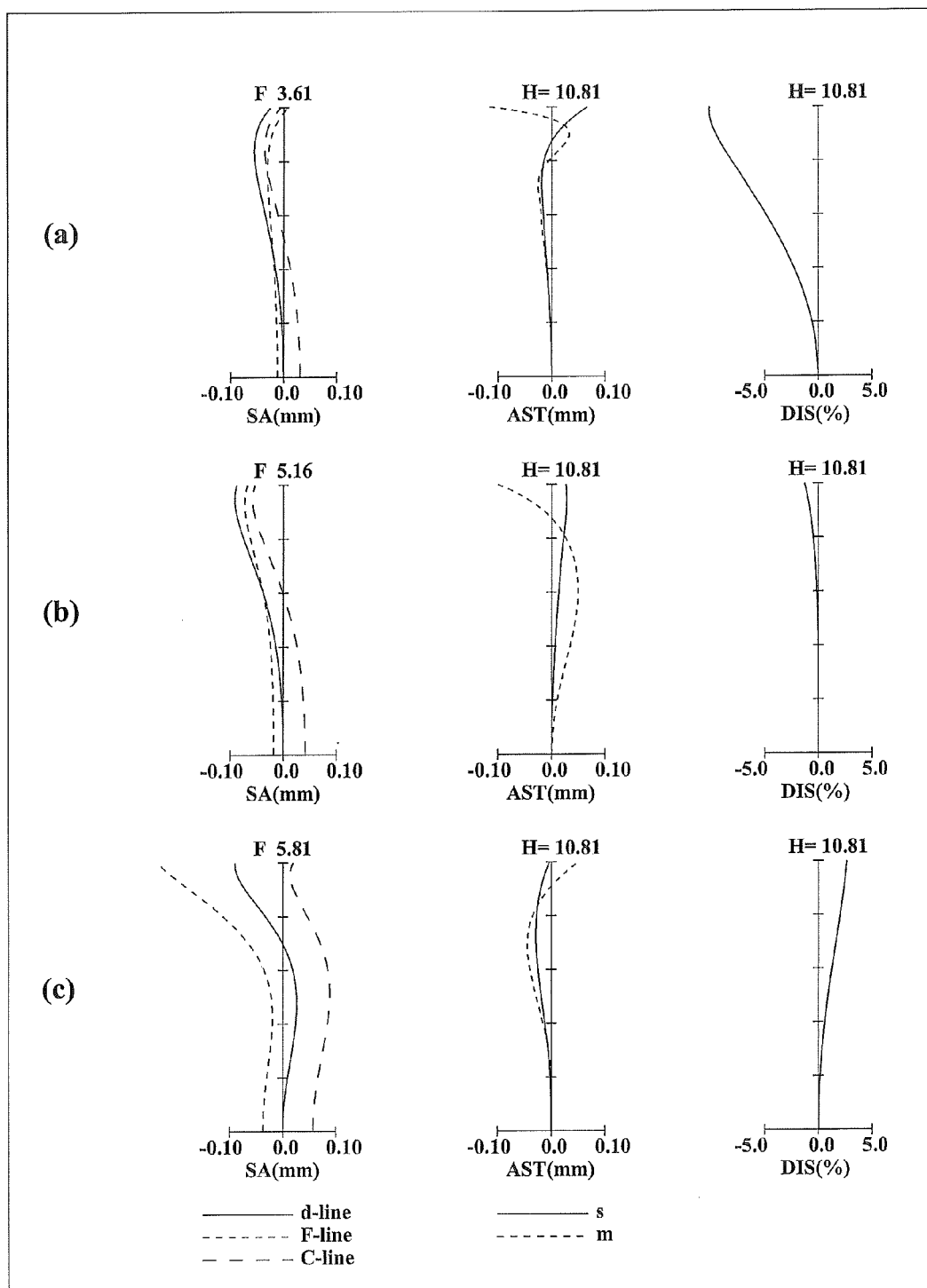
FIG. 19 is a longitudinal aberration diagram of a close-object in-focus condition of a zoom lens system according to Example 5.
Figure 20:
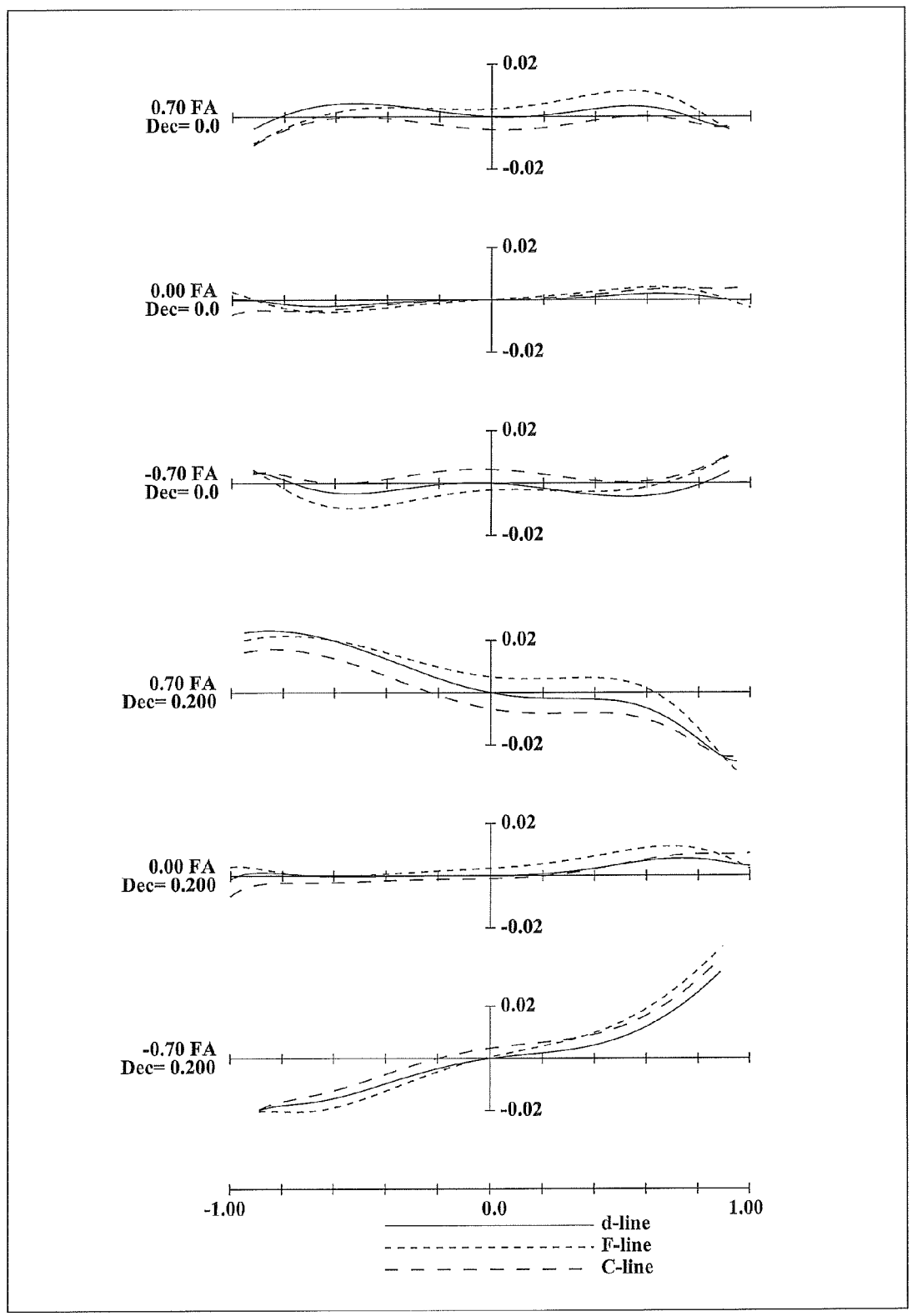
FIG. 20 is a lateral aberration diagram of a zoom lens system according to Example 5 at a telephoto limit in a basic state where image blur compensation is not performed and in an image blur compensation state.
Figure 21:
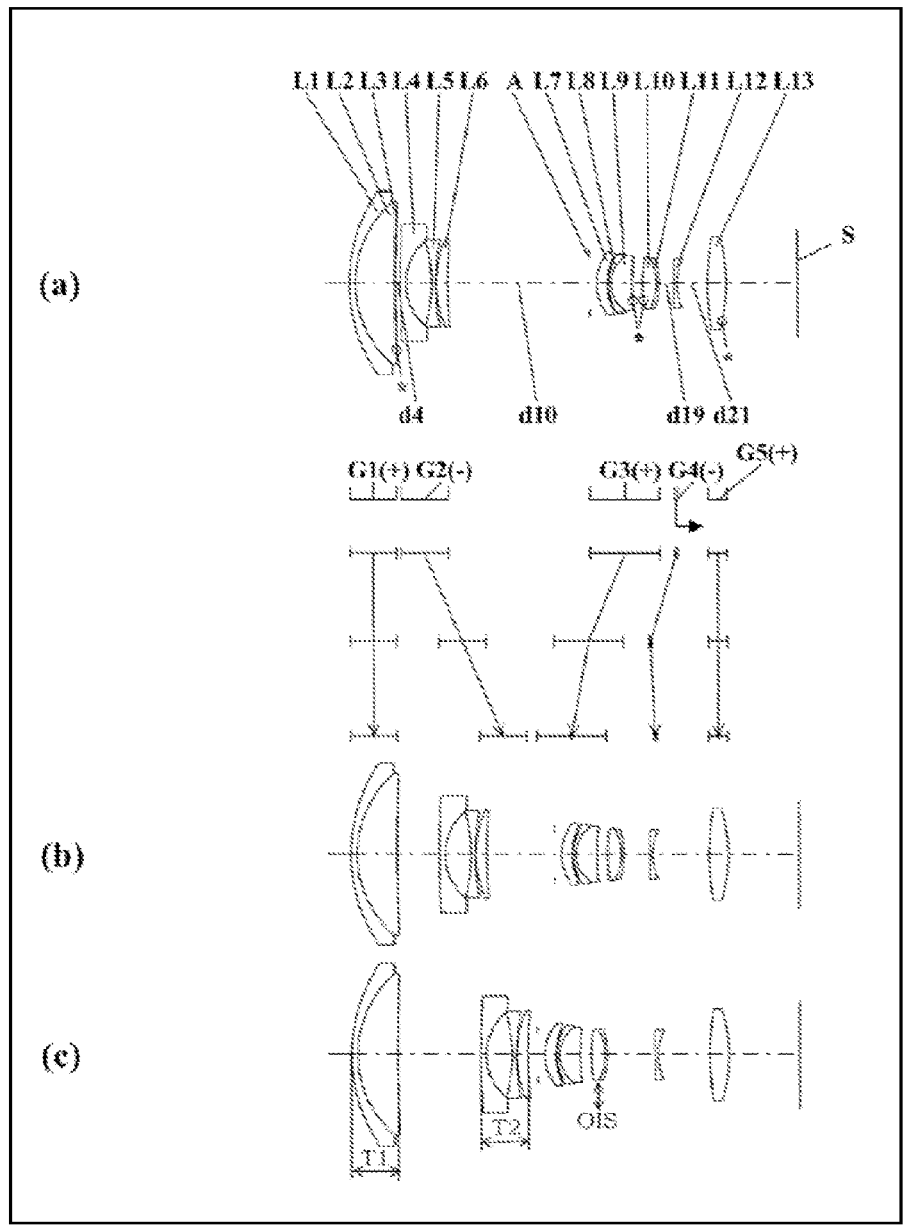
FIG. 21 is a lens arrangement diagram showing an infinity in-focus condition of a zoom lens system according to Embodiment 6 (Example 6)
Figure 22:
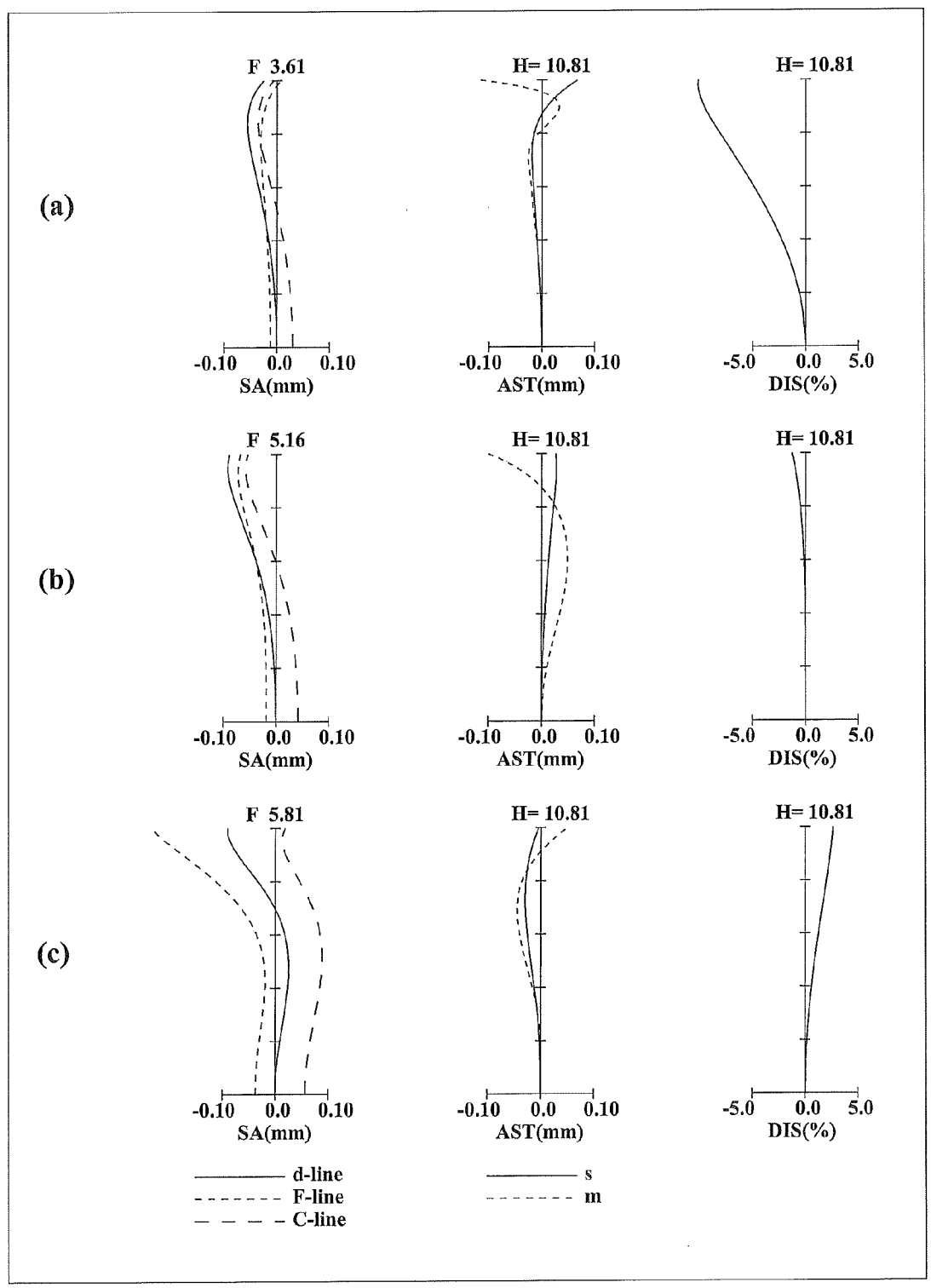
FIG. 22 is a longitudinal aberration diagram showing an infinity in-focus condition of a zoom lens system according to Example 6.
Figure 23:
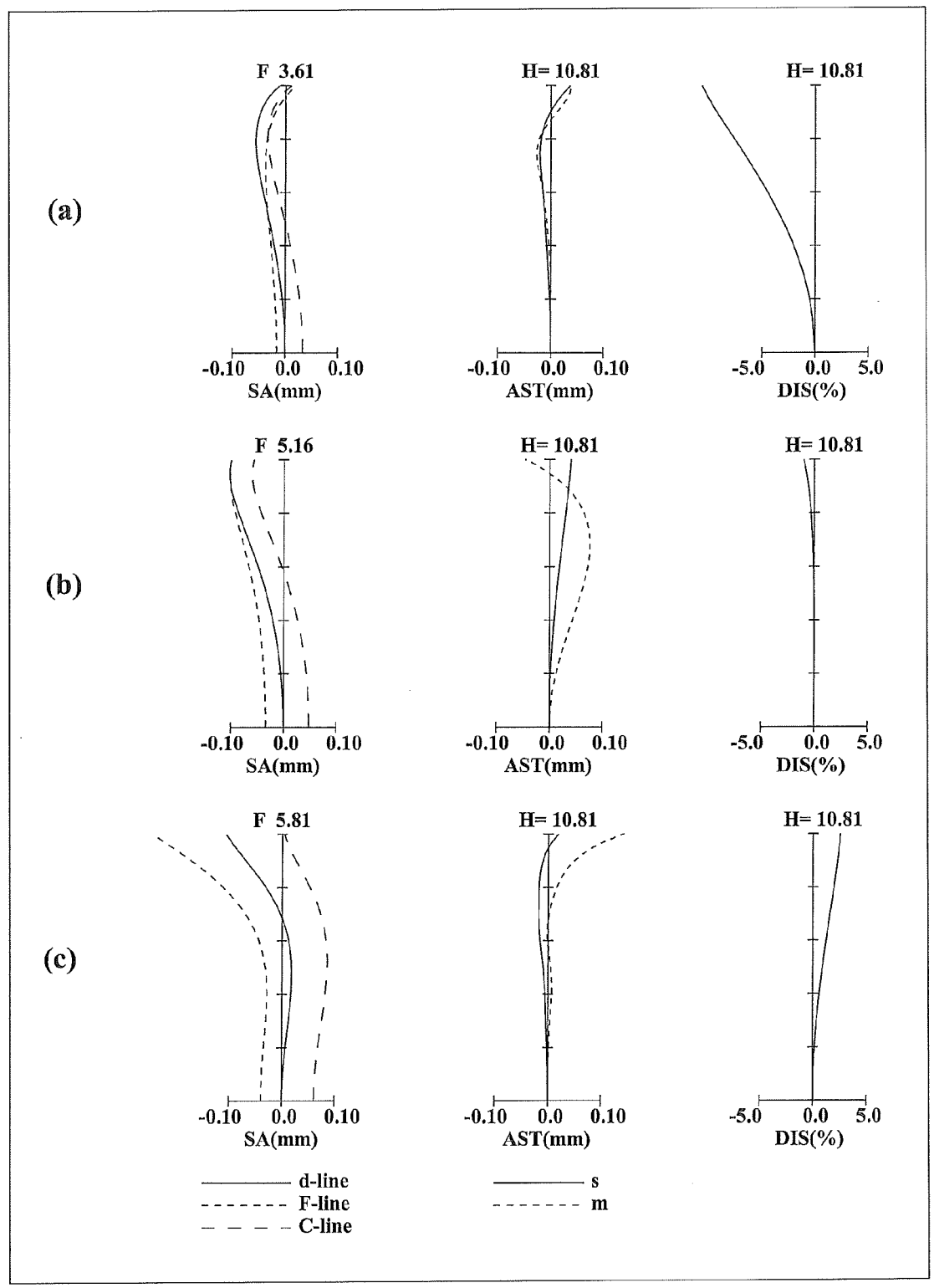
FIG. 23 is a longitudinal aberration diagram of a close-object in-focus condition of a zoom lens system according to Example 6.
Figure 24:
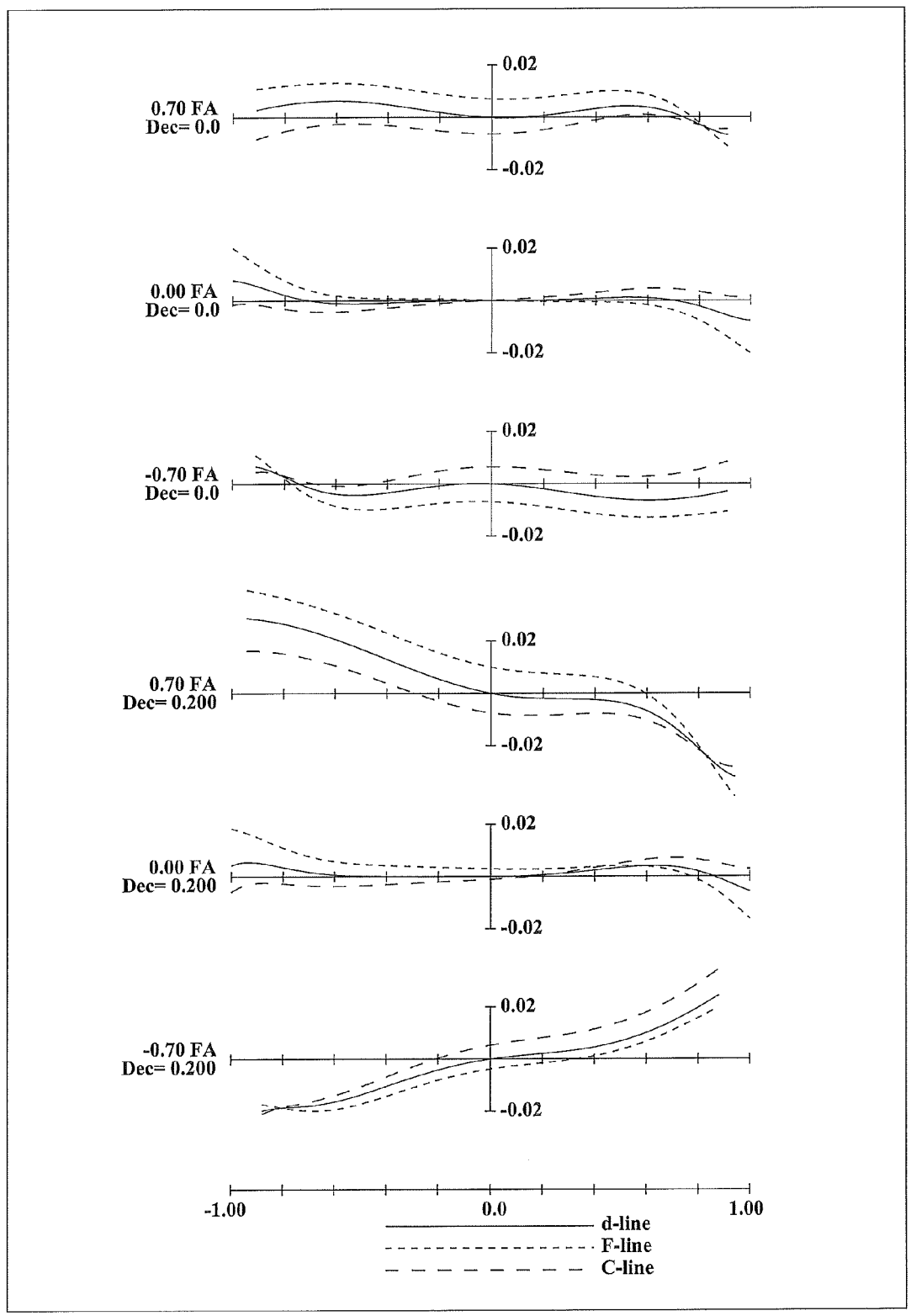
FIG. 24 is a lateral aberration diagram of a zoom lens system according to Example 6 at a telephoto limit in a basic state where image blur compensation is not performed and in an image blur compensation state.
Figure 25:
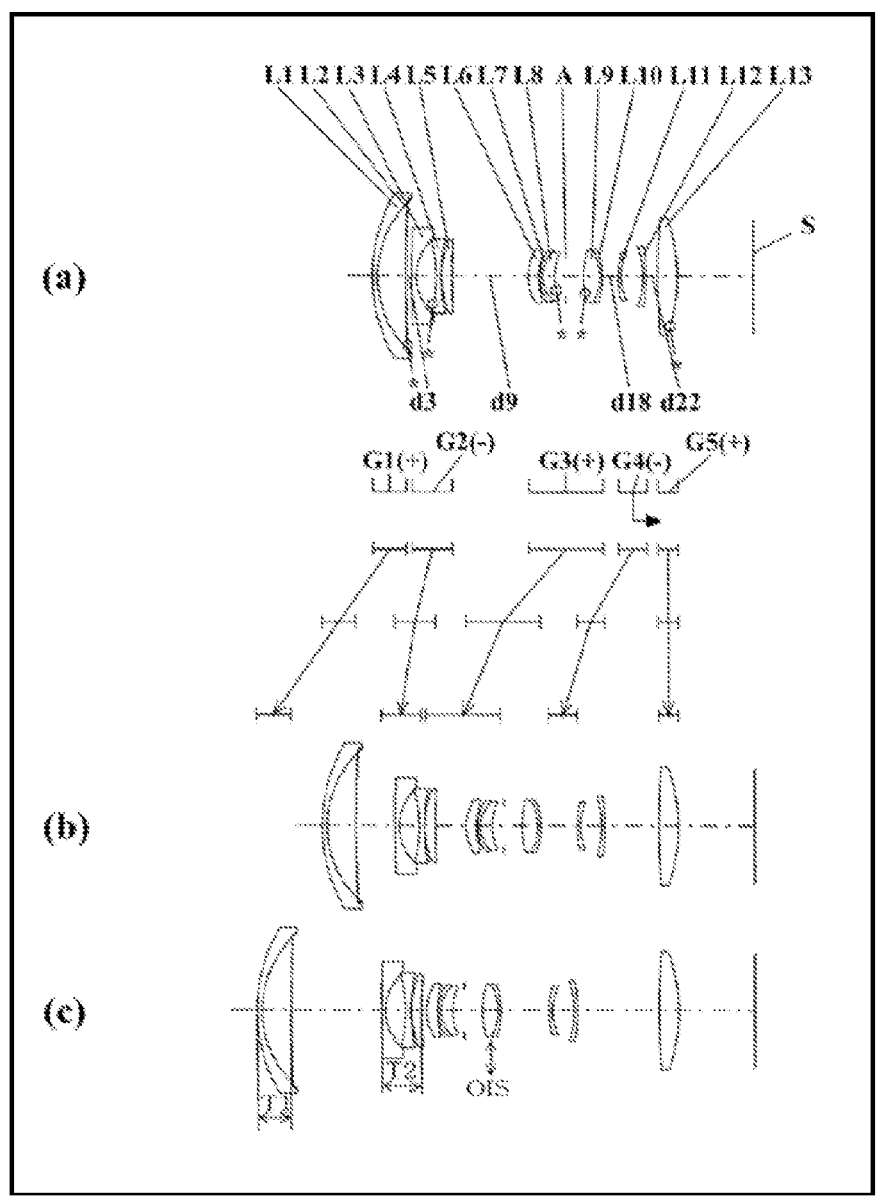
FIG. 25 is a lens arrangement diagram showing an infinity in-focus condition of a zoom lens system according to Embodiment 7 (Example 7)
Figure 26:
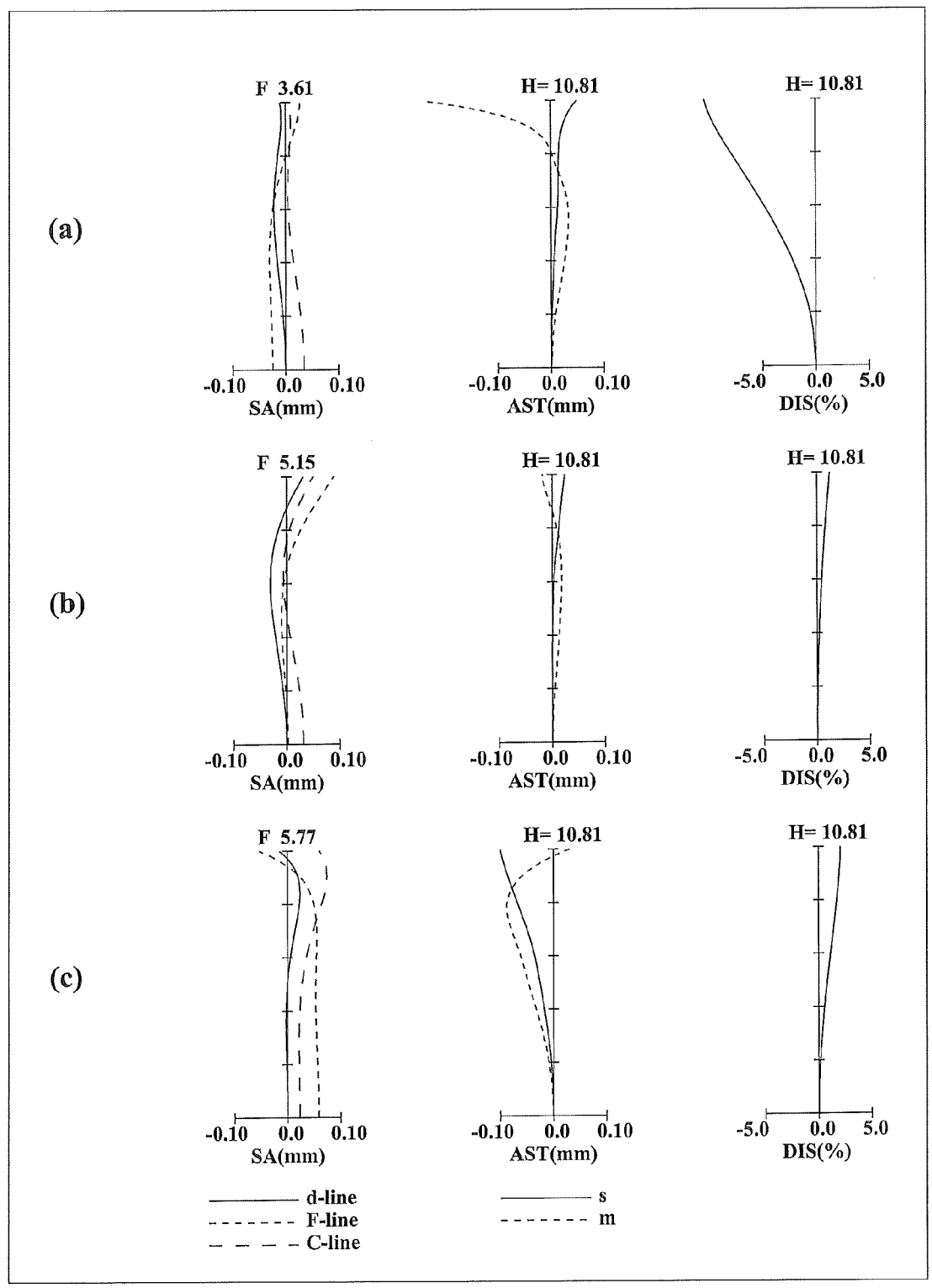
FIG. 26 is a longitudinal aberration diagram of an infinity in-focus condition of a zoom lens system according to Example 7.
Figure 27:
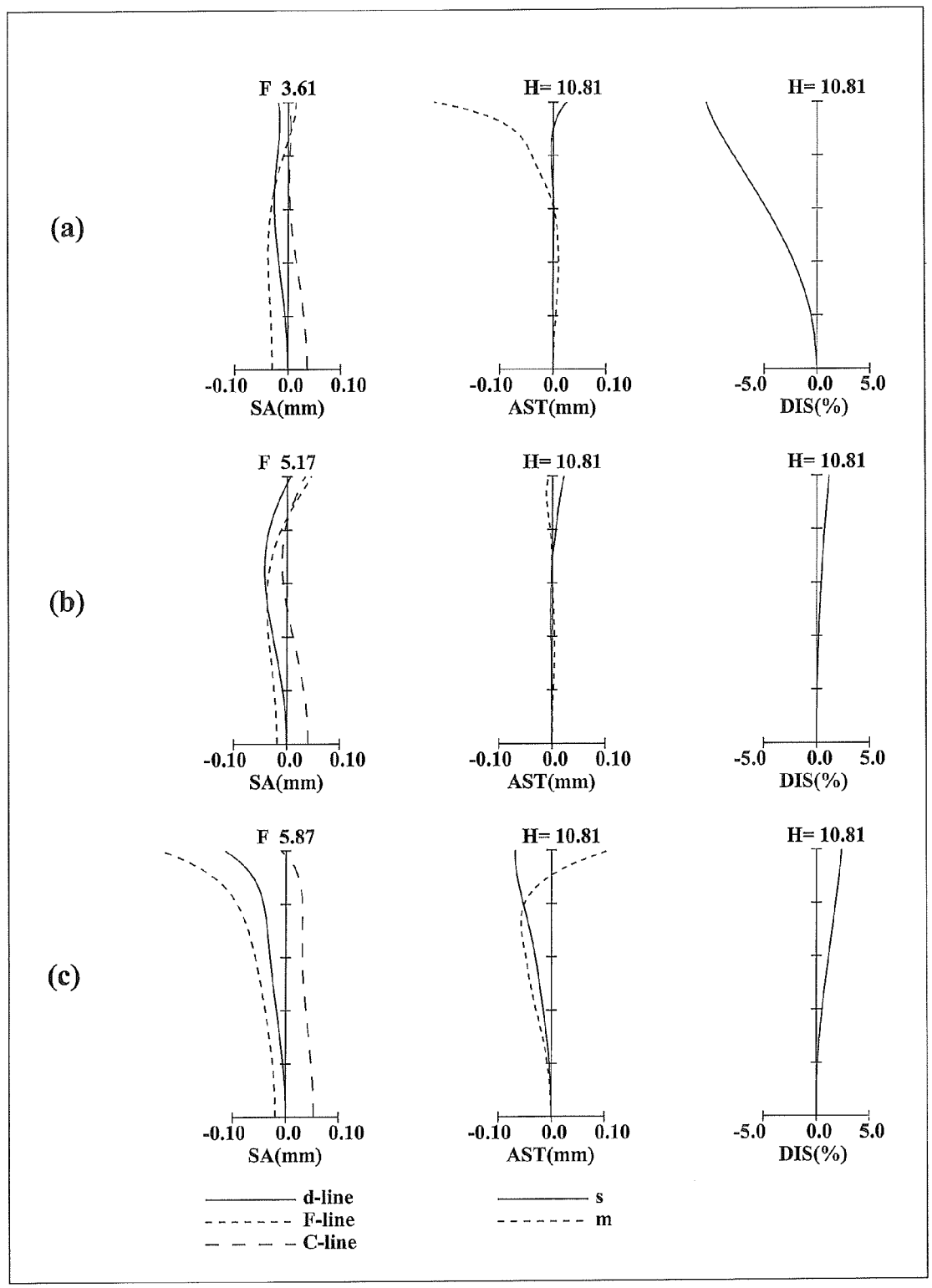
FIG. 27 is a longitudinal aberration diagram of a close-object in-focus condition of a zoom lens system according to Example 7.
Figure 28:
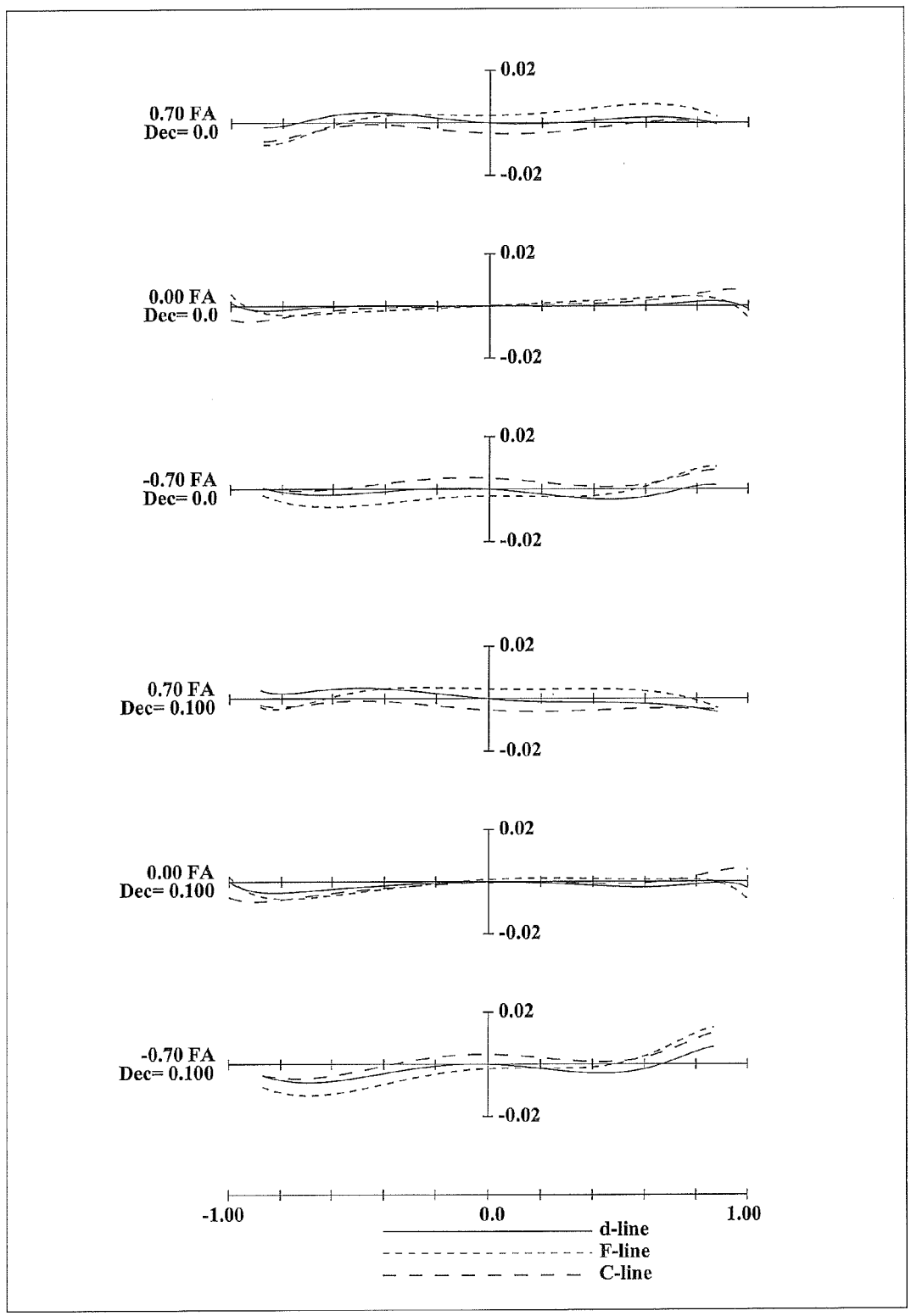
FIG. 28 is a lateral aberration diagram of a zoom lens system according to Example 7 at a telephoto limit in a basic state where image blur compensation is not performed and in an image blur compensation state.
Figure 29:
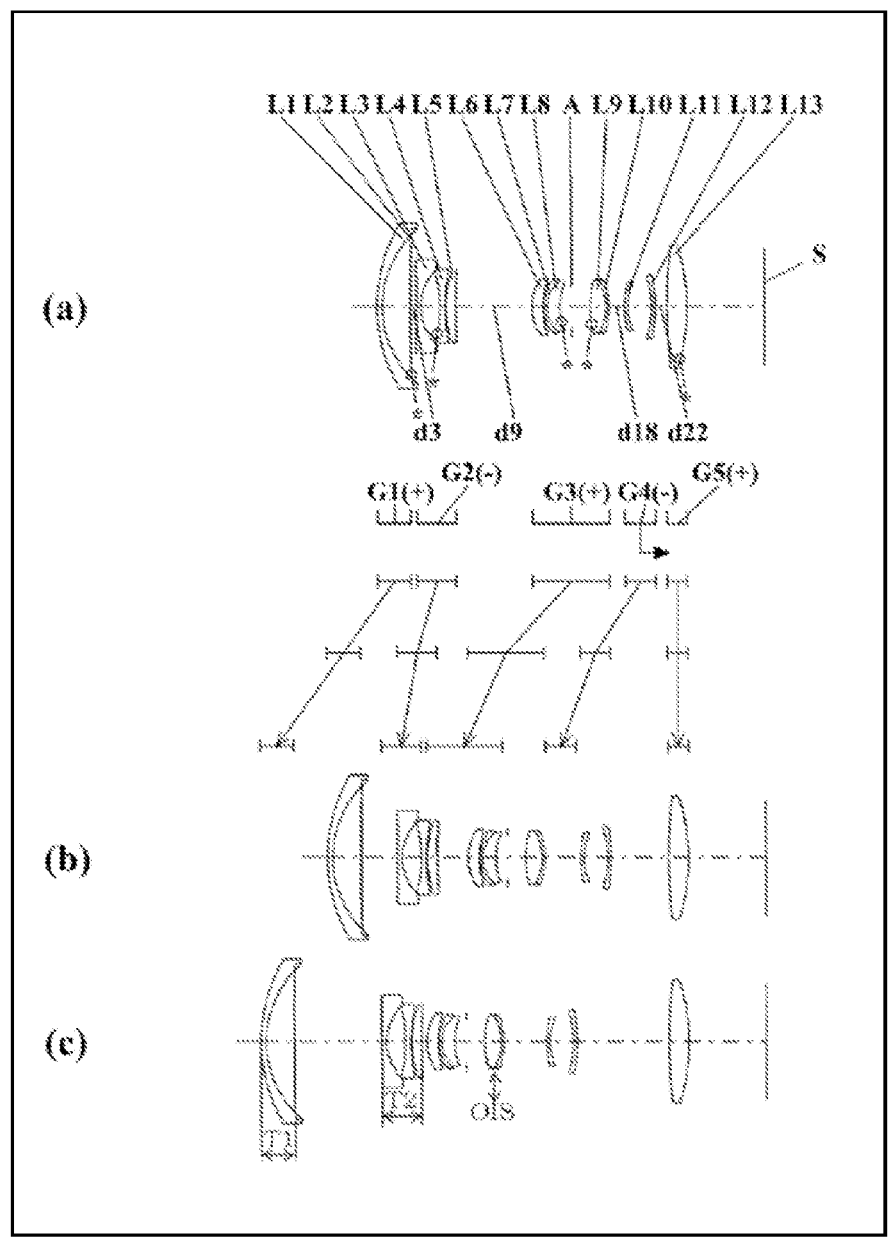
FIG. 29 is a lens arrangement diagram showing an infinity in-focus condition of a zoom lens system according to Embodiment 8 (Example 8)
Figure 30:
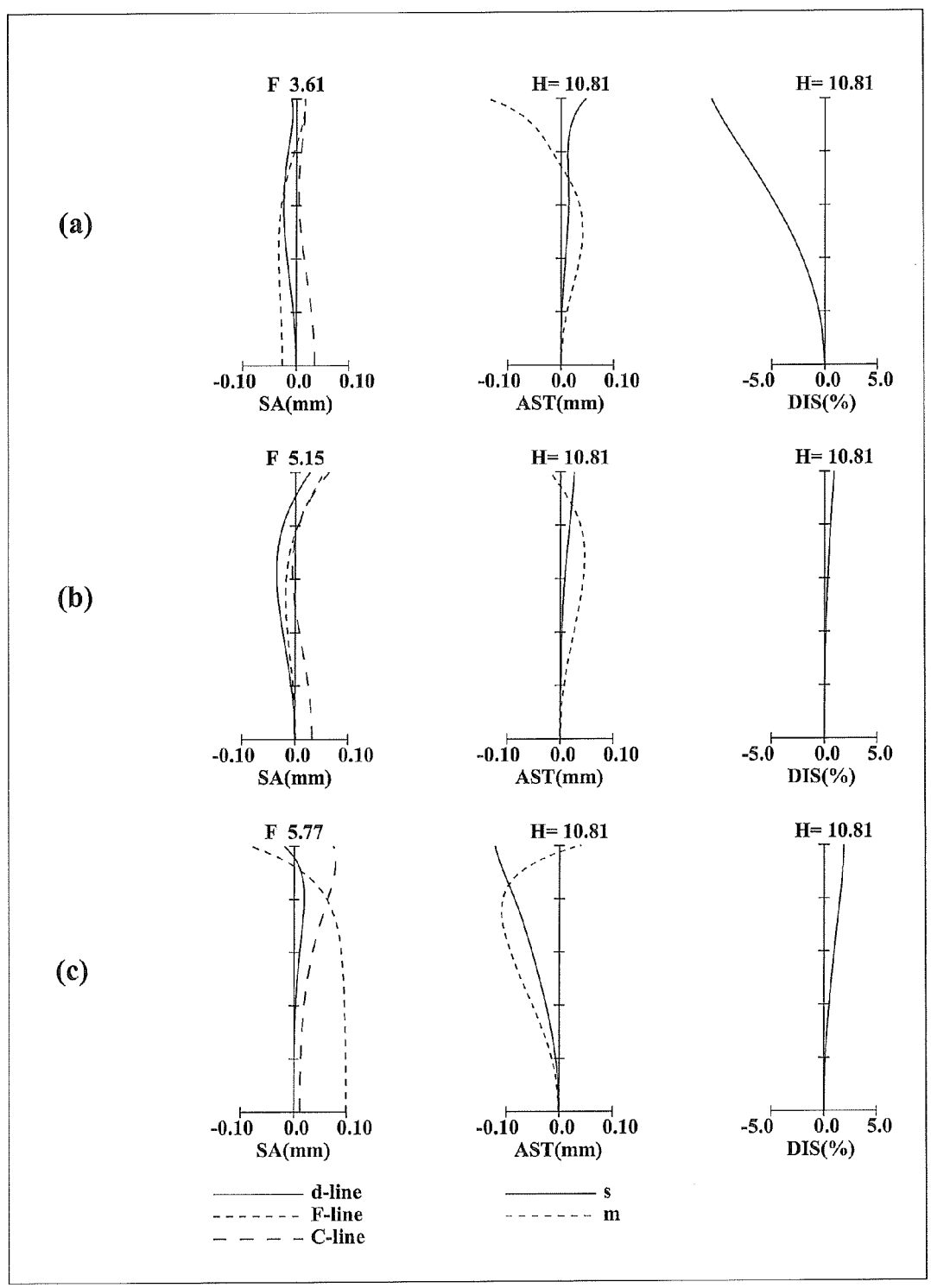
FIG. 30 is a longitudinal aberration diagram of an infinity in-focus condition of a zoom lens system according to Example 8.
Figure 31:
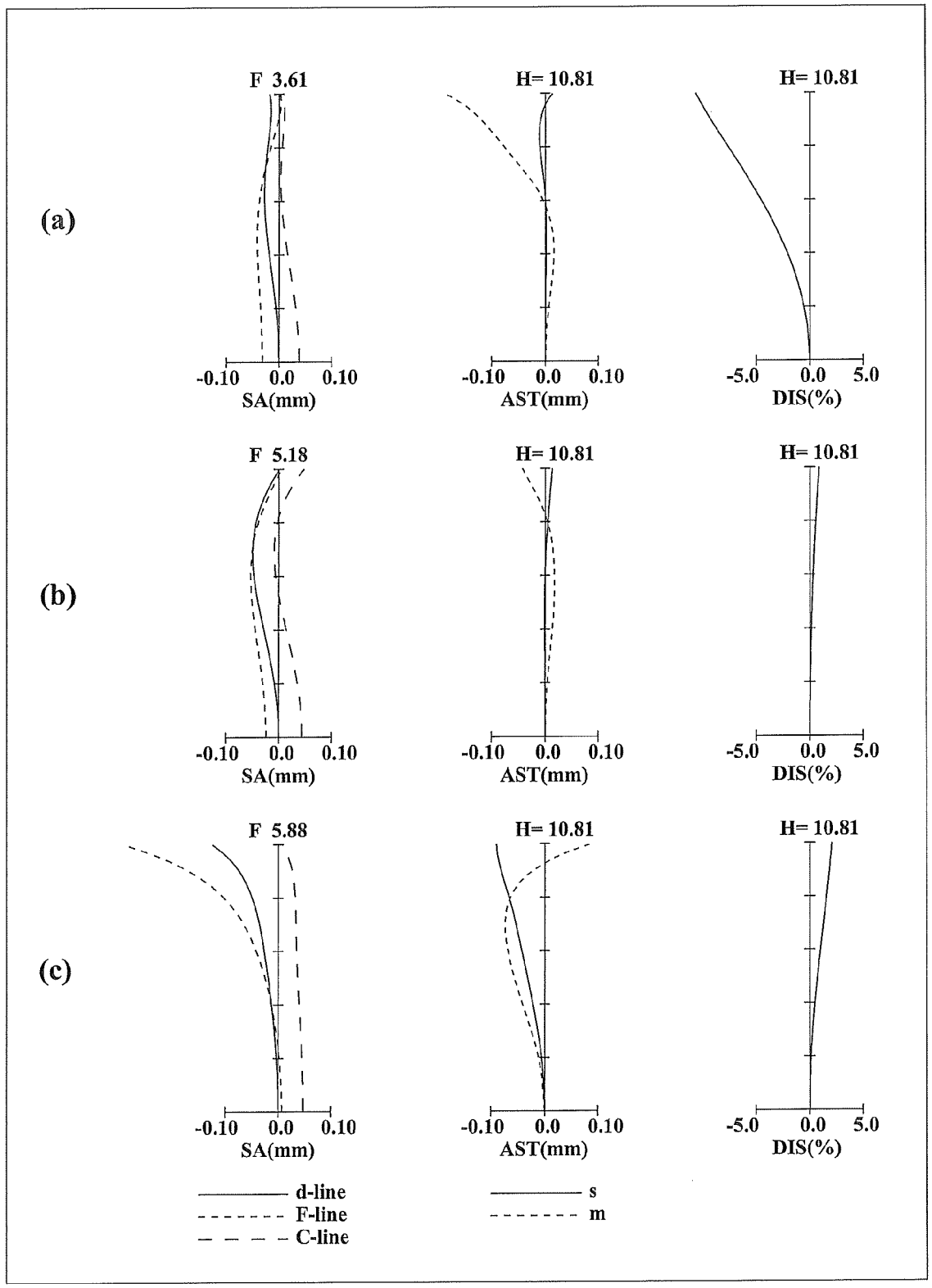
FIG. 31 is a longitudinal aberration diagram of a close-object in-focus condition of a zoom lens system according to Example 8.
Figure 32:
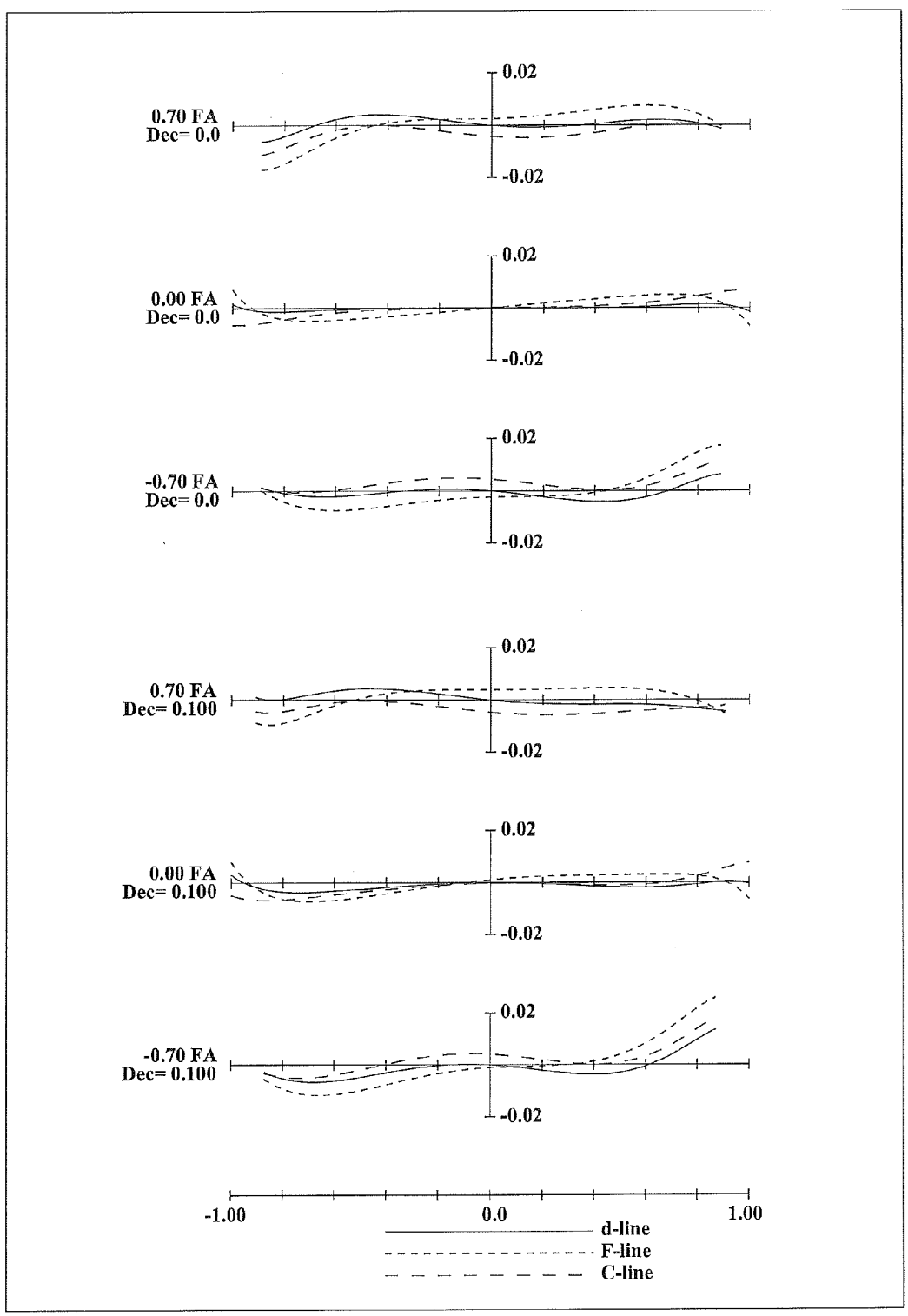
FIG. 32 is a lateral aberration diagram of a zoom lens system according to Example 8 at a telephoto limit in a basic state where image blur compensation is not performed and in an image blur compensation state.

Further, as shown in FIGS. 1 and 5, an aperture diaphragm A is provided on the most object side in the fourth lens unit G4, i.e., on the object side relative to a tenth lens element L10. As shown in FIGS. 9, 13, 33, 37, 41, 45, 49, and 53, an aperture diaphragm A is provided between a seventh lens element L7 and a eighth lens element L8 in the third lens unit G3. As shown in FIGS. 17 and 21, an aperture diaphragm A is provided on the most object-ward end of the third lens unit G3, i.e., on the object side relative to a seventh lens element L7. Further, as shown in FIGS. 25 and 29, an aperture diaphragm A is provided between a eighth lens element L8 and a ninth lens element L9 in the third lens unit G3.

As shown in FIG. 1, in the zoom lens system according to Embodiment 1, the first lens unit G1, in order from the object side to the image side, comprises: a negative-meniscus first lens element L1 with the convex surface facing the object side; a bi-convex second lens element L2; and a positive-meniscus third lens element L3 with the convex surface facing the image side. The first lens element L1, the second lens element L2, and the third lens element L3 are cemented to each other. The third lens element L3 is an aspherical lens element formed of a thin layer of resin or the like, and has an aspheric image-side surface.

In the zoom lens system according to Embodiment 1, the second lens unit G2, in order from the object side to the image side, comprises: a bi-concave fourth lens element L4; a bi-concave fifth lens element L5; and a positive-meniscus sixth lens element L6 with the convex surface facing the object side. Among these, the fifth lens element L5 has an aspheric object-side surface.

In the zoom lens system according to Embodiment 1, the third lens unit G3, in order from the object side to the image side, comprises: a positive-meniscus seventh lens element L7 with the convex surface facing the object side; a negative-meniscus eighth lens element L8 with the convex surface facing the object side; and a positive-meniscus ninth lens element L9 with the convex surface facing the object side. Among these, the eighth lens element L8 and the ninth lens element L9 are cemented to each other. The ninth lens element L9 has an aspheric image-side surface.

In the zoom lens system according to Embodiment 1, the fourth lens unit G4, in order from the object side to the image side, comprises: a bi-convex tenth lens element L10; and a negative-meniscus eleventh lens element L11 with the convex surface facing the image side. The tenth lens element L10 and the eleventh lens element L11 are cemented to each other. The tenth lens element L10 has an aspheric object side surface. Further, an aperture diaphragm A is provided on the object side relative to the tenth lens element L10.

In the zoom lens system according to Embodiment 1, the fifth lens unit G5, in order from the object side to the image side, comprises: a negative-meniscus twelfth lens element L12 with the convex surface facing the object side; a bi-concave thirteenth lens element L13; and a bi-convex fourteenth lens element L14. Among these, the thirteenth lens element L13 and the fourteenth lens element L14 are cemented to each other.

In the zoom lens system according to Embodiment 1, the sixth lens unit G6 comprises solely a bi-convex fifteenth lens element L15. The fifteenth lens element L15 has an aspheric image-side surface.

In the zoom lens system according to Embodiment 1, the tenth lens element L10 and the eleventh lens element L11, which are components of the fourth lens unit G4, correspond to an image blur compensating lens unit described later, which moves in a direction perpendicular to the optical axis in order to optically compensate image blur.

When the zoom lens system according to Embodiment 1 is zoomed from the wide-angle limit to the telephoto limit when a picture is taken, the second lens unit G2 and the fifth lens unit G5 monotonically move toward the system's image-side end, the third lens unit G3 moves with locus of a slight convex to the object-side end, and the first lens unit G1, the fourth lens unit G4 and the sixth lens unit G6 are fixed relative to the image surface S. That is, in zooming, the second lens unit G2, the third lens unit G3, and the fifth lens unit G5 individually move along the optical axis so that the interval between the first lens unit G1 and the second lens unit G2 and the interval between the fourth lens unit G4 and the fifth lens unit G5 increase, the interval between the second lens unit G2 and the third lens unit G3 and the interval between the fifth lens unit G5 and the sixth lens unit G6 decrease, and the interval between the third lens unit G3 and the fourth lens unit G4 varies.

Further, with the zoom lens system according to Embodiment 1, in being focused from an infinity in-focus situation to a close-object in-focus situation, the fifth lens unit G5 as a focusing lens unit moves to the image side along the optical axis in any zooming situation.

As shown in FIG. 5, in the zoom lens system according to Embodiment 2, the first lens unit G1, in order from the object side to the image side, comprises: a negative-meniscus first lens element L1 with the convex surface facing the object side; a bi-convex second lens element L2; and a positive-meniscus third lens element L3 with the convex surface facing the image side. The first lens element L1, the second lens element L2, and the third lens element L3 are cemented to each other. The third lens element L3 is an aspherical lens element formed of a thin layer of resin or the like, and has an aspheric image-side surface.

In the zoom lens system according to Embodiment 2, the second lens unit G2, in order from the object side to the image side, comprises: a bi-concave fourth lens element L4; a bi-concave fifth lens element L5; and a positive-meniscus sixth lens element L6 with the convex surface facing the object side. Among these, the fifth lens element L5 has an aspheric object-side surface.

In the zoom lens system according to Embodiment 2, the third lens unit G3, in order from the object side to the image side, comprises: a positive-meniscus seventh lens element L7 with the convex surface facing the object side; a negative-meniscus eighth lens element L8 with the convex surface facing the object side; and a positive-meniscus ninth lens element L9 with the convex surface facing the object side. Among these, the eighth lens element L8 and the ninth lens element L9 are cemented to each other. The ninth lens element L9 has an aspheric image-side surface.

In the zoom lens system according to Embodiment 2, the fourth lens unit G4, in order from the object side to the image side, comprises: a bi-convex tenth lens element L10; and a negative-meniscus eleventh lens element L11 with the convex surface facing the image side. The tenth lens element L10 and the eleventh lens element L11 are cemented to each other. The tenth lens element L10 has an aspheric object side surface.

Further, an aperture diaphragm A is provided on the object side relative to the tenth lens element L10.

In the zoom lens system according to Embodiment 2, the fifth lens unit G5, in order from the object side to the image side, comprises: a negative-meniscus twelfth lens element L12 with the convex surface facing the object side; a negative-meniscus thirteenth lens element L13 with the convex surface facing the image side; and a positive-meniscus fourteenth lens element L14 with the convex surface facing the image side. Among these, the thirteenth lens element L13 and the fourteenth lens element L14 are cemented to each other.

In the zoom lens system according to Embodiment 2, the sixth lens unit G6 comprises solely a bi-convex fifteenth lens element L15. The fifteenth lens element L15 has an aspheric image-side surface.

In the zoom lens system according to Embodiment 2, the tenth lens element L10 and the eleventh lens element L11, which are components of the fourth lens unit G4, correspond to an image blur compensating lens unit described later, which moves in a direction perpendicular to the optical axis in order to optically compensate image blur.

When the zoom lens system according to Embodiment 2 is zoomed from the wide-angle limit to the telephoto limit when a picture is taken, the second lens unit G2 and the fifth lens unit G5 monotonically move to the image side, the third lens unit G3 moves with locus of a slight convex to the object side, and the first lens unit G1, the fourth lens unit G4 and the sixth lens unit G6 are fixed relative to the image surface S. That is, in zooming, the second lens unit G2, the third lens unit G3, and the fifth lens unit G5 individually move along the optical axis so that the interval between the first lens unit G1 and the second lens unit G2 and the interval between the fourth lens unit G4 and the fifth lens unit G5 increase, the interval between the second lens unit G2 and the third lens unit G3 and the interval between the fifth lens unit G5 and the sixth lens unit G6 decrease, and the interval between the third lens unit G3 and the fourth lens unit G4 varies.

Further, in the zoom lens system according to Embodiment 2, in focusing from an infinity in-focus situation to a close-object in-focus situation, the fifth lens unit G5 as a focusing lens unit moves to the image side along the optical axis in any zooming situation.

Figure 9:
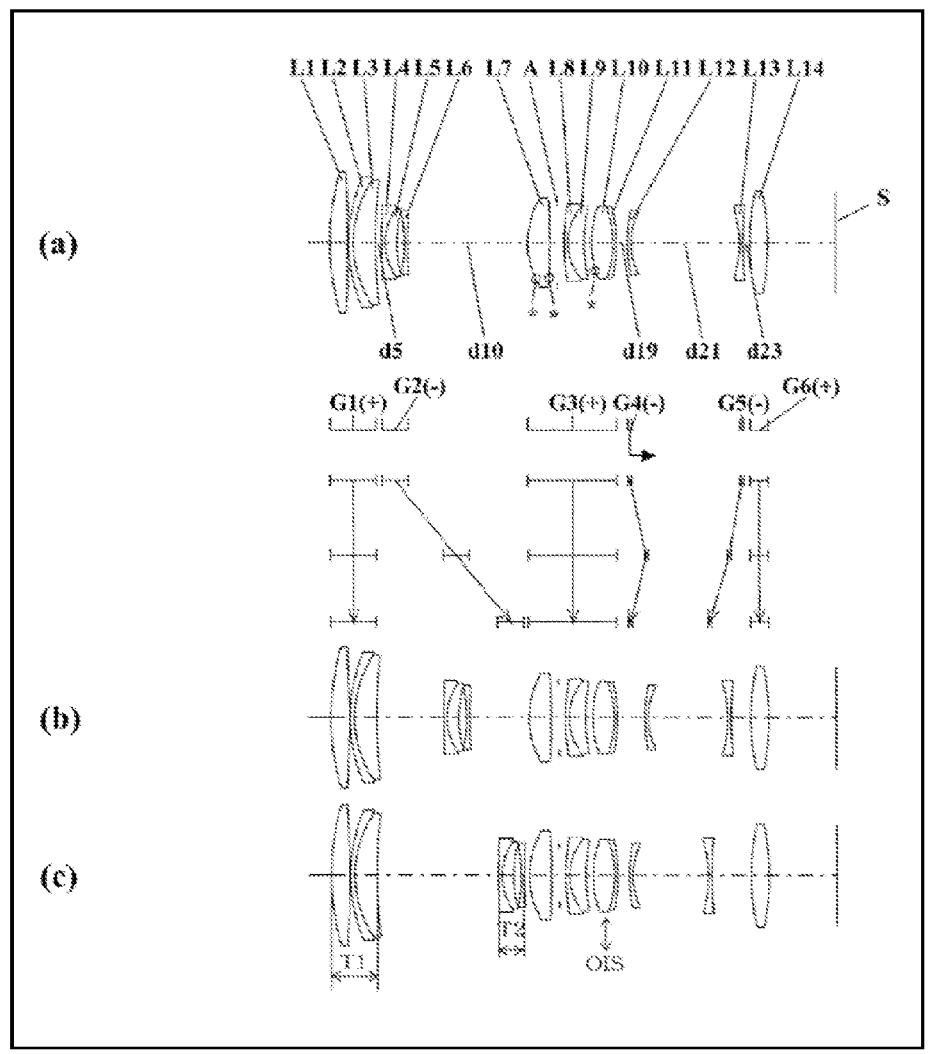
FIG. 9 is a lens arrangement diagram showing an infinity in-focus condition of a zoom lens system according to Embodiment 3 (Example 3)
Figure 10:
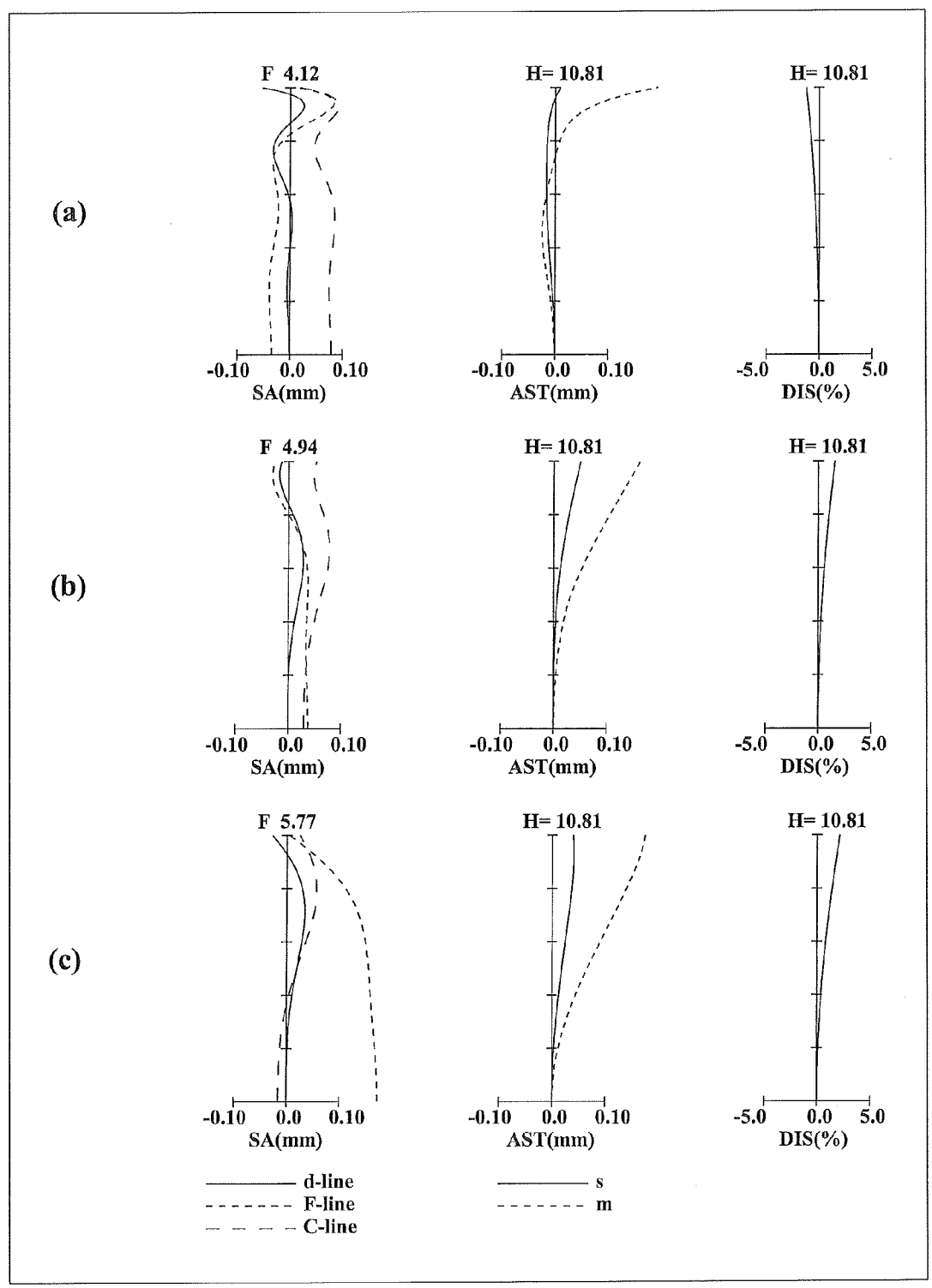
FIG. 10 is a longitudinal aberration diagram showing an infinity in-focus condition of a zoom lens system according to Example 3.
Figure 11:
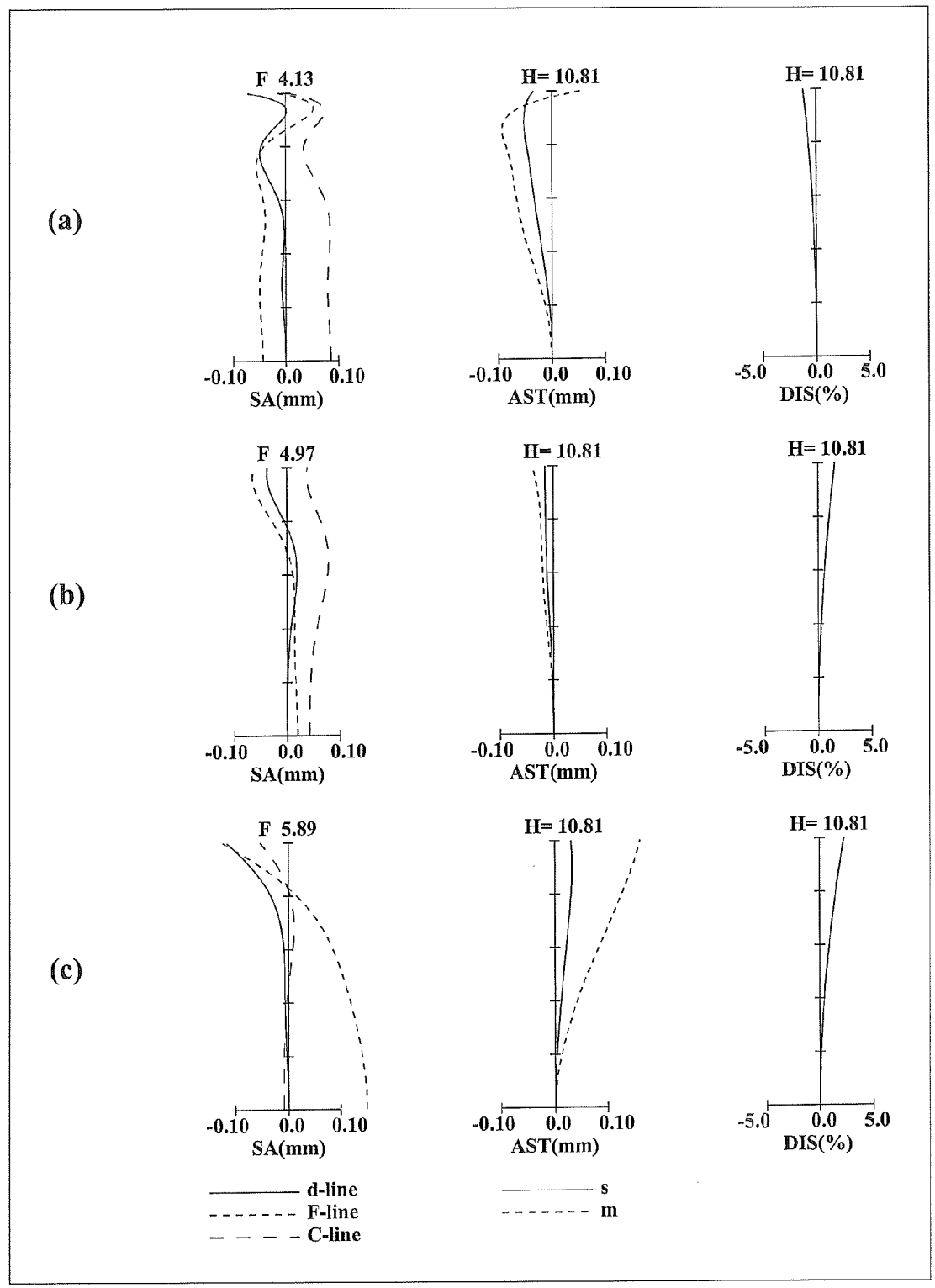
FIG. 11 is a longitudinal aberration diagram of a close-object in-focus condition of a zoom lens system according to Example 3.
Figure 12:
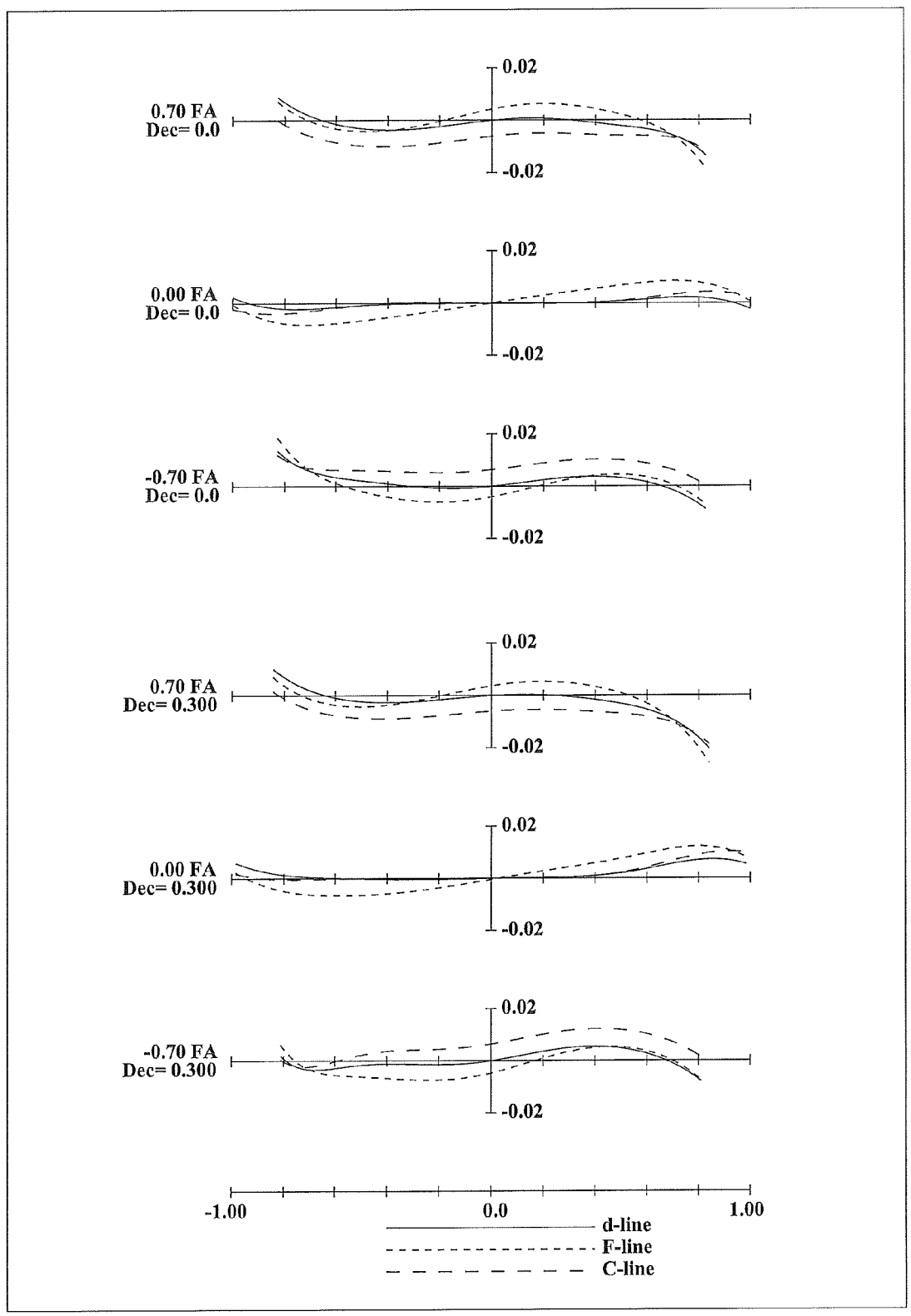
FIG. 12 is a lateral aberration diagram of a zoom lens system according to Example 3 at a telephoto limit in a basic state where image blur compensation is not performed and in an image blur compensation state.

As shown in FIG. 9, in the zoom lens system according to Embodiment 3, the first lens unit G1, in order from the object side to the image side, comprises: a bi-convex first lens element L1; a negative-meniscus second lens element L2 with the convex surface facing the object side; and a positive-meniscus third lens element L3 with the convex surface facing the object side. Among these, the second lens element L2, and the third lens element L3 are cemented to each other.

In the zoom lens system according to Embodiment 3, the second lens unit G2, in order from the object side to the image side, comprises: a negative-meniscus fourth lens element L4 with the convex surface facing the object side; a positive-meniscus fifth lens element L5 with the convex surface facing the object side; and a bi-concave sixth lens element L6. Among these, the fourth lens element L4, and the fifth lens element L5 are cemented to each other.

In the zoom lens system according to Embodiment 3, the third lens unit G3, in order from the object side to the image side, comprises: a bi-convex seventh lens element L7; a negative-meniscus eighth lens element L8 with the convex surface facing the object side; a positive-meniscus ninth lens element L9 with the convex surface facing the object side; a bi-convex tenth lens element L10; and a negative-meniscus eleventh lens element L11 with the convex surface facing the image side. Among these, the eighth lens element L8 and the ninth lens element L9 are cemented to each other, and the tenth lens element L10 and the eleventh lens element L11 are cemented to each other. The seventh lens element L7 has two aspheric surfaces, and the tenth lens element L10 has an aspheric object side surface. Further, an aperture diaphragm A is provided between the seventh lens element L7 and the eighth lens element L8.

In the zoom lens system according to Embodiment 3, the fourth lens unit G4 comprises solely a negative-meniscus twelfth lens element L12 with the convex surface facing the object side.

In the zoom lens system according to Embodiment 3, the fifth lens unit G5 comprises solely a bi-concave thirteenth lens element L13.

In the zoom lens system according to Embodiment 3, the sixth lens unit G6 comprises solely a bi-convex fourteenth lens element L14.

In the zoom lens system according to Embodiment 3, the tenth lens element L10 and the eleventh lens element L11, which are components of the third lens unit G3, correspond to an image blur compensating lens unit described later, which moves in a direction perpendicular to the optical axis in order to optically compensate image blur.

In the zoom lens system according to Embodiment 3, in zooming from a wide-angle limit to a telephoto limit at the time of image taking, the second lens unit G2 monotonically moves to the image side, the fourth lens unit G4 moves with locus of a convex to the image side, the fifth lens unit G5 approximately monotonically moves to the object side, and the first lens unit G1, the third lens unit G3 and the sixth lens unit G6 are fixed relative to the image surface S. That is, in zooming, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 and the interval between the fourth lens unit G4 and the fifth lens unit G5 decrease, and the interval between the third lens unit G3 and the fourth lens unit G4 varies.

Further, in the zoom lens system according to Embodiment 3, in focusing from an infinity in-focus situation to a close-object in-focus situation, the fourth lens unit G4 as a focusing lens unit moves to the image side along the optical axis in any zooming situation.

Figure 13:
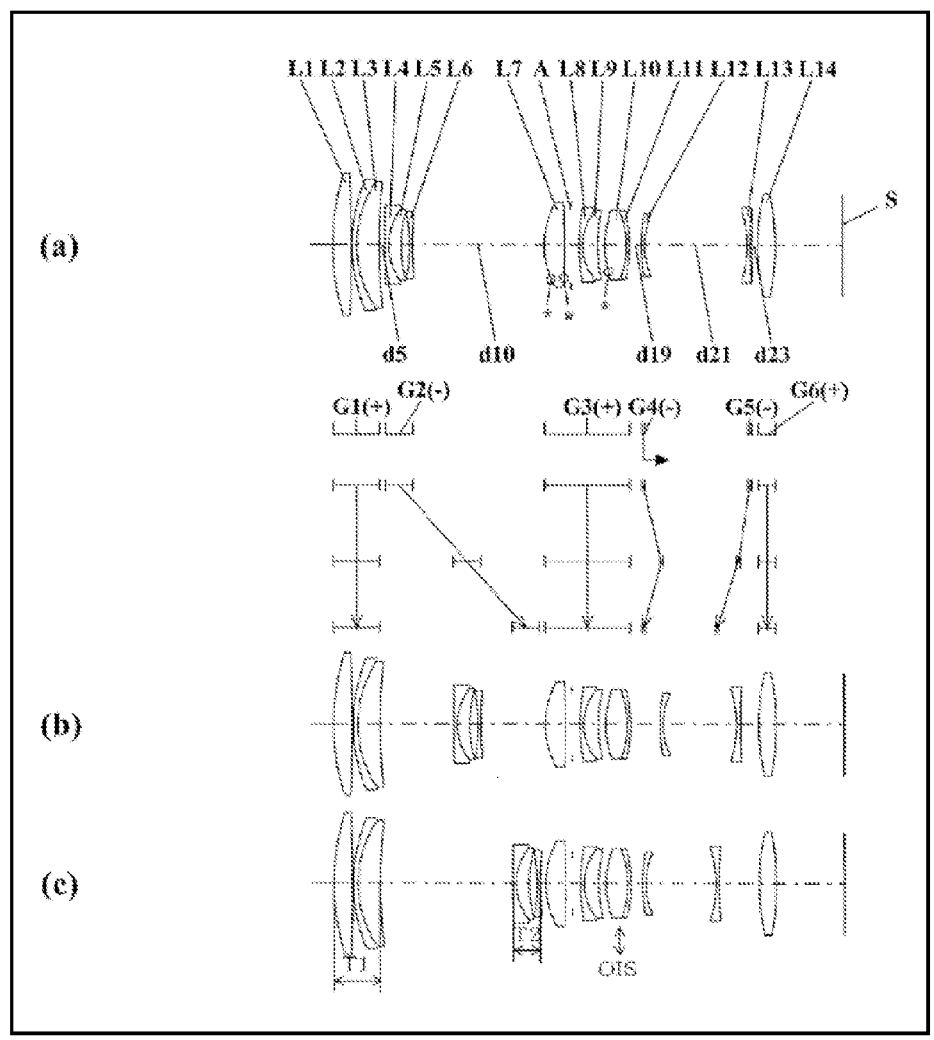
FIG. 13 is a lens arrangement diagram showing an infinity in-focus condition of a zoom lens system according to Embodiment 4 (Example 4)
Figure 14:
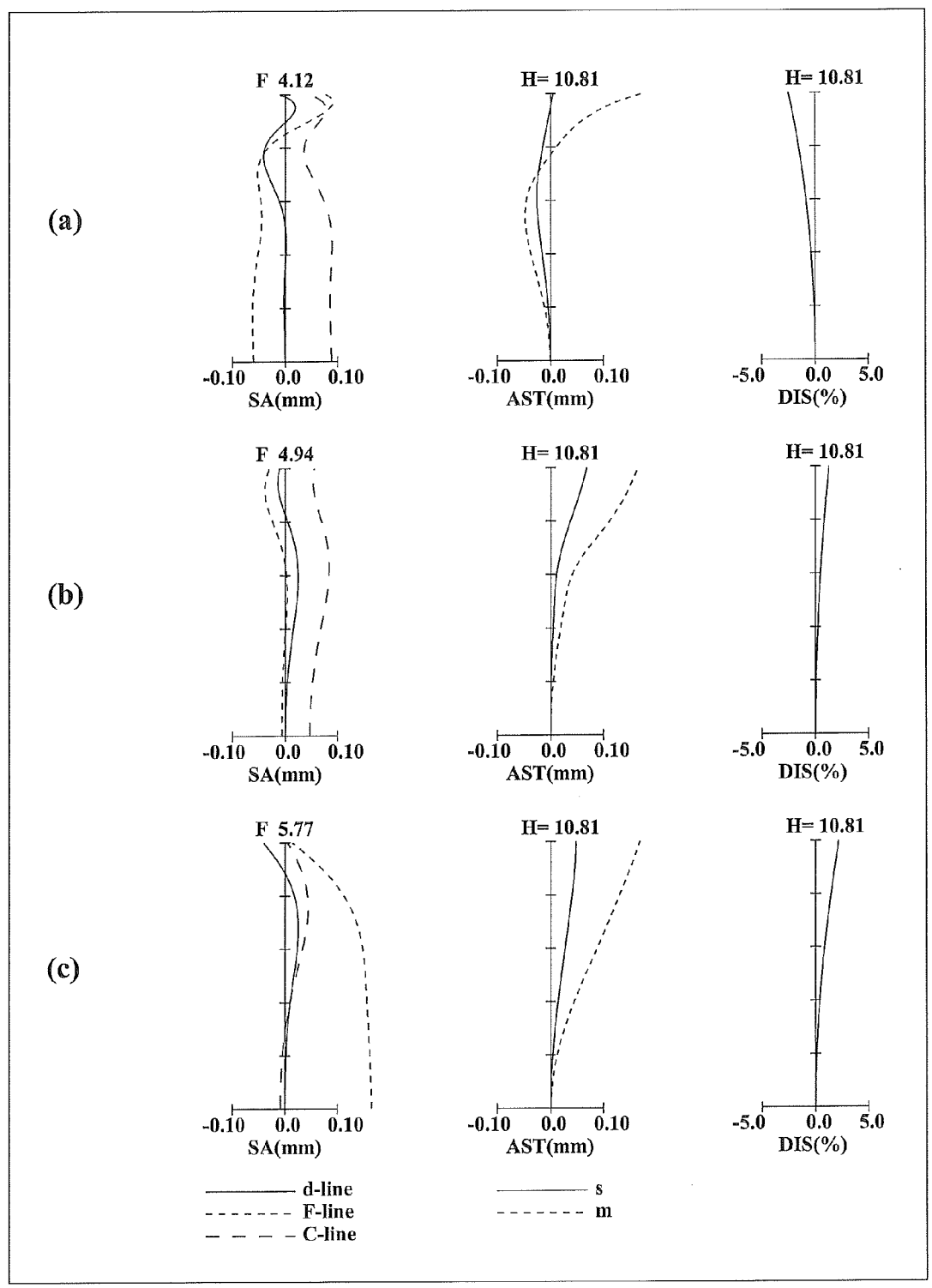
FIG. 14 is a longitudinal aberration diagram showing an infinity in-focus condition of a zoom lens system according to Example 4.
Figure 15:
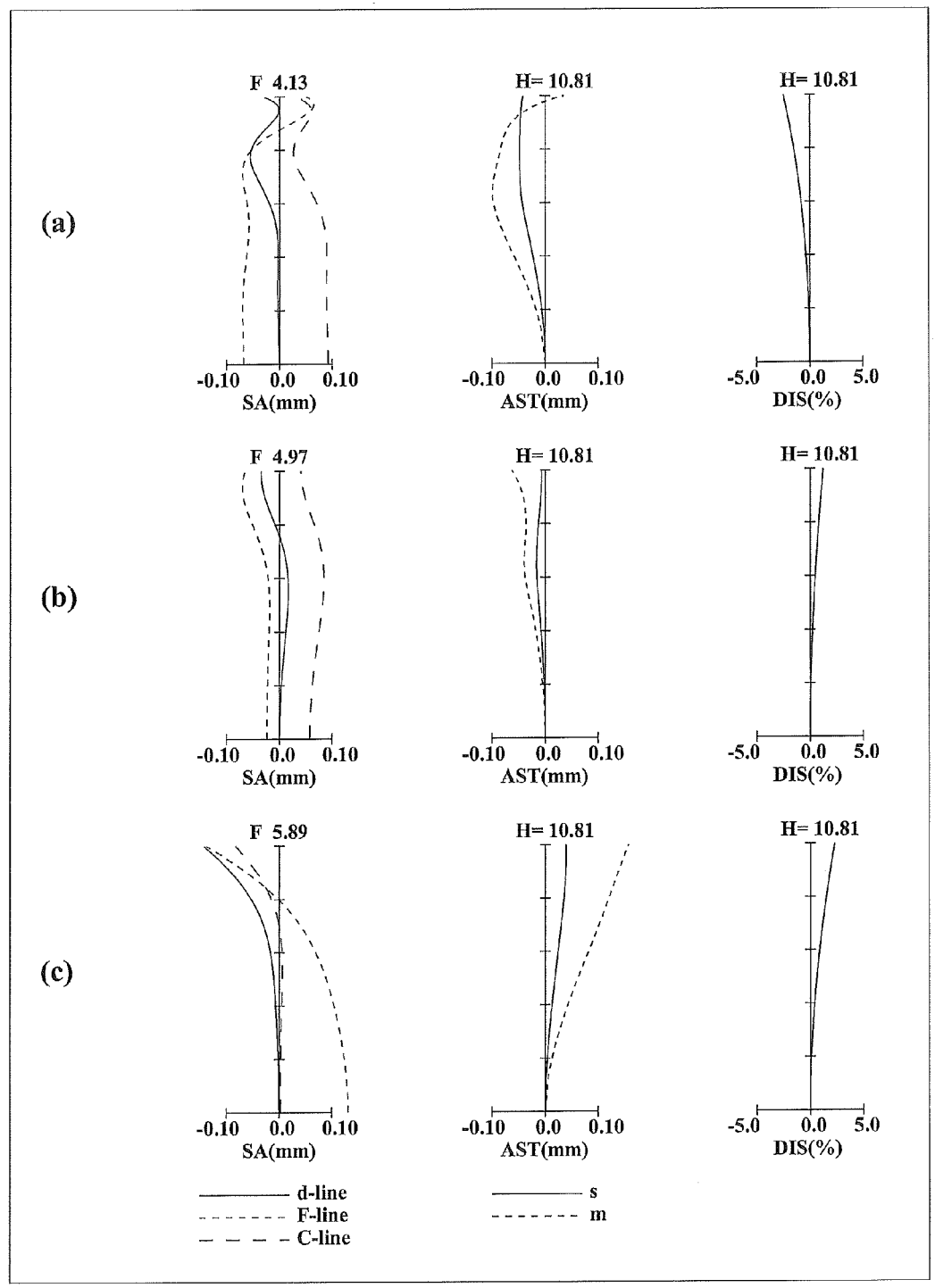
FIG. 15 is a longitudinal aberration diagram of a close-object in-focus condition of a zoom lens system according to Example 4.
Figure 16:
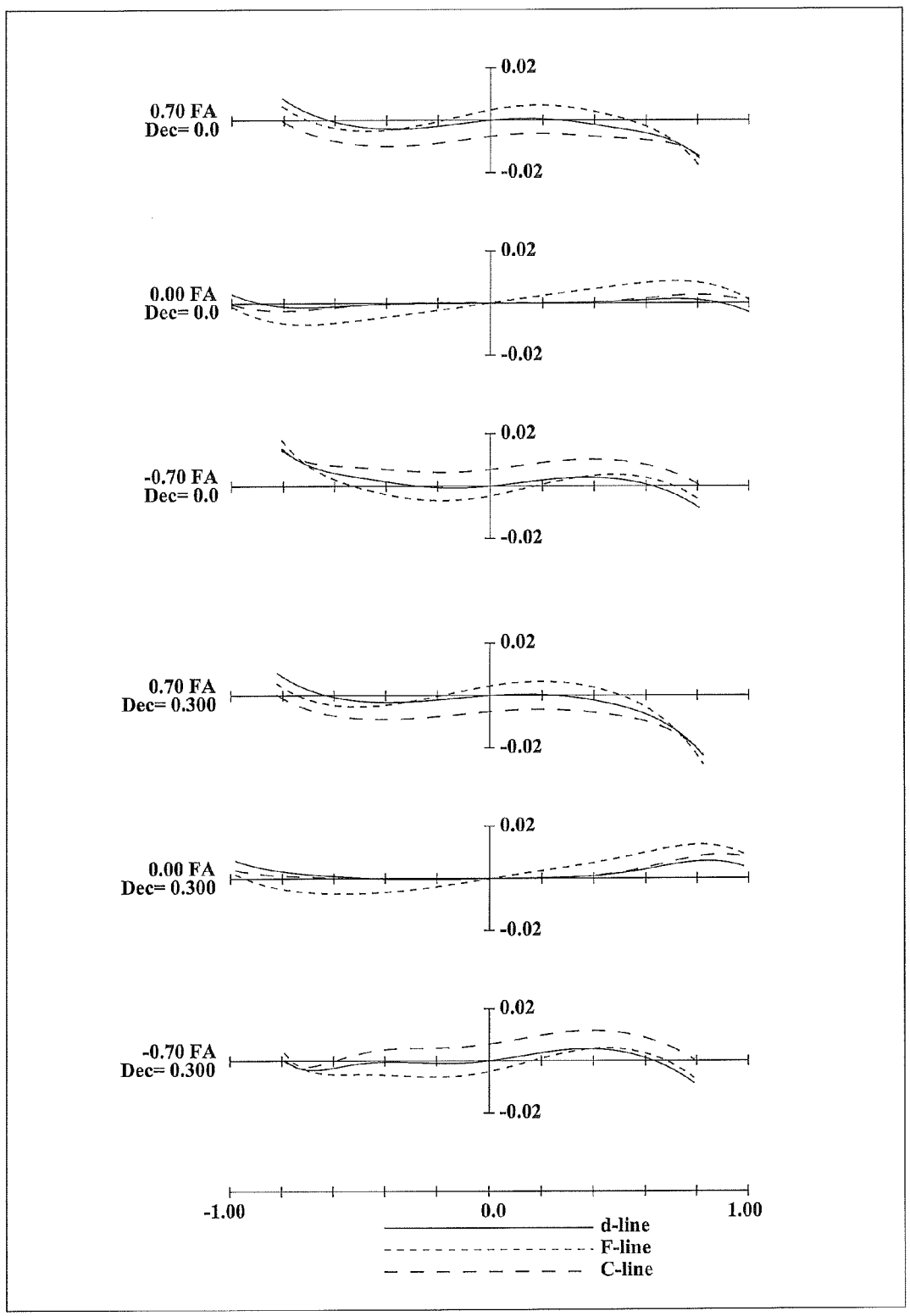
FIG. 16 is a lateral aberration diagram of a zoom lens system according to Example 4 at a telephoto limit in a basic state where image blur compensation is not performed and in an image blur compensation state.

As shown in FIG. 13, in the zoom lens system according to Embodiment 4, the first lens unit G1, in order from the object side to the image side, comprises: a bi-convex first lens element L1; a negative-meniscus second lens element L2 with the convex surface facing the object side; and a positive-meniscus third lens element L3 with the convex surface facing the object side. Among these, the second lens element L2, and the third lens element L3 are cemented to each other.

In the zoom lens system according to Embodiment 4, the second lens unit G2, in order from the object side to the image side, comprises: a negative-meniscus fourth lens element L4 with the convex surface facing the object side; a positive-meniscus fifth lens element L5 with the convex surface facing the object side; and a bi-concave sixth lens element L6. Among these, the fourth lens element L4, and the fifth lens element L5 are cemented to each other.

In the zoom lens system according to Embodiment 4, the third lens unit G3, in order from the object side to the image side, comprises: a bi-convex seventh lens element L7; a negative-meniscus eighth lens element L8 with the convex surface facing the object side; a positive-meniscus ninth lens element L9 with the convex surface facing the object side; a bi-convex tenth lens element L10; and a negative-meniscus eleventh lens element L11 with the convex surface facing the image side. Among these, the eighth lens element L8 and the ninth lens element L9 are cemented to each other, and the tenth lens element L10 and the eleventh lens element L11 are cemented to each other. The seventh lens element L7 has two aspheric surfaces, and the tenth lens element L10 has an aspheric object side surface. Further, an aperture diaphragm A is provided between the seventh lens element L7 and the eighth lens element L8.

In the zoom lens system according to Embodiment 4, the fourth lens unit G4 comprises solely a negative meniscus twelfth lens element L12 with the convex surface facing the object side.

In the zoom lens system according to Embodiment 4, the fifth lens unit G5 comprises solely a bi-concave thirteenth lens element L13.

In the zoom lens system according to Embodiment 4, the sixth lens unit G6 comprises solely a bi-convex fourteenth lens element L14.

In the zoom lens system according to Embodiment 4, the tenth lens element L10 and the eleventh lens element L11, which are components of the third lens unit G3, correspond to an image blur compensating lens unit described later, which moves in a direction perpendicular to the optical axis in order to optically compensate image blur.

In the zoom lens system according to Embodiment 4, in zooming from a wide-angle limit to a telephoto limit at the time of image taking, the second lens unit G2 monotonically moves to the image side, the fourth lens unit G4 moves with locus of a convex to the image side, the fifth lens unit G5 approximately monotonically moves to the object side, and the first lens unit G1, the third lens unit G3 and the sixth lens unit G6 are fixed relative to the image surface S. That is, in zooming, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 and the interval between the fourth lens unit G4 and the fifth lens unit G5 decrease, and the interval between the third lens unit G3 and the fourth lens unit G4 varies.

Further, in the zoom lens system according to Embodiment 4, in focusing from an infinity in-focus situation to a close-object in-focus situation, the fourth lens unit G4 as a focusing lens unit moves to the image side along the optical axis in any zooming situation.

As shown in FIG. 17, in the zoom lens system according to Embodiment 5, the first lens unit G1, in order from the object side to the image side, comprises: a negative-meniscus first lens element L1 with the convex surface facing the object side; a positive-meniscus second lens element L2 with the convex surface facing the object side; and a positive-meniscus third lens element L3 with the convex surface facing the object side. The first lens element L1, the second lens element L2, and the third lens element L3 are cemented to each other. The third lens element L3 is an aspherical lens element formed of a thin layer of resin or the like, and has an aspheric image side surface.

In the zoom lens system according to Embodiment 5, the second lens unit G2, in order from the object side to the image side, comprises: a negative-meniscus fourth lens element L4 with the convex surface facing the object side; a bi-concave fifth lens element L5; and a positive-meniscus sixth lens element L6 with the convex surface facing the object side.

In the zoom lens system according to Embodiment 5, the third lens unit G3, in order from the object side to the image side, comprises: a positive-meniscus seventh lens element L7 with the convex surface facing the object side; a negative-meniscus eighth lens element L8 with the convex surface facing the object side; a positive-meniscus ninth lens element L9 with the convex surface facing the object side; a bi-convex tenth lens element L10; and a negative-meniscus eleventh lens element L11 with the convex surface facing the image side. Among these, the eighth lens element L8 and the ninth lens element L9 are cemented to each other, and the tenth lens element L10 and the eleventh lens element L11 are cemented to each other. The ninth lens element L9 has an aspheric image side surface, and the tenth lens element L10 has an aspheric object side surface. Further, an aperture diaphragm A is provided on the object side relative to the seventh lens element L7.

In the zoom lens system according to Embodiment 5, the fourth lens unit G4 comprises solely a negative-meniscus twelfth lens element L12 with the convex surface facing the object side.

In the zoom lens system according to Embodiment 5, the fifth lens unit G5 comprises solely a bi-convex thirteenth lens element L13. The thirteenth lens element L13 has an aspheric image side surface.

In the zoom lens system according to Embodiment 5, the tenth lens element L10 and the eleventh lens element L11, which are components of the third lens unit G3, correspond to an image blur compensating lens unit described later, which moves in a direction perpendicular to the optical axis in order to optically compensate image blur.

In the zoom lens system according to Embodiment 5, in zooming from a wide-angle limit to a telephoto limit at the time of image taking, the second lens unit G2 monotonically moves to the image side, the third lens unit G3 approximately monotonically moves to the object side, the fourth lens unit G4 moves with locus of a slight convex to the object side, and the first lens unit G1, and the fifth lens unit G5 are fixed relative to the image surface S. That is, in zooming, the second lens unit G2, the third lens unit G3, and the fourth lens unit G4 individually move along the optical axis so that the interval between the first lens unit G1 and the second lens unit G2 and the interval between the third lens unit G3 and the fourth lens unit G4 increase, the interval between the second lens unit G2 and the third lens unit G3 decreases, and the interval between the fourth lens unit G4 and the fifth lens unit G5 varies.

Further, in the zoom lens system according to Embodiment 5, in focusing from an infinity in-focus situation to a close-object in-focus situation, the fourth lens unit G4 as a focusing lens unit moves to the image side along the optical axis in any zooming situation.

As shown in FIG. 21, in the zoom lens system according to Embodiment 6, the first lens unit G1, in order from the object side to the image side, comprises: a negative-meniscus first lens element L1 with the convex surface facing the object side; a positive-meniscus second lens element L2 with the convex surface facing the object side; and a positive-meniscus third lens element L3 with the convex surface facing the object side. The first lens element L1, the second lens element L2, and the third lens element L3 are cemented to each other. The third lens element L3 is an aspherical lens element formed of a thin layer of resin or the like, and has an aspheric image side surface.

In the zoom lens system according to Embodiment 6, the second lens unit G2, in order from the object side to the image side, comprises: a negative-meniscus fourth lens element L4 with the convex surface facing the object side; a bi-concave fifth lens element L5; and a positive-meniscus sixth lens element L6 with the convex surface facing the object side.

In the zoom lens system according to Embodiment 6, the third lens unit G3, in order from the object side to the image side, comprises: a positive-meniscus seventh lens element L7 with the convex surface facing the object side; a negative-meniscus eighth lens element L8 with the convex surface facing the object side; a positive-meniscus ninth lens element L9 with the convex surface facing the object side; a bi-convex tenth lens element L10; and a negative-meniscus eleventh lens element L11 with the convex surface facing the image side. Among these, the eighth lens element L8 and the ninth lens element L9 are cemented to each other, and the tenth lens element L10 and the eleventh lens element L11 are cemented to each other. The ninth lens element L9 has an aspheric image side surface, and the tenth lens element L10 has an aspheric object side surface. Further, an aperture diaphragm A is provided on the object side relative to the seventh lens element L7.

In the zoom lens system according to Embodiment 6, the fourth lens unit G4 comprises solely a negative-meniscus twelfth lens element L12 with the convex surface facing the object side.

In the zoom lens system according to Embodiment 6, the fifth lens unit G5 comprises solely a bi-convex thirteenth lens element L13. The thirteenth lens element L13 has an aspheric image side surface.

In the zoom lens system according to Embodiment 6, the tenth lens element L10 and the eleventh lens element L11, which are components of the third lens unit G3, correspond to an image blur compensating lens unit described later, which moves in a direction perpendicular to the optical axis in order to optically compensate image blur.

In the zoom lens system according to Embodiment 6, in zooming from a wide-angle limit to a telephoto limit at the time of image taking, the second lens unit G2 monotonically moves to the image side, the third lens unit G3 approximately monotonically moves to the object side, the fourth lens unit G4 moves with locus of a slight convex to the object side, and the first lens unit G1, and the fifth lens unit G5 are fixed relative to the image surface S. That is, in zooming, the second lens unit G2, the third lens unit G3, and the fourth lens unit G4 individually move along the optical axis so that the interval between the first lens unit G1 and the second lens unit G2 and the interval between the third lens unit G3 and the fourth lens unit G4 increase, the interval between the second lens unit G2 and the third lens unit G3 decreases, and the interval between the fourth lens unit G4 and the fifth lens unit G5 varies.

Further, in the zoom lens system according to Embodiment 6, in focusing from an infinity in-focus situation to a close-object in-focus situation, the fourth lens unit G4 as a focusing lens unit moves to the image side along the optical axis in any zooming situation.

As shown in FIG. 25, in the zoom lens system according to Embodiment 7, the first lens unit G1, in order from the object side to the image side, comprises: a negative-meniscus first lens element L1 with the convex surface facing the object side; and a positive-meniscus second lens element L2 with the convex surface facing the object side. The first lens element L1 and the second lens element L2 are cemented to each other. The second lens element L2 has an aspheric image side surface.

In the zoom lens system according to Embodiment 7, the second lens unit G2, in order from the object side to the image side, comprises: a negative-meniscus third lens element L3 with the convex surface facing the object side; a bi-concave fourth lens element L4; and a positive-meniscus fifth lens element L5 with the convex surface facing the object side. The fourth lens element L4 has an aspheric object side surface.

In the zoom lens system according to Embodiment 7, the third lens unit G3, in order from the object side to the image side, comprises: a positive-meniscus sixth lens element L6 with the convex surface facing the object side; a negative-meniscus seventh lens element L7 with the convex surface facing the object side; a positive-meniscus eighth lens element L8 with the convex surface facing the object side; a bi-convex ninth lens element L9; and a negative-meniscus tenth lens element L10 with the convex surface facing the image side. Among these, the seventh lens element L7 and the eighth lens element L8 are cemented to each other, and the ninth lens element L9 and the tenth lens element L10 are cemented to each other. The eighth lens element L8 has an aspheric image side surface, and the ninth lens element L9 has an aspheric object side surface. Further, an aperture diaphragm A is provided between the eighth lens element L8 and the ninth lens element L9.

In the zoom lens system according to Embodiment 7, the fourth lens unit G4, in order from the object side to the image side, comprises: a negative-meniscus eleventh lens element L11 with the convex surface facing the object side; and a negative-meniscus twelfth lens element L12 with the convex surface facing the image side.

In the zoom lens system according to Embodiment 7, the fifth lens unit G5 comprises solely a bi-convex thirteenth lens element L13. The thirteenth lens element L13 has an aspheric image side surface.

In the zoom lens system according to Embodiment 7, the ninth lens element L9 and the tenth lens element L10, which are components of the third lens unit G3, correspond to an image blur compensating lens unit described later, which moves in a direction perpendicular to the optical axis in order to optically compensate image blur.

In the zoom lens system according to Embodiment 7, in zooming from a wide-angle limit to a telephoto limit at the time of image taking, the first lens unit G1 monotonically moves to the object side, the second lens unit G2, the third lens unit G3 and the fourth lens unit G4 approximately monotonically move to the object side, and the fifth lens unit G5 is fixed relative to the image surface S. That is, in zooming, the first lens unit G1, the second lens unit G2, the third lens unit G3, and the fourth lens unit G4 individually move along the optical axis so that the interval between the first lens unit G1 and the second lens unit G2, the interval between the third lens unit G3 and the fourth lens unit G4 and the interval between the fourth lens unit G4 and the fifth lens unit G5 increase, and the interval between the second lens unit G2 and the third lens unit G3 decreases.

Further, in the zoom lens system according to Embodiment 7, in focusing from an infinity in-focus situation to a close-object in-focus situation, the fourth lens unit G4 as a focusing lens unit moves to the image side along the optical axis in any zooming situation.

As shown in FIG. 29, in the zoom lens system according to Embodiment 8, the first lens unit G1, in order from the object side to the image side, comprises: a negative-meniscus first lens element L1 with the convex surface facing the object side; and a positive-meniscus second lens element L2 with the convex surface facing the object side. The first lens element L1 and the second lens element L2 are cemented to each other. The second lens element L2 has an aspheric image side surface.

In the zoom lens system according to Embodiment 8, the second lens unit G2, in order from the object side to the image side, comprises: a bi-concave third lens element L3; a bi-concave fourth lens element L4; and a positive-meniscus fifth lens element L5 with the convex surface facing the object side. The fourth lens element L4 has an aspheric object side surface.

In the zoom lens system according to Embodiment 8, the third lens unit G3, in order from the object side to the image side, comprises: a positive-meniscus sixth lens element L6 with the convex surface facing the object side; a negative-meniscus seventh lens element L7 with the convex surface facing the object side; a positive-meniscus eighth lens element L8 with the convex surface facing the object side; a bi-convex ninth lens element L9; and a negative-meniscus tenth lens element L10 with the convex surface facing the image side. Among these, the seventh lens element L7 and the eighth lens element L8 are cemented to each other, and the ninth lens element L9 and the tenth lens element L10 are cemented to each other. The eighth lens element L8 has an aspheric image side surface, and the ninth lens element L9 has an aspheric object side surface. Further, an aperture diaphragm A is provided between the eighth lens element L8 and the ninth lens element L9.

In the zoom lens system according to Embodiment 8, the fourth lens unit G4, in order from the object side to the image side, comprises: a negative-meniscus eleventh lens element L11 with the convex surface facing the object side; and a negative-meniscus twelfth lens element L12 with the convex surface facing the image side.

In the zoom lens system according to Embodiment 8, the fifth lens unit G5 comprises solely a bi-convex thirteenth lens element L13. The thirteenth lens element L13 has an aspheric image side surface.

In the zoom lens system according to Embodiment 8, the ninth lens element L9 and the tenth lens element L10, which are components of the third lens unit G3, correspond to an image blur compensating lens unit described later, which moves in a direction perpendicular to the optical axis in order to optically compensate image blur.

In the zoom lens system according to Embodiment 8, in zooming from a wide-angle limit to a telephoto limit at the time of image taking, the first lens unit G1 monotonically moves to the object side, the second lens unit G2, the third lens unit G3 and the fourth lens unit G4 approximately monotonically move to the object side, and the fifth lens unit G5 is fixed relative to the image surface S. That is, in zooming, the first lens unit G1, the second lens unit G2, the third lens unit G3, and the fourth lens unit G4 individually move along the optical axis so that the interval between the first lens unit G1 and the second lens unit G2, the interval between the third lens unit G3 and the fourth lens unit G4 and the interval between the fourth lens unit G4 and the fifth lens unit G5 increase, and the interval between the second lens unit G2 and the third lens unit G3 decreases.

Further, in the zoom lens system according to Embodiment 8, in focusing from an infinity in-focus situation to a close-object in-focus situation, the fourth lens unit G4 as a focusing lens unit moves to the image side along the optical axis in any zooming situation.

Figure 33:
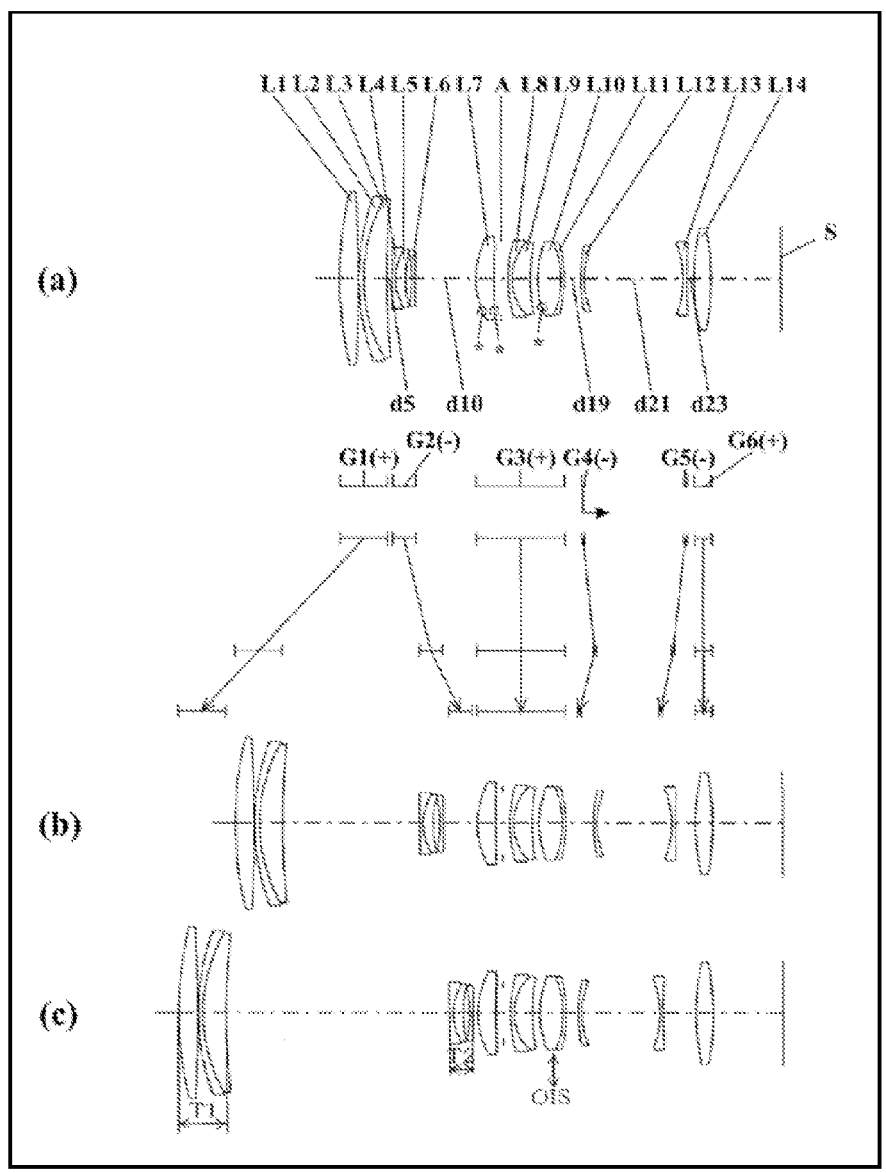
FIG. 33 is a lens arrangement diagram showing an infinity in-focus condition of a zoom lens system according to Embodiment 9 (Example 9)
Figure 34:
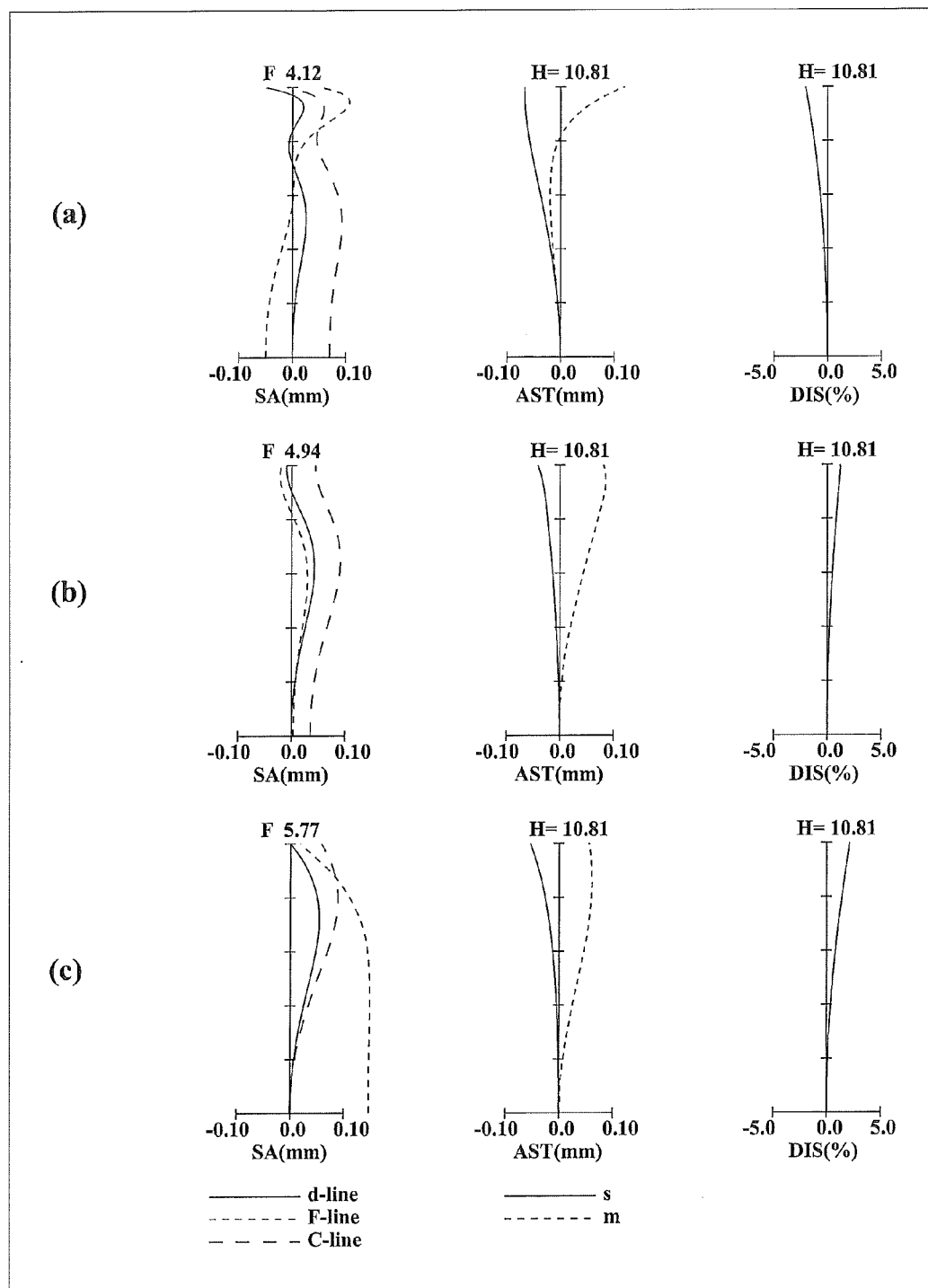
FIG. 34 is a longitudinal aberration diagram of an infinity in-focus condition of a zoom lens system according to Example 9.
Figure 35:
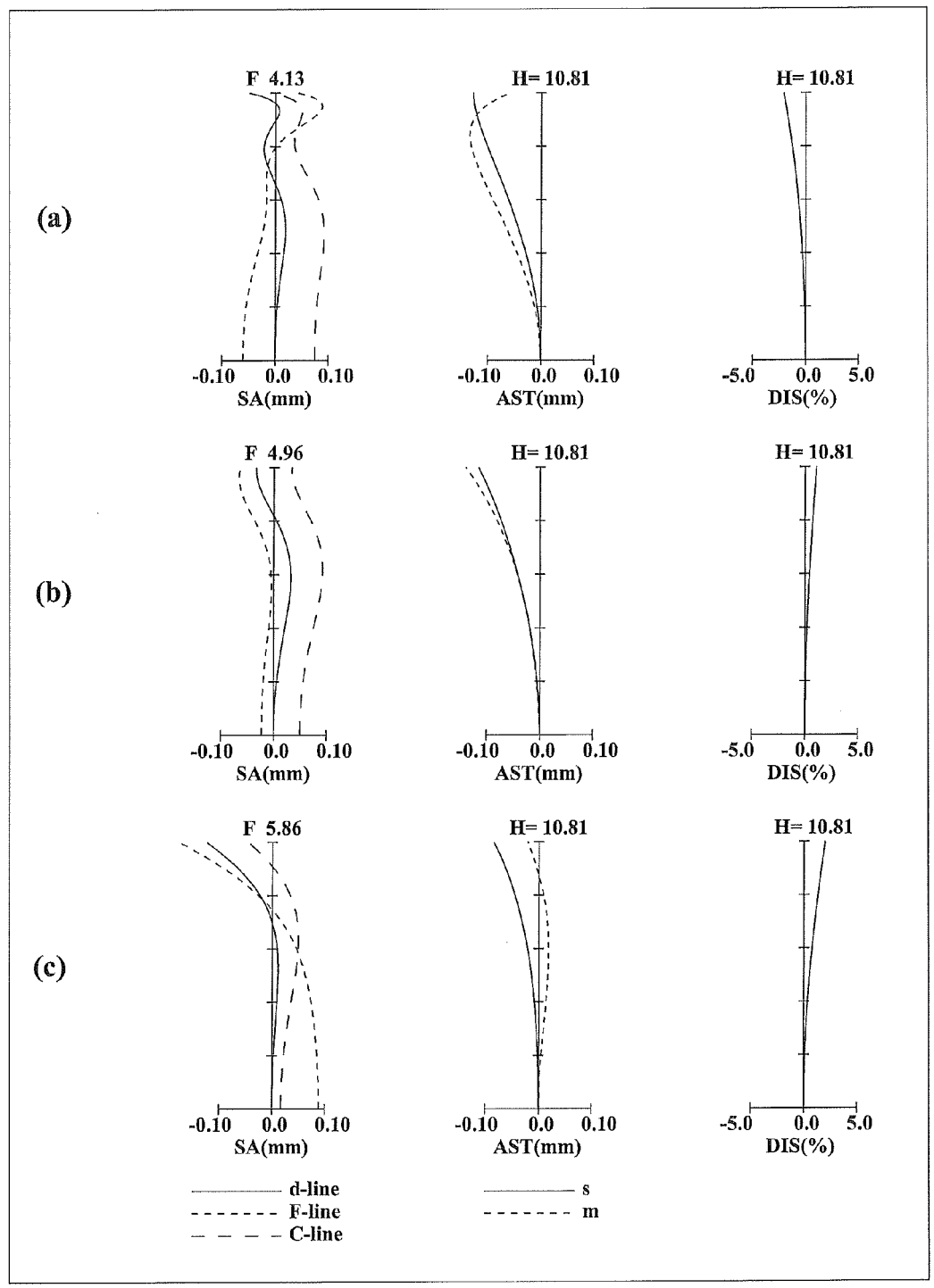
FIG. 35 is a longitudinal aberration diagram of a close-object in-focus condition of a zoom lens system according to Example 9.
Figure 36:
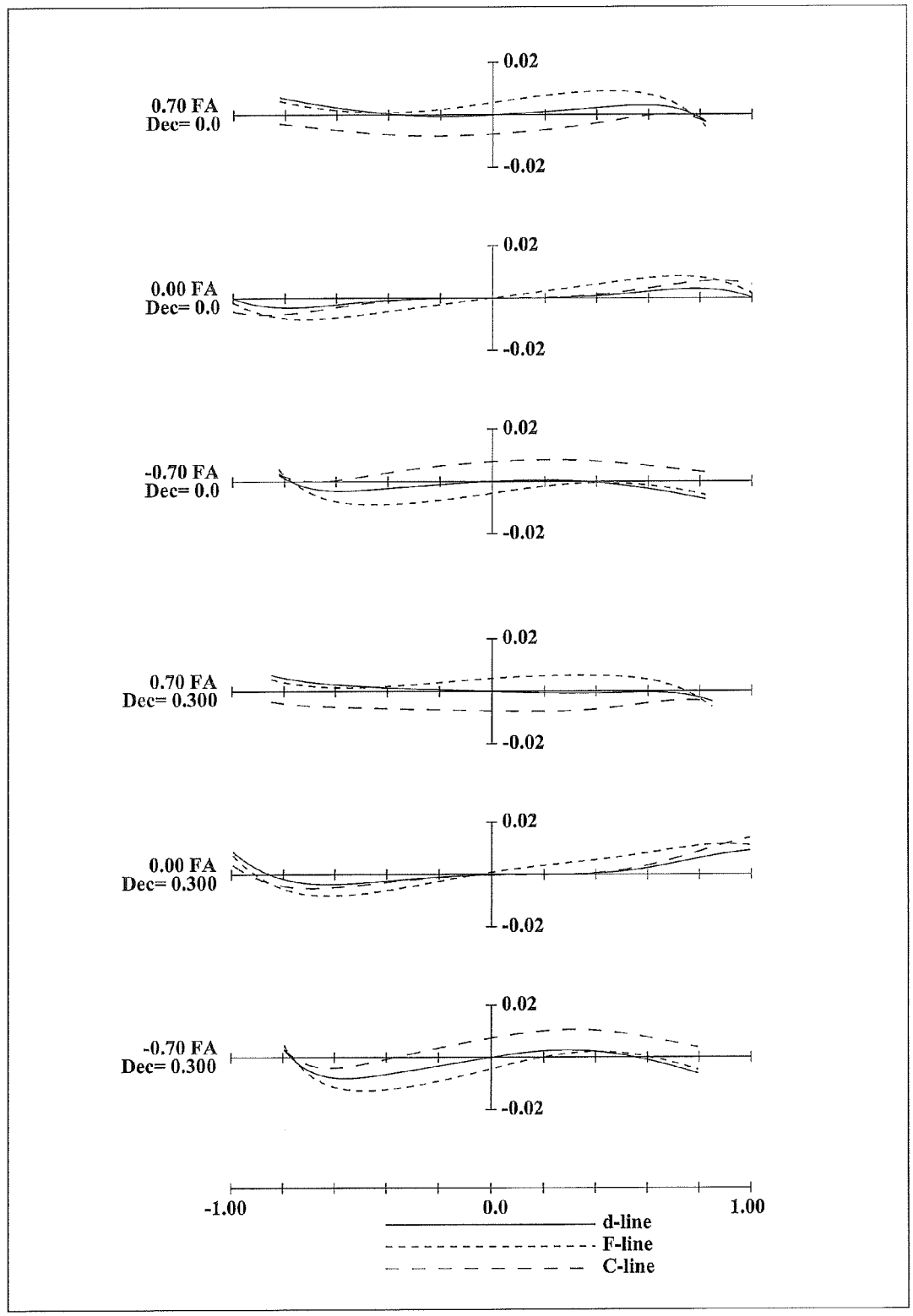
FIG. 36 is a lateral aberration diagram of a zoom lens system according to Example 9 at a telephoto limit in a basic state where image blur compensation is not performed and in an image blur compensation state.

As shown in FIG. 33, in the zoom lens system according to Embodiment 9, the first lens unit G1, in order from the object side to the image side, comprises: a bi-convex first lens element L1; a negative-meniscus second lens element L2 with the convex surface facing the object side; and a positive-meniscus third lens element L3 with the convex surface facing the object side. Among these, the second lens element L2, and the third lens element L3 are cemented to each other.

In the zoom lens system according to Embodiment 9, the second lens unit G2, in order from the object side to the image side, comprises: a bi-concave fourth lens element L4; a positive-meniscus fifth lens element L5 with the convex surface facing the object side; and a bi-concave sixth lens element L6. Among these, the fourth lens element L4, and the fifth lens element L5 are cemented to each other.

In the zoom lens system according to Embodiment 9, the third lens unit G3, in order from the object side to the image side, comprises: a positive-meniscus seventh lens element L7 with the convex surface facing the object side; a negative-meniscus eighth lens element L8 with the convex surface facing the object side; a positive-meniscus ninth lens element L9 with the convex surface facing the object side; a bi-convex tenth lens element L10; and a negative-meniscus eleventh lens element L11 with the convex surface facing the image side. Among these, the eighth lens element L8 and the ninth lens element L9 are cemented to each other, and the tenth lens element L10 and the eleventh lens element L11 are cemented to each other. The seventh lens element L7 has two aspheric surfaces, and the tenth lens element L10 has an aspheric object side surface. Further, an aperture diaphragm A is provided between the seventh lens element L7 and the eighth lens element L8.

In the zoom lens system according to Embodiment 9, the fourth lens unit G4 comprises solely a negative-meniscus twelfth lens element L12 with the convex surface facing the object side.

In the zoom lens system according to Embodiment 9, the fifth lens unit G5 comprises solely a bi-concave thirteenth lens element L13.

In the zoom lens system according to Embodiment 9, the sixth lens unit G6 comprises solely a bi-convex fourteenth lens element L14.

In the zoom lens system according to Embodiment 9, the tenth lens element L10 and the eleventh lens element L11, which are components of the third lens unit G3, correspond to an image blur compensating lens unit described later, which moves in a direction perpendicular to the optical axis in order to optically compensate image blur.

In the zoom lens system according to Embodiment 9, in zooming from a wide-angle limit to a telephoto limit at the time of image taking, the first lens unit G1 monotonically moves to the object side, the second lens unit G2 approximately monotonically moves to the image side, the fourth lens unit G4 moves with locus of a convex to the image side, the fifth lens unit G5 approximately monotonically moves to the object side, and the third lens unit G3 and the sixth lens unit G6 are fixed relative to the image surface S. That is, in zooming, the first lens unit G1, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 decreases, and the interval between the third lens unit G3 and the fourth lens unit G4 and the interval between the fourth lens unit G4 and the fifth lens unit G5 vary.

Further, in the zoom lens system according to Embodiment 9, in focusing from an infinity in-focus situation to a close-object in-focus situation, the fourth lens unit G4 as a focusing lens unit moves to the image side along the optical axis in any zooming situation.

Figure 37:
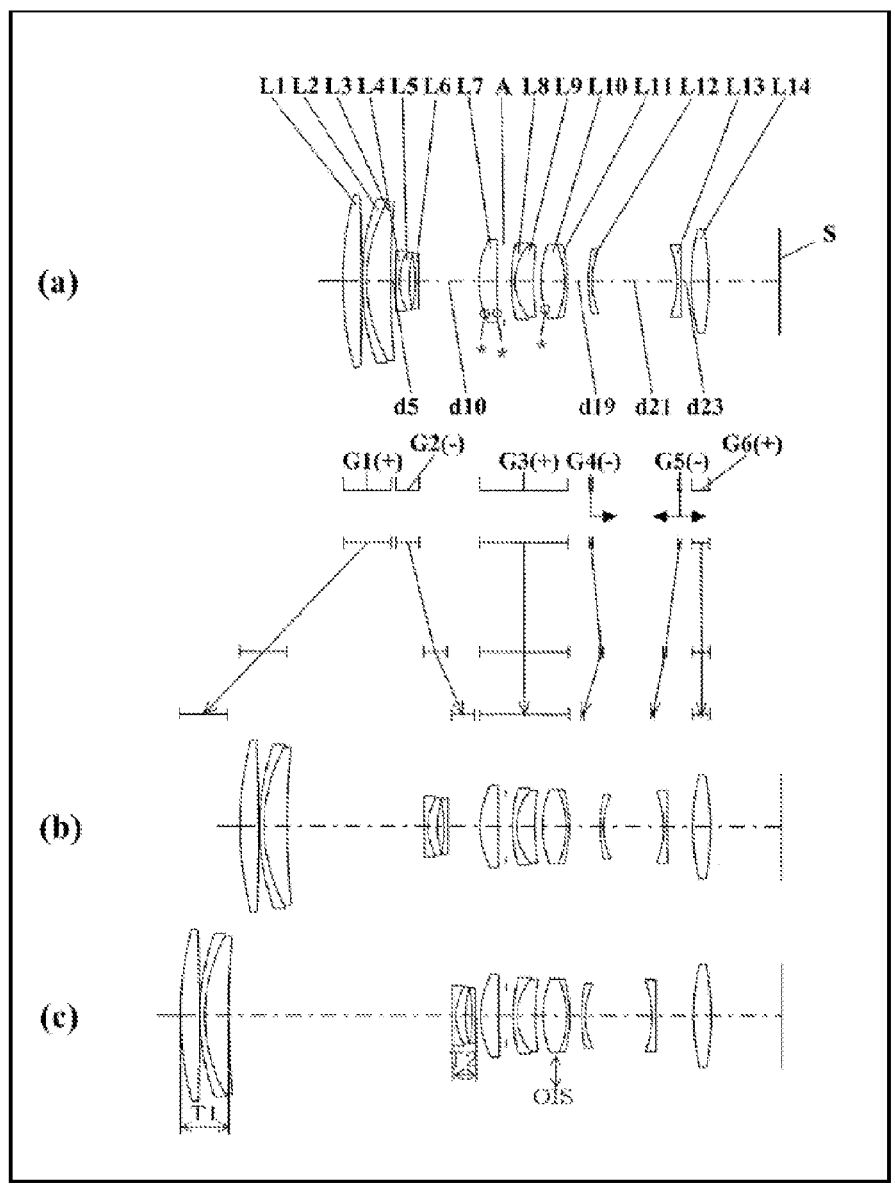
FIG. 37 is a lens arrangement diagram showing an infinity in-focus condition of a zoom lens system according to Embodiment 10 (Example 10)
Figure 38:
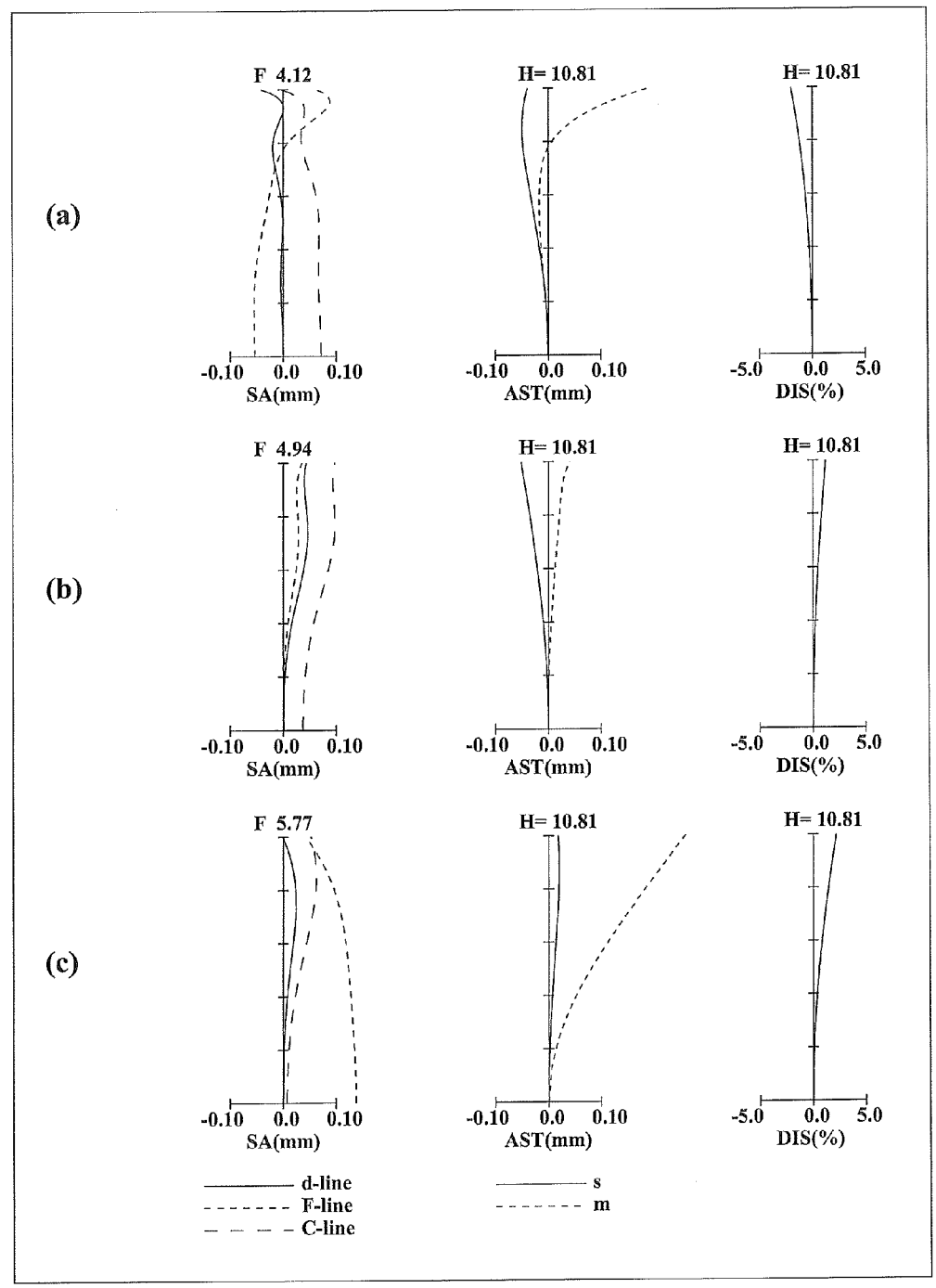
FIG. 38 is a longitudinal aberration diagram of an infinity in-focus condition of a zoom lens system according to Example 10.
Figure 39:
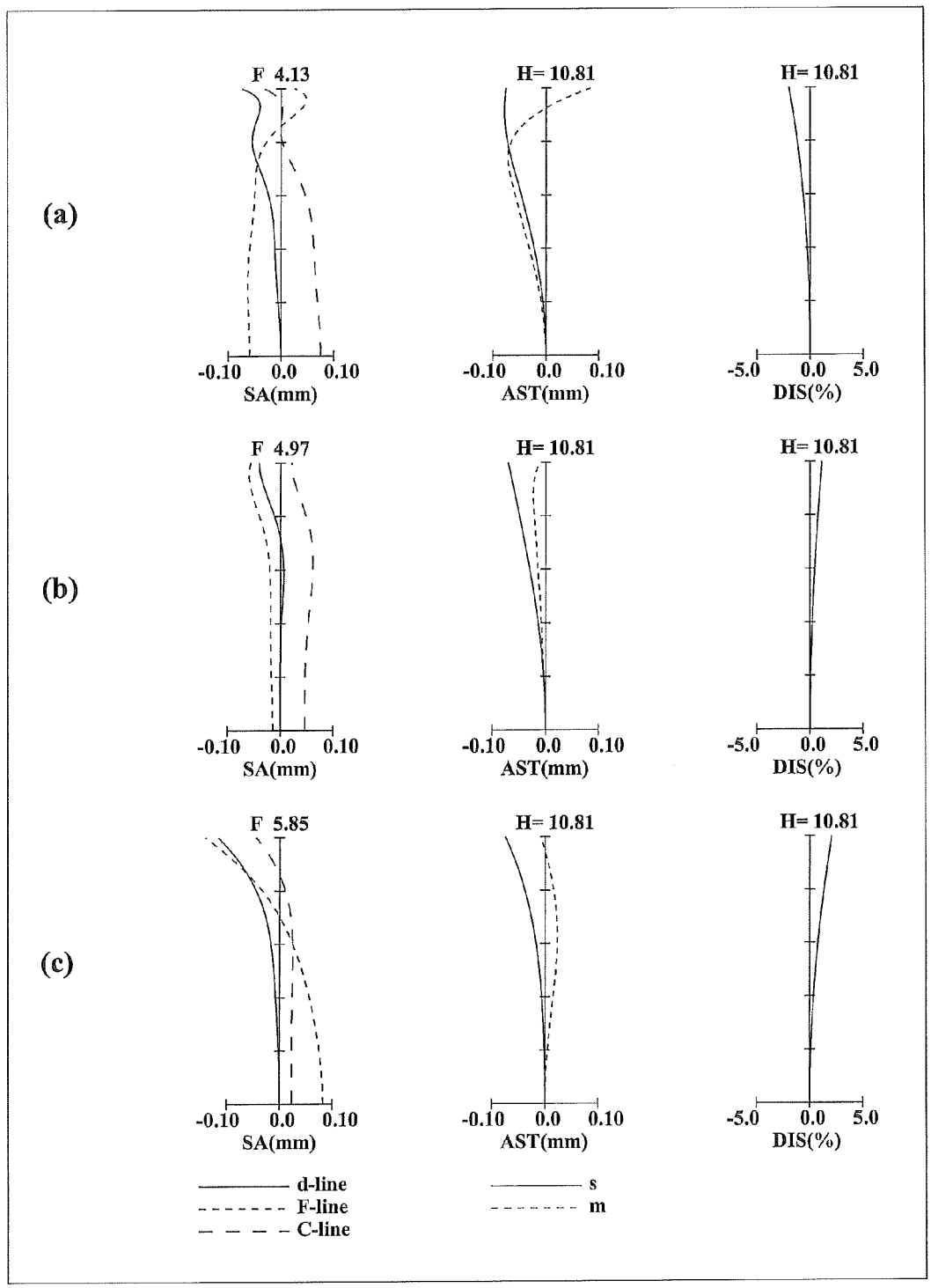
FIG. 39 is a longitudinal aberration diagram of a close-object in-focus condition of a zoom lens system according to Example 10.
Figure 40:
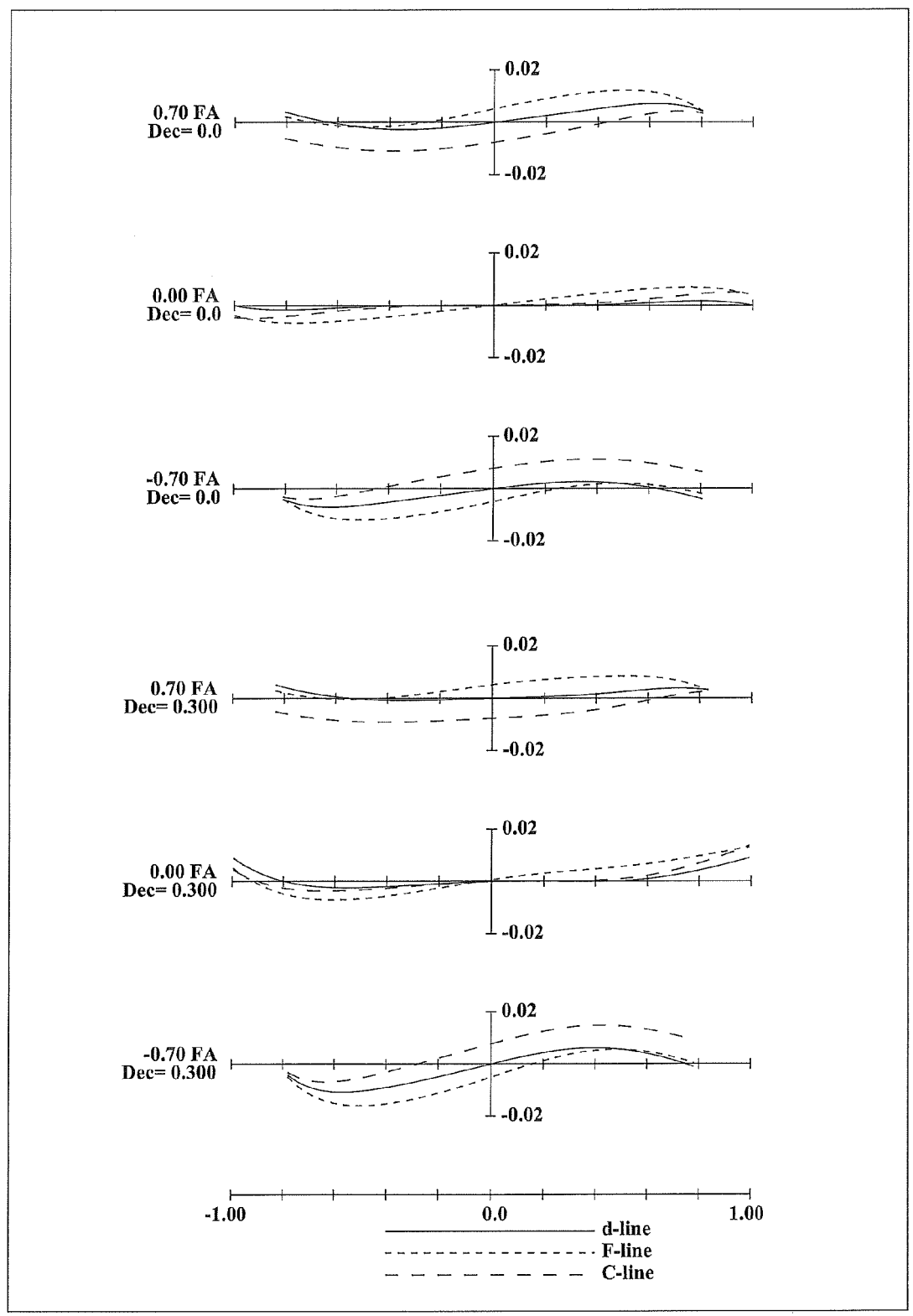
FIG. 40 is a lateral aberration diagram of a zoom lens system according to Example 10 at a telephoto limit in a basic state where image blur compensation is not performed and in an image blur compensation state.

As shown in FIG. 37, in the zoom lens system according to Embodiment 10, the first lens unit G1, in order from the object side to the image side, comprises: a bi-convex first lens element L1; a negative-meniscus second lens element L2 with the convex surface facing the object side; and a positive-meniscus third lens element L3 with the convex surface facing the object side. Among these, the second lens element L2, and the third lens element L3 are cemented to each other.

In the zoom lens system according to Embodiment 10, the second lens unit G2, in order from the object side to the image side, comprises: a negative-meniscus fourth lens element L4 with the convex surface facing the object side; a positive-meniscus fifth lens element L5 with the convex surface facing the object side; and a bi-concave sixth lens element L6. Among these, the fourth lens element L4, and the fifth lens element L5 are cemented to each other.

In the zoom lens system according to Embodiment 10, the third lens unit G3, in order from the object side to the image side, comprises: a positive-meniscus seventh lens element L7 with the convex surface facing the object side; a negative-meniscus eighth lens element L8 with the convex surface facing the object side; a positive-meniscus ninth lens element L9 with the convex surface facing the object side; a bi-convex tenth lens element L10; and a negative-meniscus eleventh lens element L11 with the convex surface facing the image side. Among these, the eighth lens element L8 and the ninth lens element L9 are cemented to each other, and the tenth lens element L10 and the eleventh lens element L11 are cemented to each other. The seventh lens element L7 has two aspheric surfaces, and the tenth lens element L10 has an aspheric object side surface. Further, an aperture diaphragm A is provided between the seventh lens element L7 and the eighth lens element L8.

In the zoom lens system according to Embodiment 10, the fourth lens unit G4 comprises solely a negative-meniscus twelfth lens element L12 with the convex surface facing the object side.

In the zoom lens system according to Embodiment 10, the fifth lens unit G5 comprises solely a bi-concave thirteenth lens element L13.

In the zoom lens system according to Embodiment 10, the sixth lens unit G6 comprises solely a bi-convex fourteenth lens element L14.

In the zoom lens system according to Embodiment 10, the tenth lens element L10 and the eleventh lens element L11, which are components of the third lens unit G3, correspond to an image blur compensating lens unit described later, which moves in a direction perpendicular to the optical axis in order to optically compensate image blur.

In the zoom lens system according to Embodiment 10, in zooming from a wide-angle limit to a telephoto limit at the time of image taking, the first lens unit G1 monotonically moves to the object side, the second lens unit G2 approximately monotonically moves to the image side, the fourth lens unit G4 moves with locus of a convex to the image side, the fifth lens unit G5 approximately monotonically moves to the object side, and the third lens unit G3 and the sixth lens unit G6 are fixed relative to the image surface S. That is, in zooming, the first lens unit G1, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 decreases, and the interval between the third lens unit G3 and the fourth lens unit G4 and the interval between the fourth lens unit G4 and the fifth lens unit G5 vary.

Further, in the zoom lens system according to Embodiment 10, in focusing from an infinity in-focus situation to a close-object in-focus situation, the fourth lens unit G4 as one focusing lens unit moves to the image side along the optical axis in any zooming situation. On the other hand, in focusing from an infinity in-focus situation to a close-object in-focus situation, the fifth lens unit G5 as the other focusing lens unit moves to the object side along the optical axis at a telephoto limit, and moves to the image side along the optical axis in other zooming situations.

Figure 41:
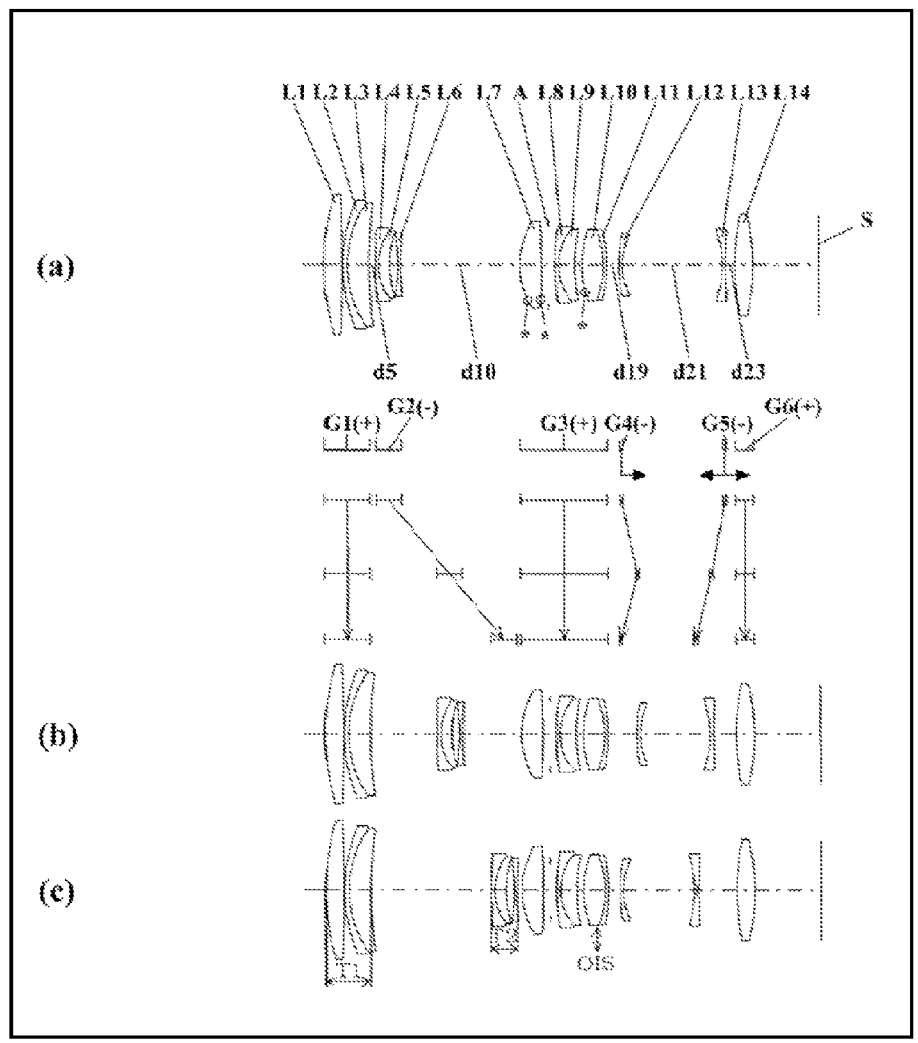
FIG. 41 is a lens arrangement diagram showing an infinity in-focus condition of a zoom lens system according to Embodiment 11 (Example 11)
Figure 42:
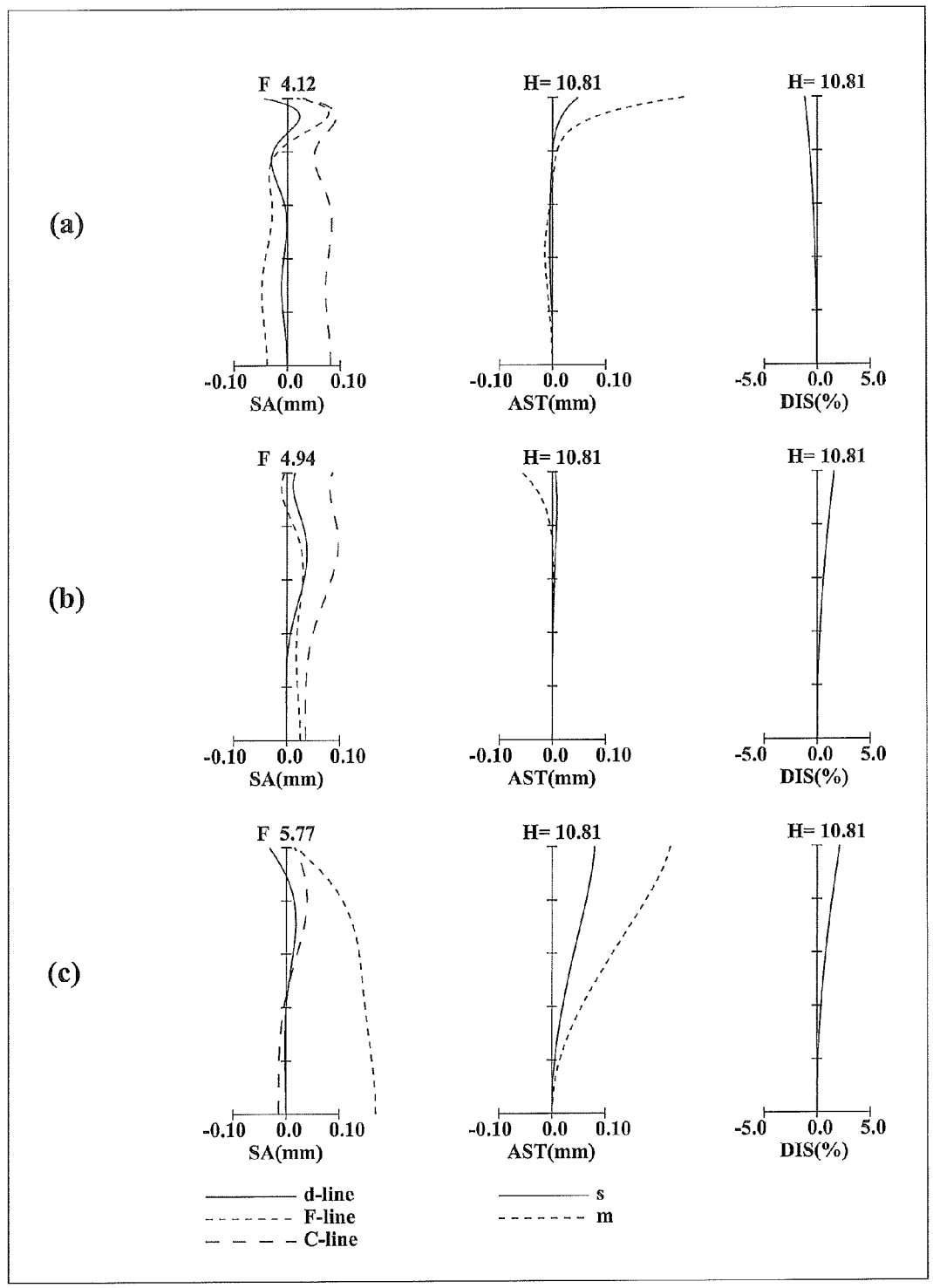
FIG. 42 is a longitudinal aberration diagram of an infinity in-focus condition of a zoom lens system according to Example 11.
Figure 43:
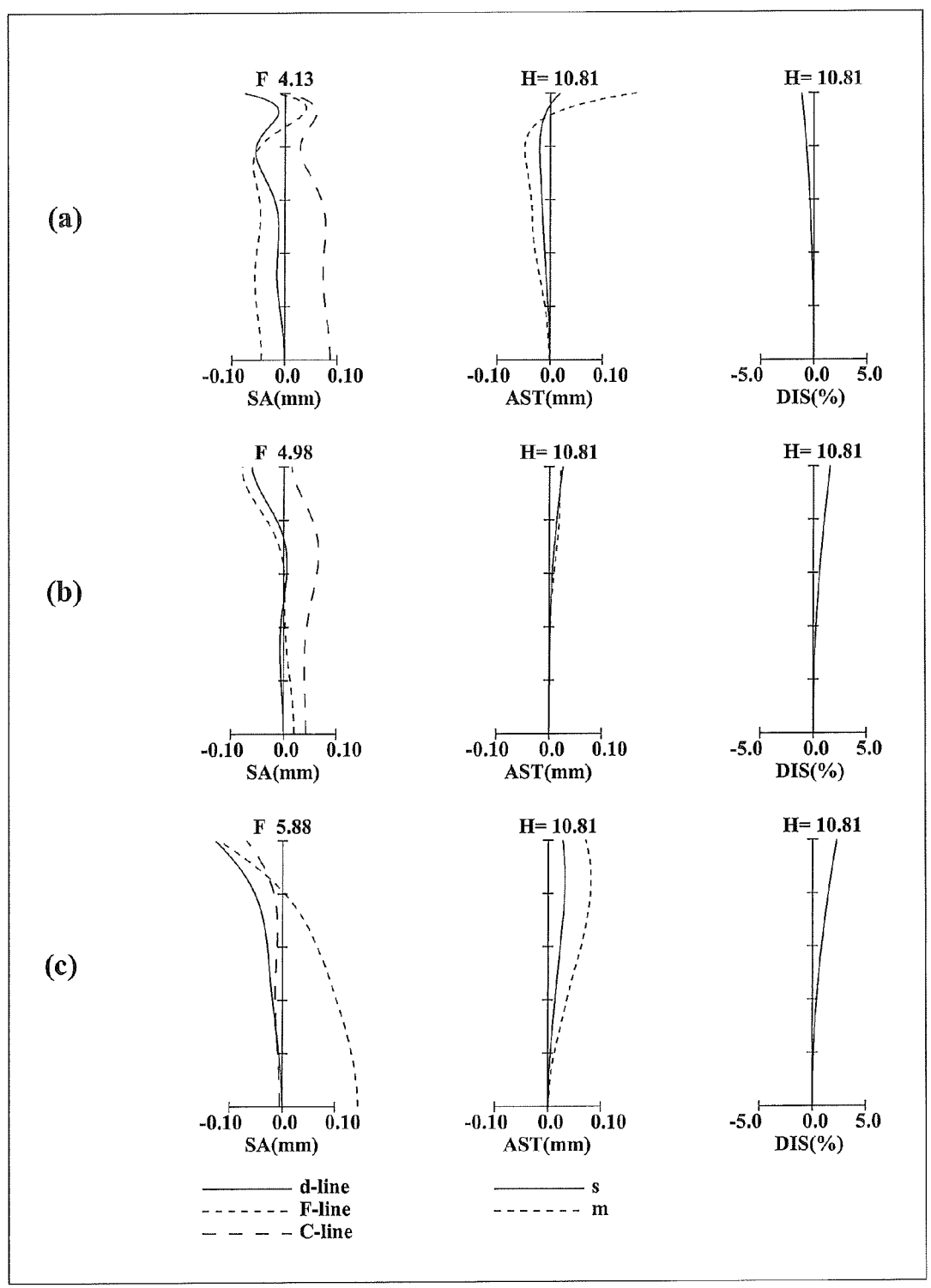
FIG. 43 is a longitudinal aberration diagram of a close-object in-focus condition of a zoom lens system according to Example 11.
Figure 44:
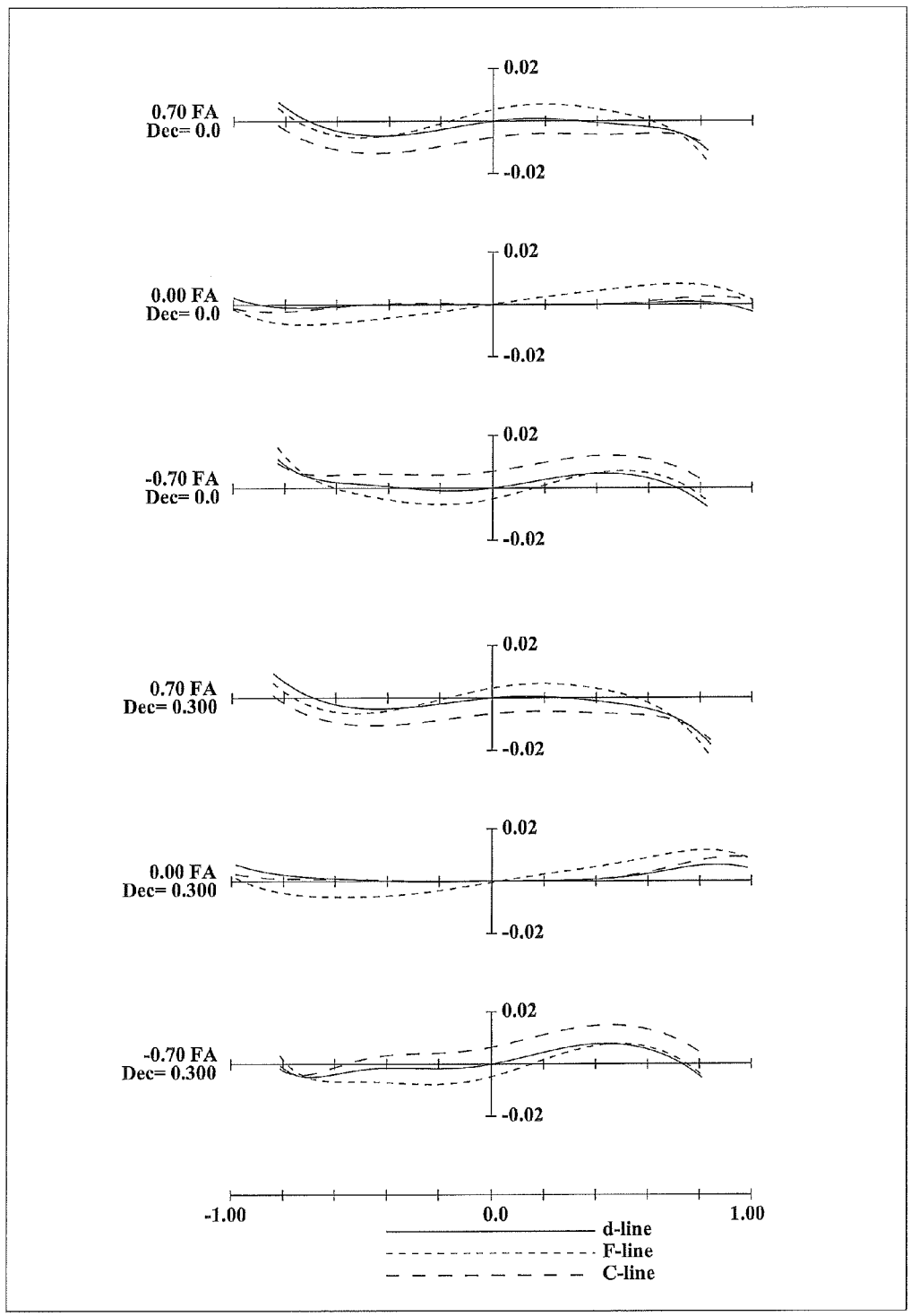
FIG. 44 is a lateral aberration diagram of a zoom lens system according to Example 11 at a telephoto limit in a basic state where image blur compensation is not performed and in an image blur compensation state.

As shown in FIG. 41, in the zoom lens system according to Embodiment 11, the first lens unit G1, in order from the object side to the image side, comprises: a bi-convex first lens element L1; a negative-meniscus second lens element L2 with the convex surface facing the object side; and a positive-meniscus third lens element L3 with the convex surface facing the object side. Among these, the second lens element L2, and the third lens element L3 are cemented to each other.

In the zoom lens system according to Embodiment 11, the second lens unit G2, in order from the object side to the image side, comprises: a negative-meniscus fourth lens element L4 with the convex surface facing the object side; a positive-meniscus fifth lens element L5 with the convex surface facing the object side; and a bi-concave sixth lens element L6. Among these, the fourth lens element L4, and the fifth lens element L5 are cemented to each other.

In the zoom lens system according to Embodiment 11, the third lens unit G3, in order from the object side to the image side, comprises: a bi-convex seventh lens element L7; a negative-meniscus eighth lens element L8 with the convex surface facing the object side; a positive-meniscus ninth lens element L9 with the convex surface facing the object side; a bi-convex tenth lens element L10; and a negative-meniscus eleventh lens element L11 with the convex surface facing the image side. Among these, the eighth lens element L8 and the ninth lens element L9 are cemented to each other, and the tenth lens element L10 and the eleventh lens element L11 are cemented to each other. The seventh lens element L7 has two aspheric surfaces, and the tenth lens element L10 has an aspheric object side surface. Further, an aperture diaphragm A is provided between the seventh lens element L7 and the eighth lens element L8.

In the zoom lens system according to Embodiment 11, the fourth lens unit G4 comprises solely a negative-meniscus twelfth lens element L12 with the convex surface facing the object side.

In the zoom lens system according to Embodiment 11, the fifth lens unit G5 comprises solely a bi-concave thirteenth lens element L13.

In the zoom lens system according to Embodiment 11, the sixth lens unit G6 comprises solely a bi-convex fourteenth lens element L14.

In the zoom lens system according to Embodiment 11, the tenth lens element L10 and the eleventh lens element L11, which are components of the third lens unit G3, correspond to an image blur compensating lens unit described later, which moves in a direction perpendicular to the optical axis in order to optically compensate image blur.

In the zoom lens system according to Embodiment 11, in zooming from a wide-angle limit to a telephoto limit at the time of image taking, the second lens unit G2 monotonically moves to the image side, the fourth lens unit G4 moves with locus of a convex to the image side, the fifth lens unit G5 approximately monotonically moves to the object side, and the first lens unit G1, the third lens unit G3 and the sixth lens unit G6 are fixed relative to the image surface S. That is, in zooming, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 decreases, and the interval between the third lens unit G3 and the fourth lens unit G4 and the interval between the fourth lens unit G4 and the fifth lens unit G5 vary.

Further, in the zoom lens system according to Embodiment 11, in focusing from an infinity in-focus condition to a close-object in-focus situation, the fourth lens unit G4 as one focusing lens unit moves to the image side along the optical axis in any zooming condition. On the other hand, in focusing from an infinity in-focus condition to a close-object in-focus condition, the fifth lens unit G5 as the other focusing lens unit moves to the object side along the optical axis at a telephoto limit, and moves to the image side along the optical axis in other zooming conditions.

Figure 45:
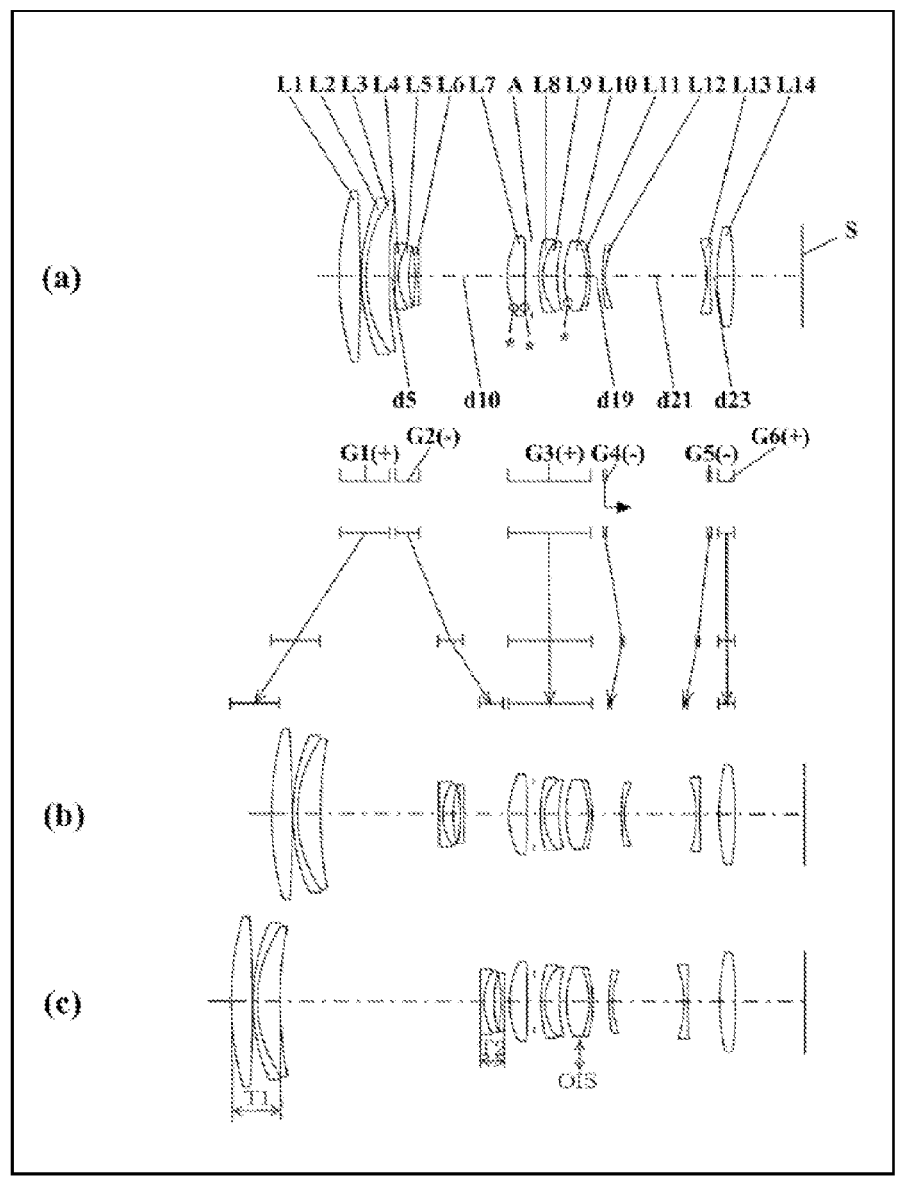
FIG. 45 is a lens arrangement diagram showing an infinity in-focus condition of a zoom lens system according to Embodiment 12 (Example 12)
Figure 46:
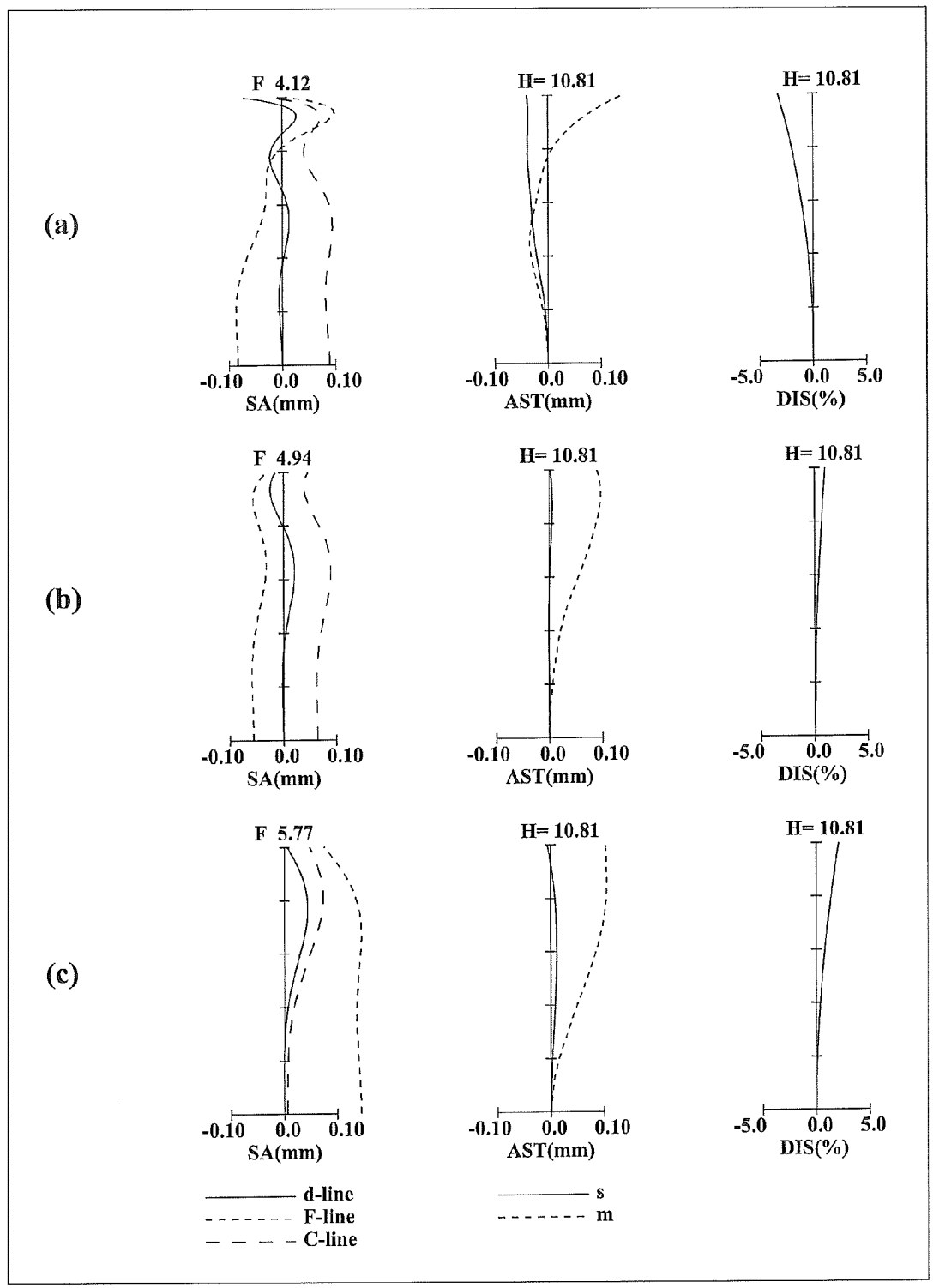
FIG. 46 is a longitudinal aberration diagram of an infinity in-focus condition of a zoom lens system according to Example 12.
Figure 47:
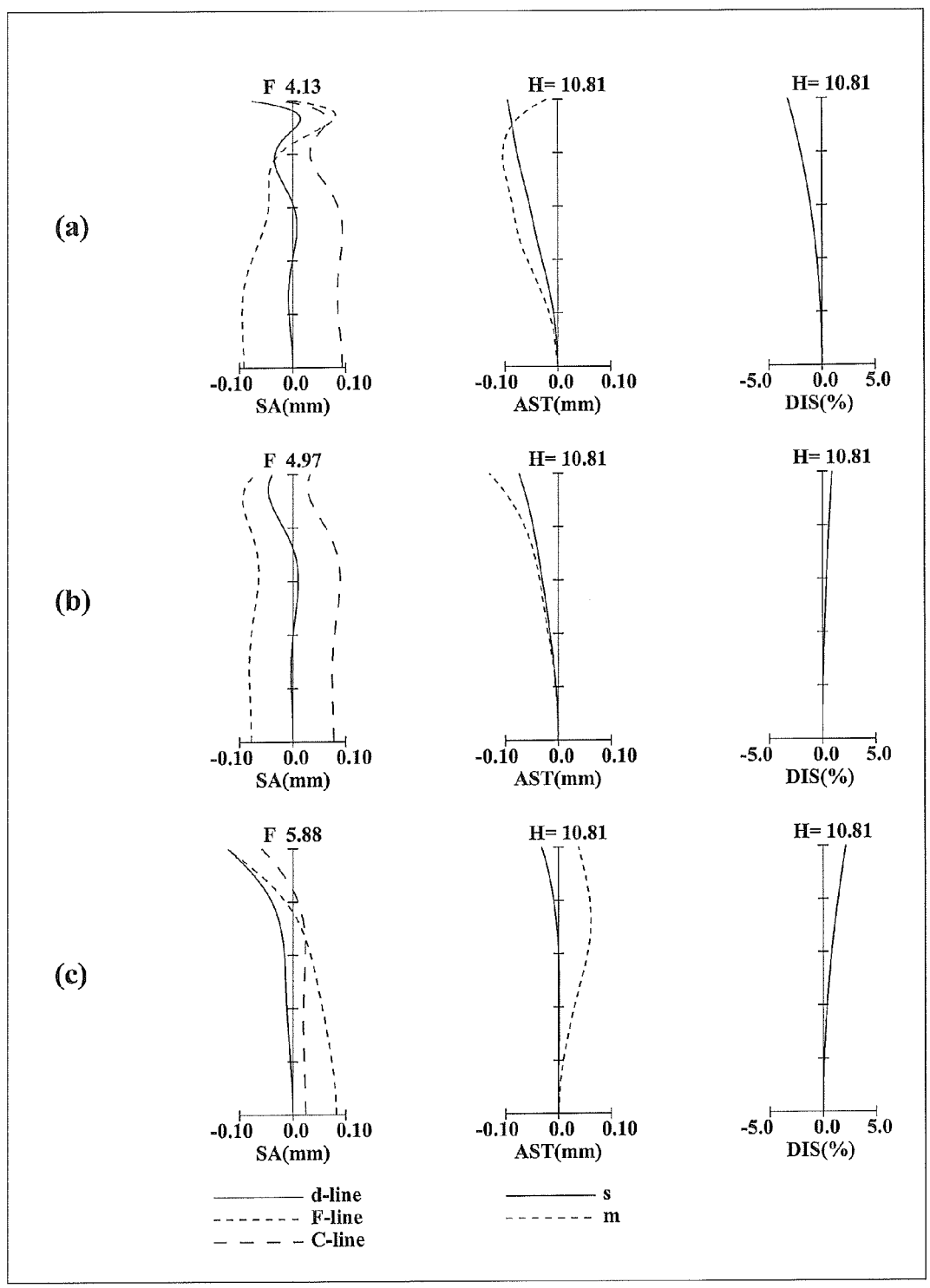
FIG. 47 is a longitudinal aberration diagram of a close-object in-focus condition of a zoom lens system according to Example 12.
Figure 48:
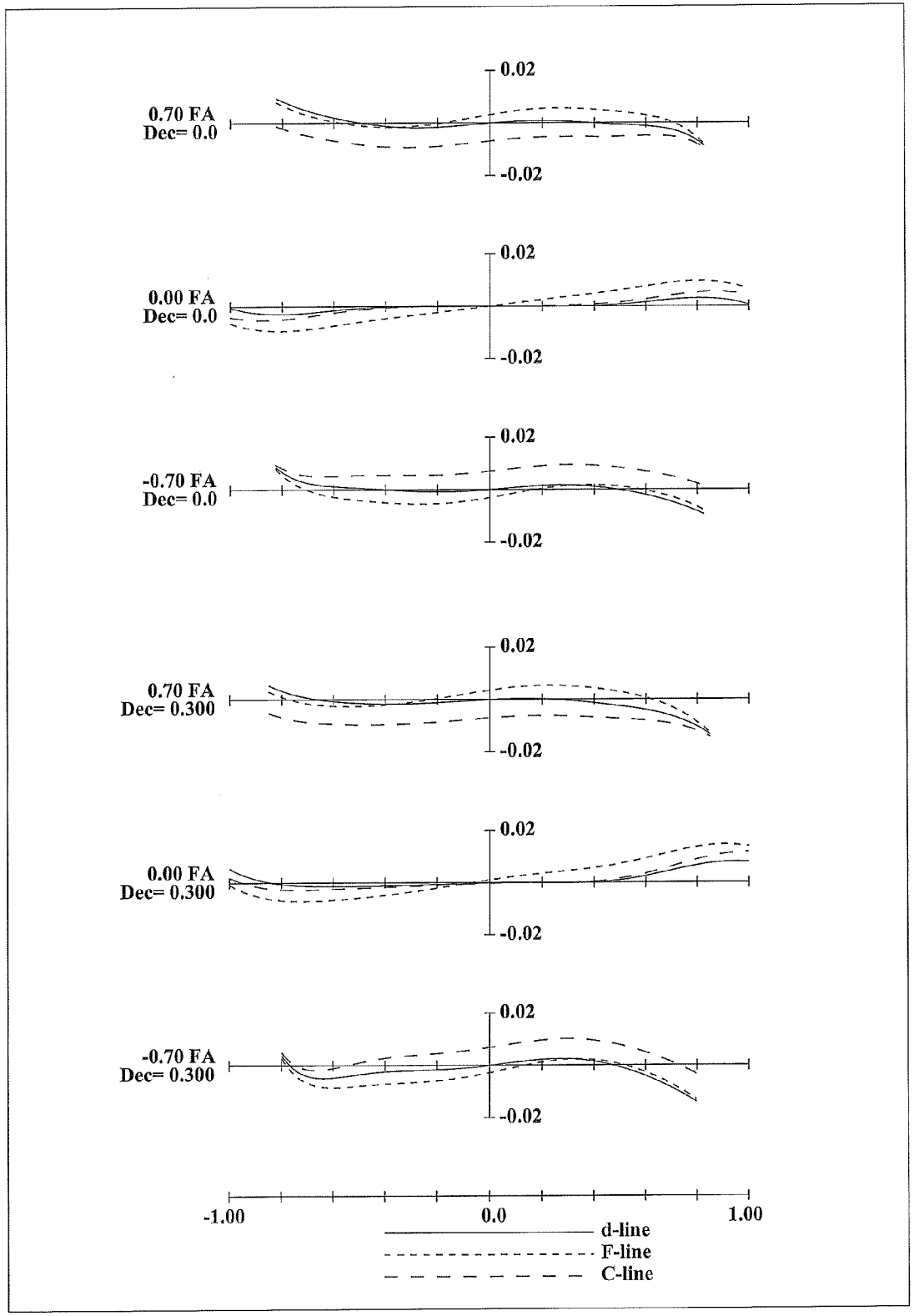
FIG. 48 is a lateral aberration diagram of a zoom lens system according to Example 12 at a telephoto limit in a basic state where image blur compensation is not performed and in an image blur compensation state.

As shown in FIG. 45, in the zoom lens system according to Embodiment 12, the first lens unit G1, in order from the object side to the image side, comprises: a bi-convex first lens element L1; a negative-meniscus second lens element L2 with the convex surface facing the object side; and a positive-meniscus third lens element L3 with the convex surface facing the object side. Among these, the second lens element L2, and the third lens element L3 are cemented to each other.

In the zoom lens system according to Embodiment 12, the second lens unit G2, in order from the object side to the image side, comprises: a bi-concave fourth lens element L4; a positive-meniscus fifth lens element L5 with the convex surface facing the object side; and a bi-concave sixth lens element L6. Among these, the fourth lens element L4, and the fifth lens element L5 are cemented to each other.

In the zoom lens system according to Embodiment 12, the third lens unit G3, in order from the object side to the image side, comprises: a positive-meniscus seventh lens element L7 with the convex surface facing the object side; a negative-meniscus eighth lens element L8 with the convex surface facing the object side; a positive-meniscus ninth lens element L9 with the convex surface facing the object side; a bi-convex tenth lens element L10; and a negative-meniscus eleventh lens element L11 with the convex surface facing the image side. Among these, the eighth lens element L8 and the ninth lens element L9 are cemented to each other, and the tenth lens element L10 and the eleventh lens element L11 are cemented to each other. The seventh lens element L7 has two aspheric surfaces, and the tenth lens element L10 has an aspheric object side surface. Further, an aperture diaphragm A is provided between the seventh lens element L7 and the eighth lens element L8.

In the zoom lens system according to Embodiment 12, the fourth lens unit G4 comprises solely a negative-meniscus twelfth lens element L12 with the convex surface facing the object side.

In the zoom lens system according to Embodiment 12, the fifth lens unit G5 comprises solely a bi-concave thirteenth lens element L13.

In the zoom lens system according to Embodiment 12, the sixth lens unit G6 comprises solely a bi-convex fourteenth lens element L14.

In the zoom lens system according to Embodiment 12, the tenth lens element L10 and the eleventh lens element L11, which are components of the third lens unit G3, correspond to an image blur compensating lens unit described later, which moves in a direction perpendicular to the optical axis in order to optically compensate image blur.

In the zoom lens system according to Embodiment 12, in zooming from a wide-angle limit to a telephoto limit at the time of image taking, the first lens unit G1 monotonically moves to the object side, the second lens unit G2 approximately monotonically moves to the image side, the fourth lens unit G4 moves with locus of a convex to the image side, the fifth lens unit G5 approximately monotonically moves to the object side, and the third lens unit G3 and the sixth lens unit G6 are fixed relative to the image surface S. That is, in zooming, the first lens unit G1, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 decreases, and the interval between the third lens unit G3 and the fourth lens unit G4 and the interval between the fourth lens unit G4 and the fifth lens unit G5 vary.

Further, in the zoom lens system according to Embodiment 12, in focusing from an infinity in-focus situation to a close-object in-focus situation, the fourth lens unit G4 as a focusing lens unit moves to the image side along the optical axis in any zooming situation.

Figure 49:
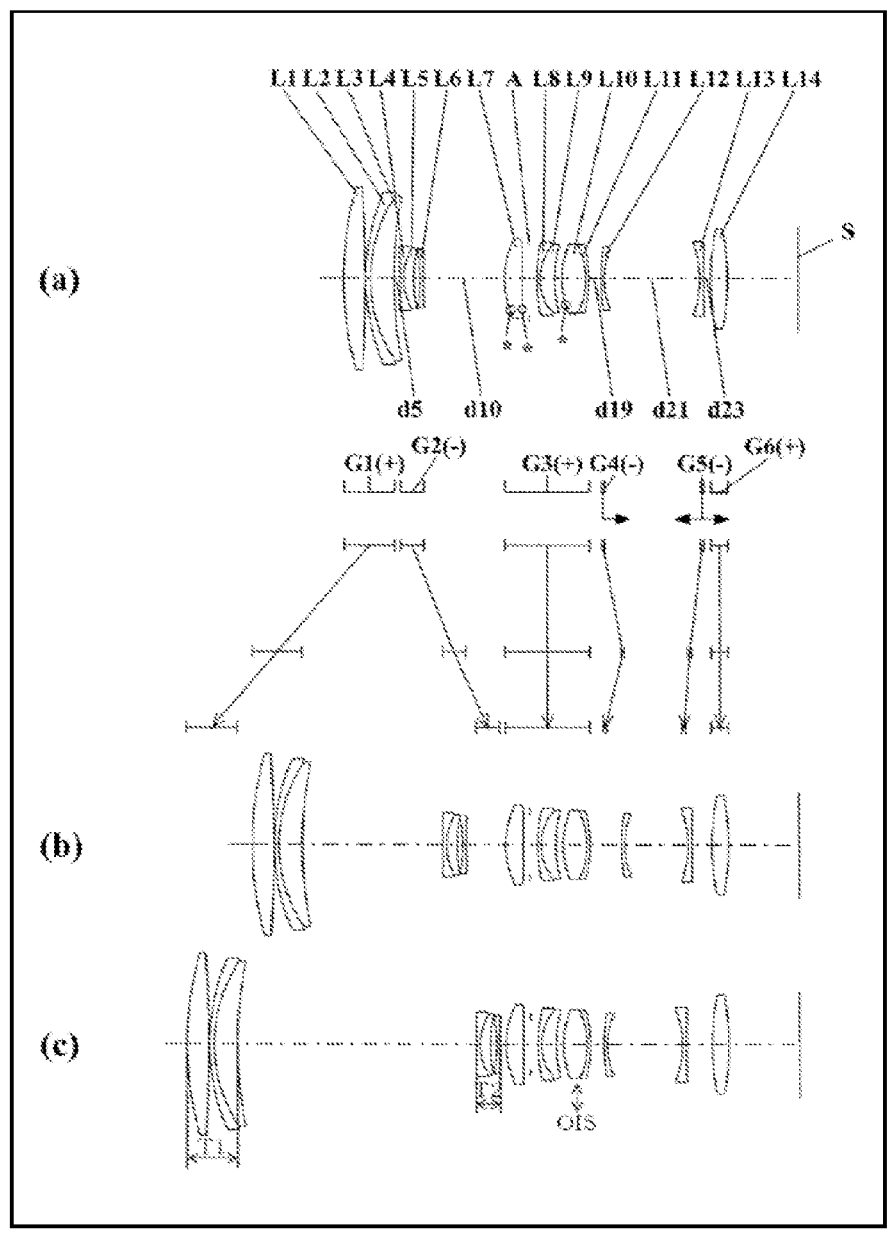
FIG. 49 is a lens arrangement diagram showing an infinity in-focus condition of a zoom lens system according to Embodiment 13 (Example 13)
Figure 50:
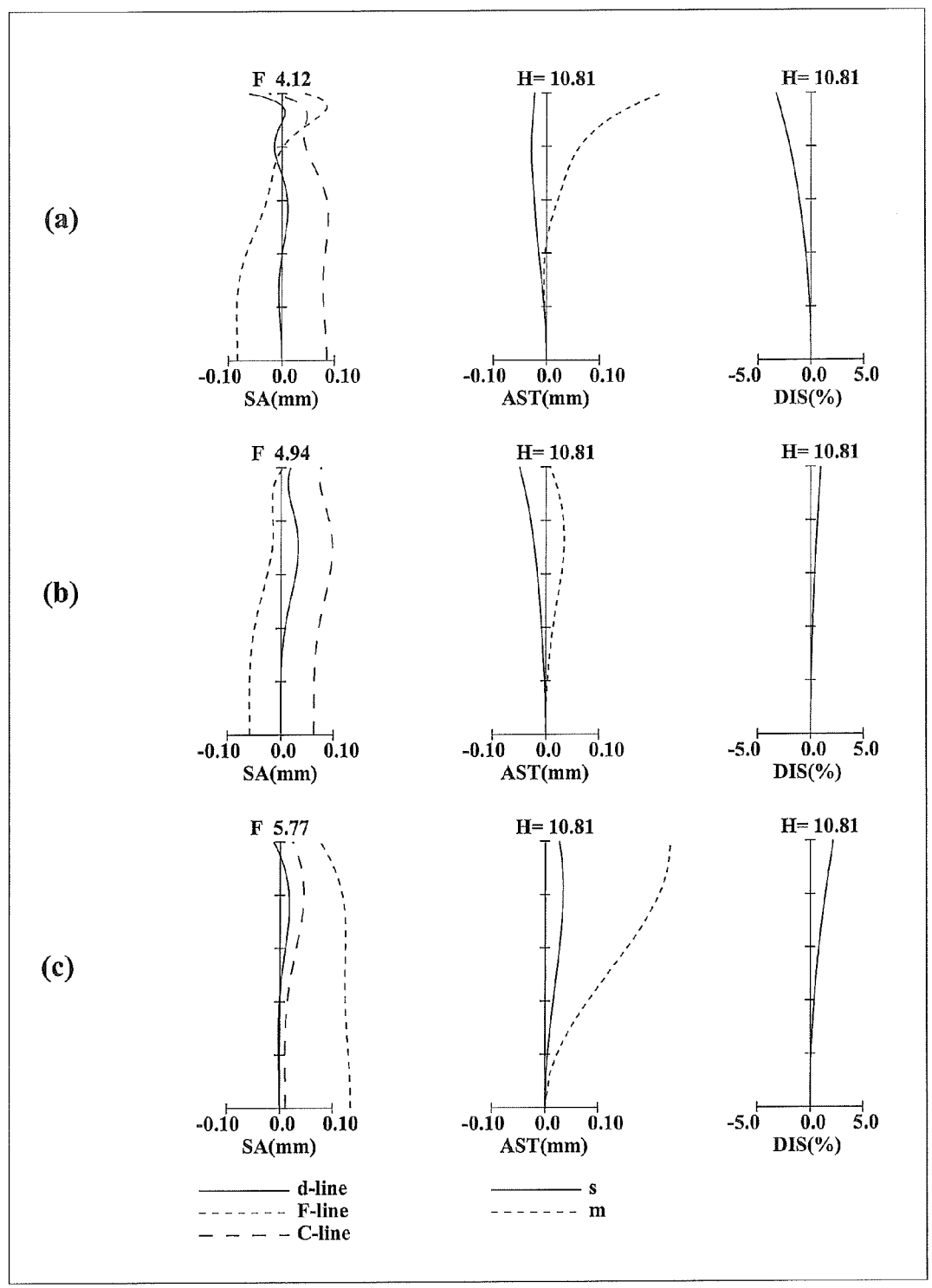
FIG. 50 is a longitudinal aberration diagram of an infinity in-focus condition of a zoom lens system according to Example 13.
Figure 51:
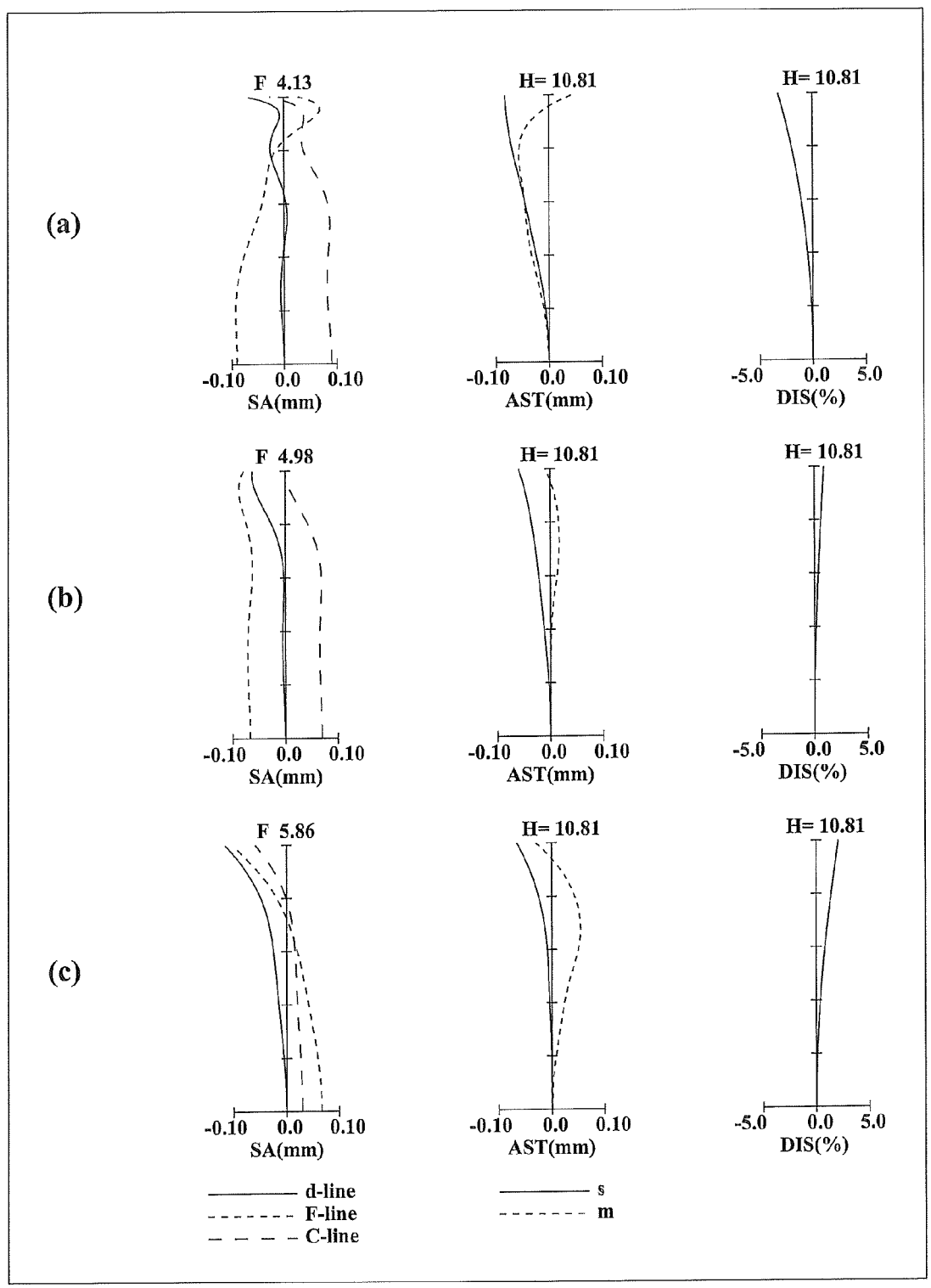
FIG. 51 is a longitudinal aberration diagram of a close-object in-focus condition of a zoom lens system according to Example 13.
Figure 52:
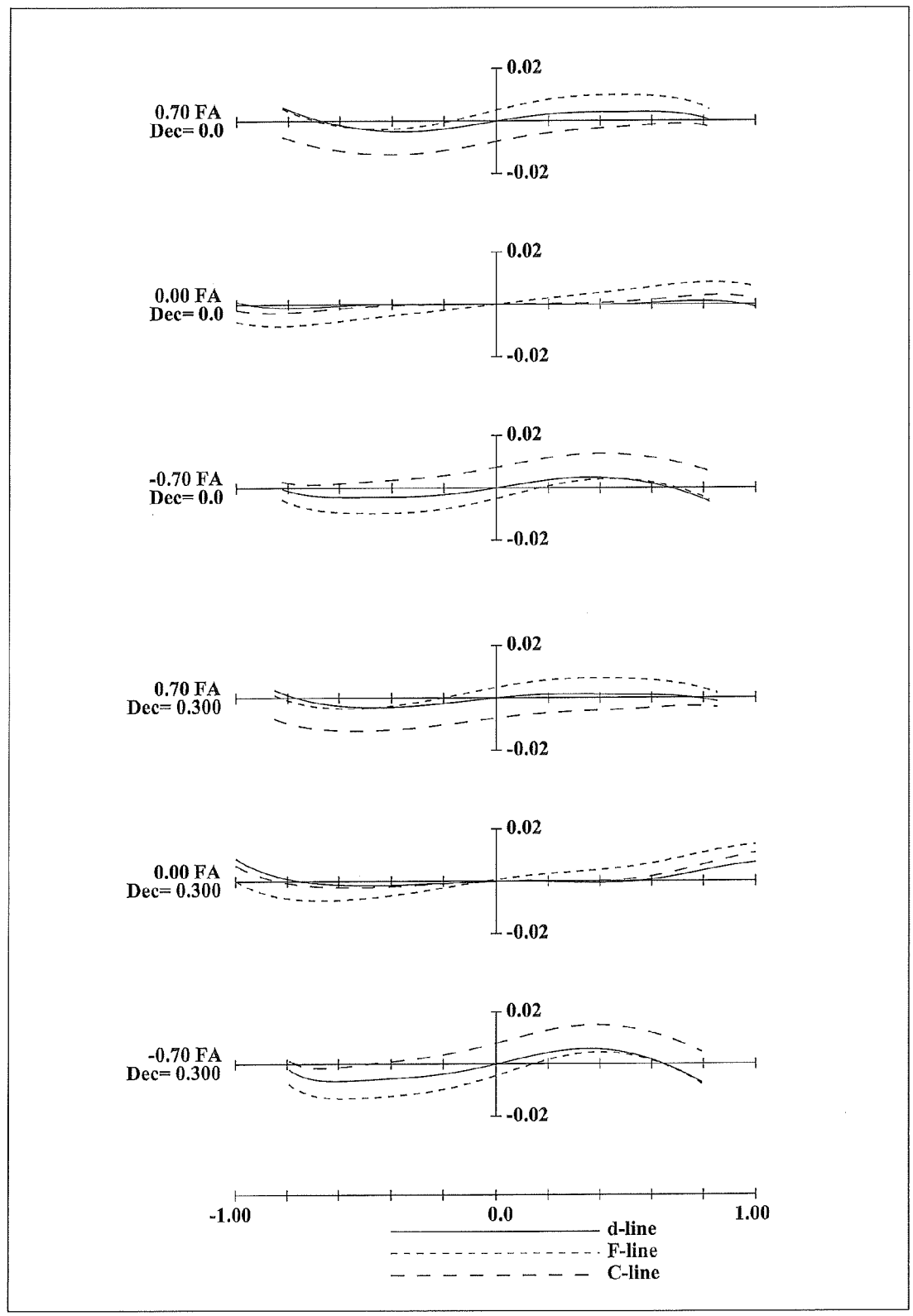
FIG. 52 is a lateral aberration diagram of a zoom lens system according to Example 13 at a telephoto limit in a basic state where image blur compensation is not performed and in an image blur compensation state.

As shown in FIG. 49, in the zoom lens system according to Embodiment 13, the first lens unit G1, in order from the object side to the image side, comprises: a bi-convex first lens element L1; a negative-meniscus second lens element L2 with the convex surface facing the object side; and a positive-meniscus third lens element L3 with the convex surface facing the object side. Among these, the second lens element L2, and the third lens element L3 are cemented to each other.

In the zoom lens system according to Embodiment 13, the second lens unit G2, in order from the object side to the image side, comprises: a bi-concave fourth lens element L4; a positive-meniscus fifth lens element L5 with the convex surface facing the object side; and a bi-concave sixth lens element L6. Among these, the fourth lens element L4, and the fifth lens element L5 are cemented to each other.

In the zoom lens system according to Embodiment 13, the third lens unit G3, in order from the object side to the image side, comprises: a positive-meniscus seventh lens element L7 with the convex surface facing the object side; a negative-meniscus eighth lens element L8 with the convex surface facing the object side; a positive-meniscus ninth lens element L9 with the convex surface facing the object side; a bi-convex tenth lens element L10; and a negative-meniscus eleventh lens element L11 with the convex surface facing the image side. Among these, the eighth lens element L8 and the ninth lens element L9 are cemented to each other, and the tenth lens element L10 and the eleventh lens element L11 are cemented to each other. The seventh lens element L7 has two aspheric surfaces, and the tenth lens element L10 has an aspheric object side surface. Further, an aperture diaphragm A is provided between the seventh lens element L7 and the eighth lens element L8.

In the zoom lens system according to Embodiment 13, the fourth lens unit G4 comprises solely a negative-meniscus twelfth lens element L12 with the convex surface facing the object side.

In the zoom lens system according to Embodiment 13, the fifth lens unit G5 comprises solely a bi-concave thirteenth lens element L13.

In the zoom lens system according to Embodiment 13, the sixth lens unit G6 comprises solely a bi-convex fourteenth lens element L14.

In the zoom lens system according to Embodiment 13, the tenth lens element L10 and the eleventh lens element L11, which are components of the third lens unit G3, correspond to an image blur compensating lens unit described later, which moves in a direction perpendicular to the optical axis in order to optically compensate image blur.

In the zoom lens system according to Embodiment 13, in zooming from a wide-angle limit to a telephoto limit at the time of image taking, the first lens unit G1 monotonically moves to the object side, the second lens unit G2 monotonically moves to the image side, the fourth lens unit G4 moves with locus of a convex to the image side, the fifth lens unit G5 approximately monotonically moves to the object side, and the third lens unit G3 and the sixth lens unit G6 are fixed relative to the image surface S. That is, in zooming, the first lens unit G1, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 decreases, and the interval between the third lens unit G3 and the fourth lens unit G4 and the interval between the fourth lens unit G4 and the fifth lens unit G5 vary.

Further, in the zoom lens system according to Embodiment 13, in focusing from an infinity in-focus situation to a close-object in-focus situation, the fourth lens unit G4 as one focusing lens unit moves to the image side along the optical axis in any zooming situation. On the other hand, in focusing from an infinity in-focus situation to a close-object in-focus situation, the fifth lens unit G5 as the other focusing lens unit moves to the object side along the optical axis at a wide-angle limit and at a telephoto limit, and moves to the image side along the optical axis in other zooming conditions.

Figure 53:
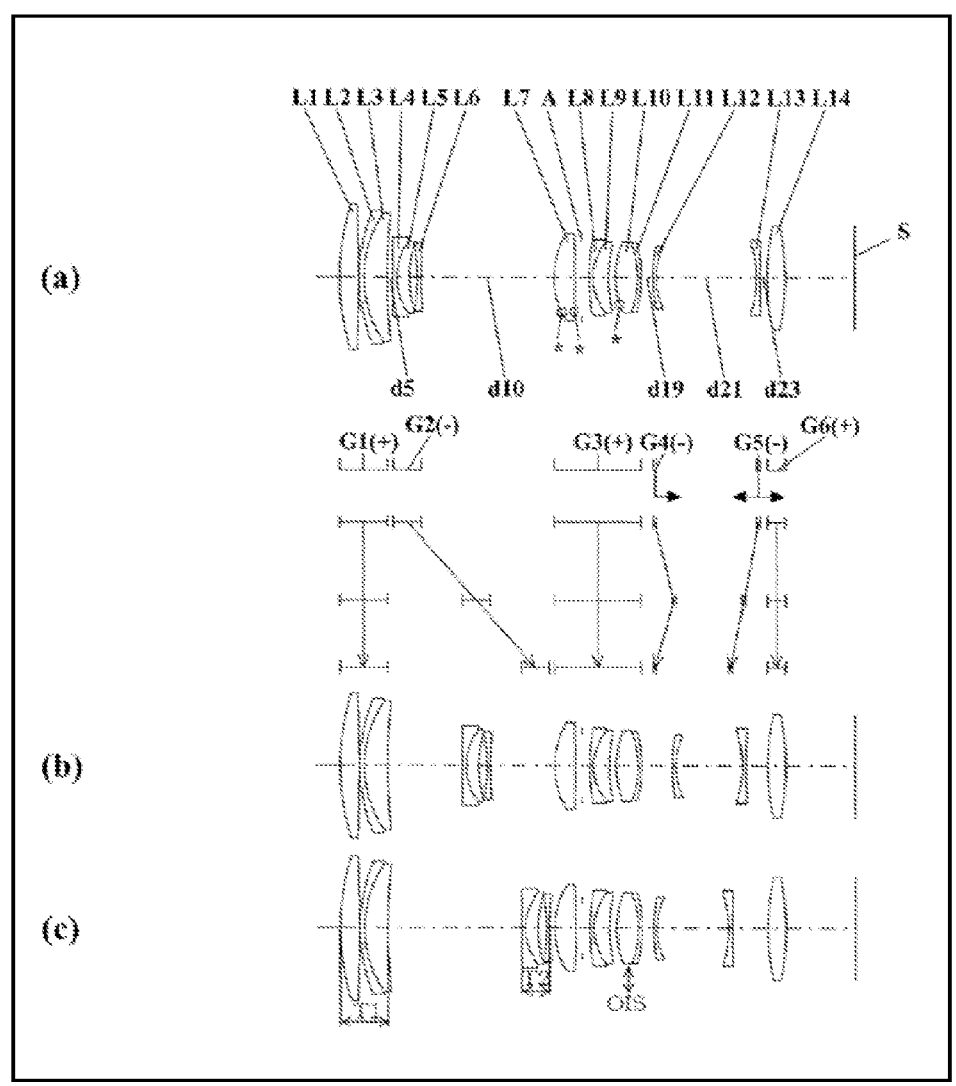
FIG. 53 is a lens arrangement diagram showing an infinity in-focus condition of a zoom lens system according to Embodiment 14 (Example 14)
Figure 54:
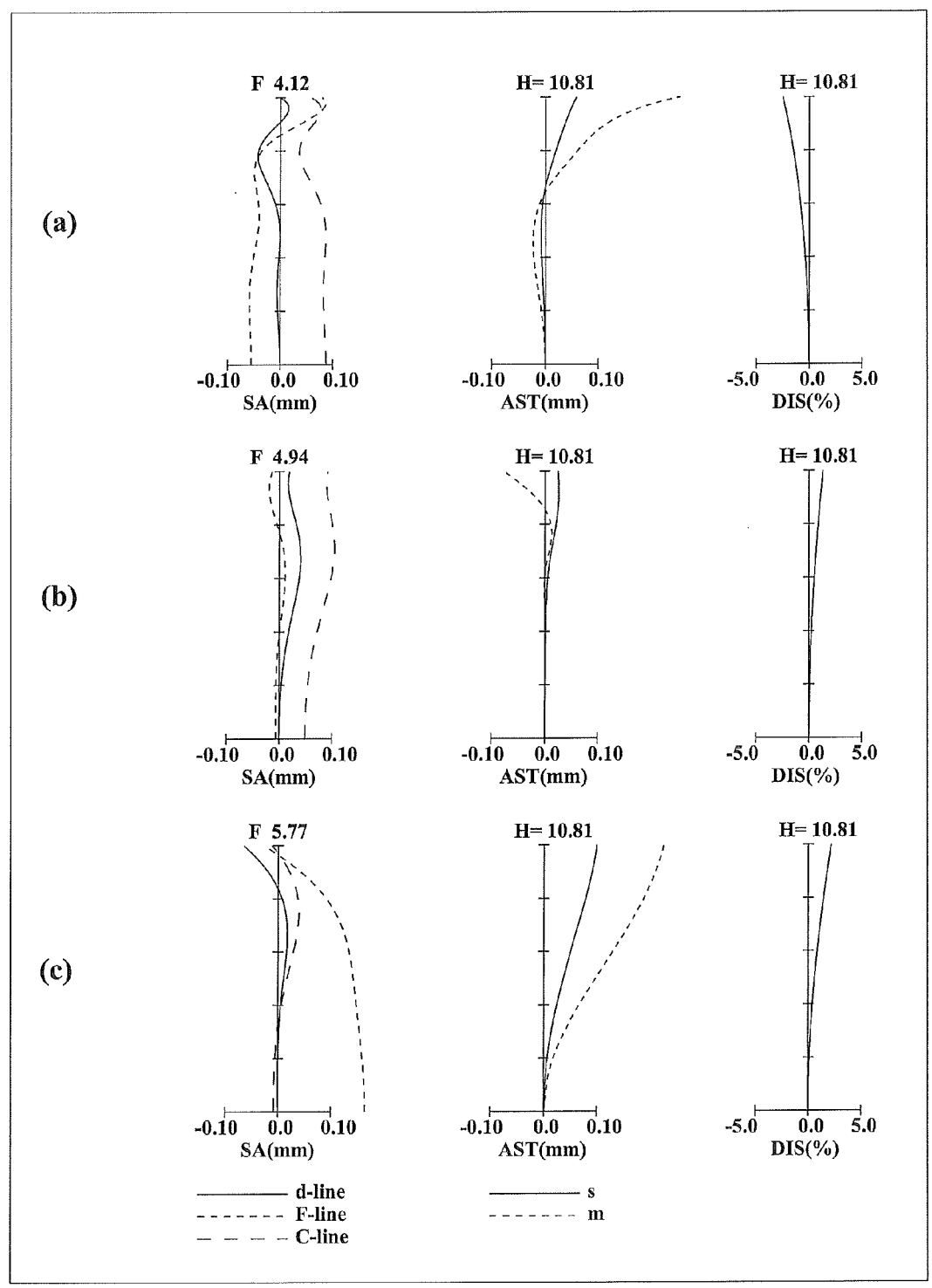
FIG. 54 is a longitudinal aberration diagram of an infinity in-focus condition of a zoom lens system according to Example 14.
Figure 55:
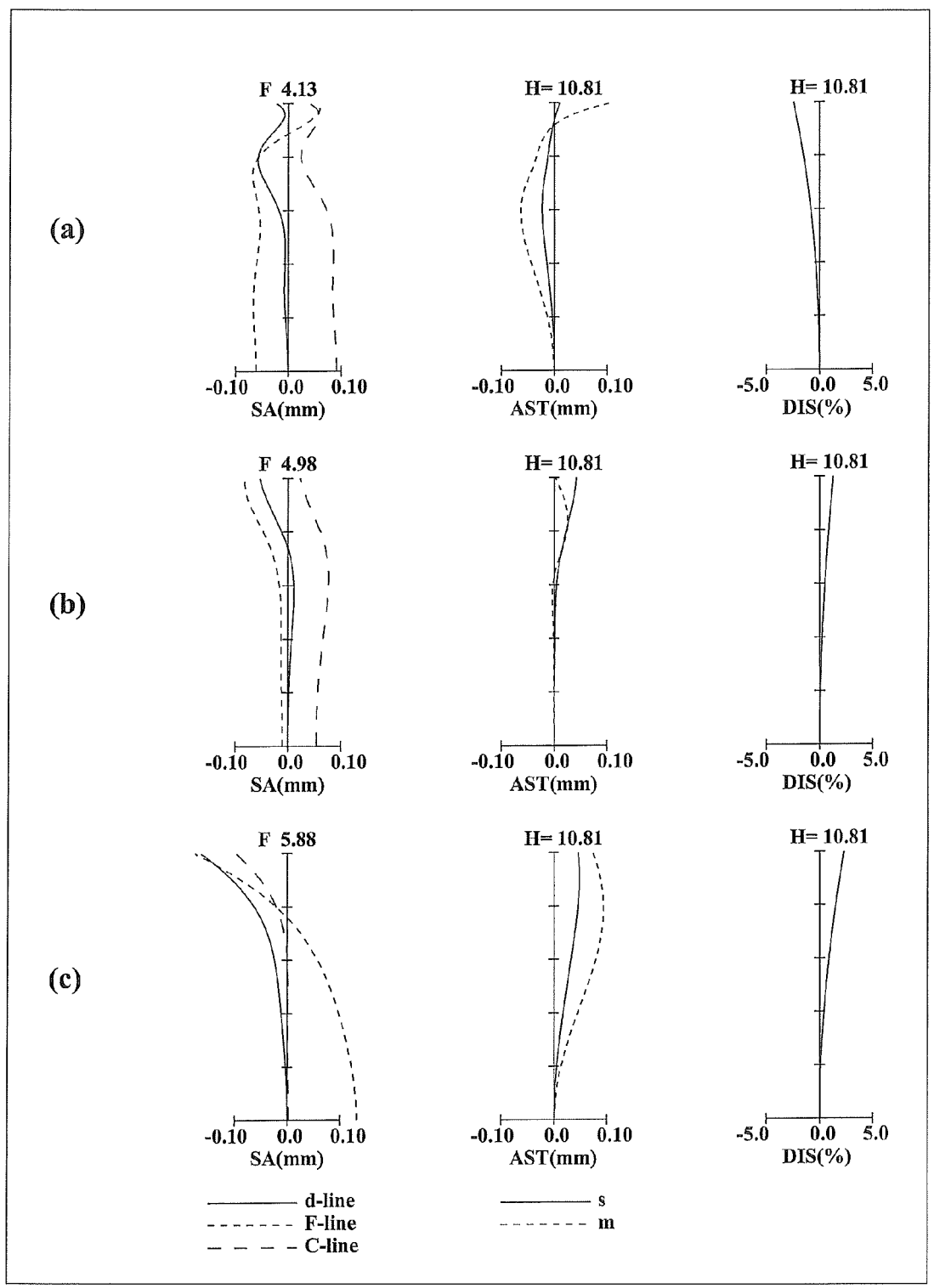
FIG. 55 is a longitudinal aberration diagram of a close-object in-focus condition of a zoom lens system according to Example 14.
Figure 56:
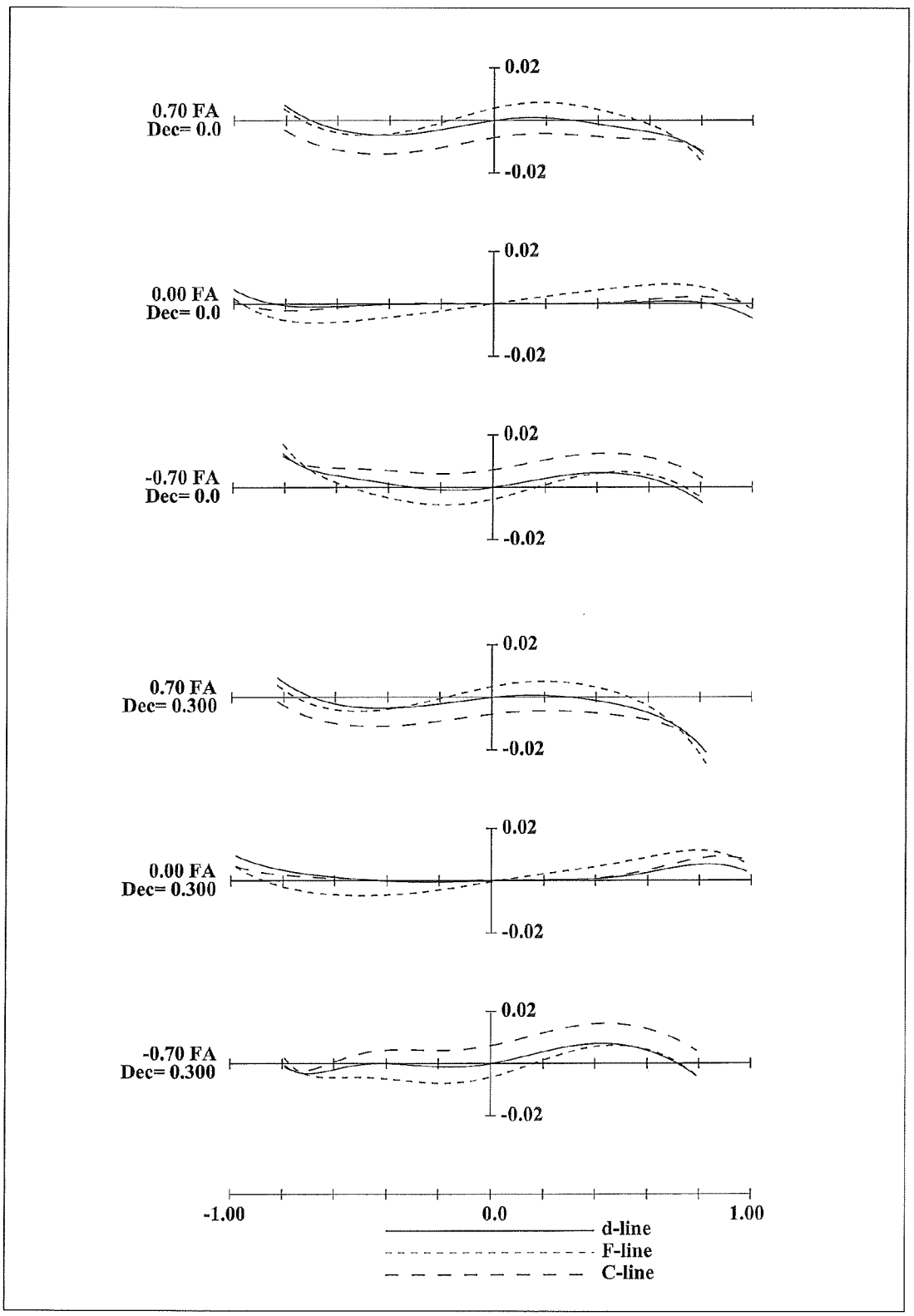
FIG. 56 is a lateral aberration diagram of a zoom lens system according to Example 14 at a telephoto limit in a basic state where image blur compensation is not performed and in an image blur compensation state.

As shown in FIG. 53, in the zoom lens system according to Embodiment 14, the first lens unit G1, in order from the object side to the image side, comprises: a bi-convex first lens element L1; a negative-meniscus second lens element L2 with the convex surface facing the object side; and a positive-meniscus third lens element L3 with the convex surface facing the object side. Among these, the second lens element L2, and the third lens element L3 are cemented to each other.

In the zoom lens system according to Embodiment 14, the second lens unit G2, in order from the object side to the image side, comprises: a bi-concave fourth lens element L4; a positive-meniscus fifth lens element L5 with the convex surface facing the object side; and a bi-concave sixth lens element L6. Among these, the fourth lens element L4, and the fifth lens element L5 are cemented to each other.

In the zoom lens system according to Embodiment 14, the third lens unit G3, in order from the object side to the image side, comprises: a bi-convex seventh lens element L7; a negative-meniscus eighth lens element L8 with the convex surface facing the object side; a positive-meniscus ninth lens element L9 with the convex surface facing the object side; a bi-convex tenth lens element L10; and a negative-meniscus eleventh lens element L11 with the convex surface facing the image side. Among these, the eighth lens element L8 and the ninth lens element L9 are cemented to each other, and the tenth lens element L10 and the eleventh lens element L11 are cemented to each other. The seventh lens element L7 has two aspheric surfaces, and the tenth lens element L10 has an aspheric object side surface. Further, an aperture diaphragm A is provided between the seventh lens element L7 and the eighth lens element L8.

In the zoom lens system according to Embodiment 14, the fourth lens unit G4 comprises solely a negative-meniscus twelfth lens element L12 with the convex surface facing the object side.

In the zoom lens system according to Embodiment 14, the fifth lens unit G5 comprises solely a bi-concave thirteenth lens element L13.

In the zoom lens system according to Embodiment 14, the sixth lens unit G6 comprises solely a bi-convex fourteenth lens element L14.

In the zoom lens system according to Embodiment 14, the tenth lens element L10 and the eleventh lens element L11, which are components of the third lens unit G3, correspond to an image blur compensating lens unit described later, which moves in a direction perpendicular to the optical axis in order to optically compensate image blur.

In the zoom lens system according to Embodiment 14, in zooming from a wide-angle limit to a telephoto limit at the time of image taking, the second lens unit G2 monotonically moves to the image side, the fourth lens unit G4 moves with locus of a convex to the image side, the fifth lens unit G5 monotonically moves to the object side, and the first lens unit G1, the third lens unit G3 and the sixth lens unit G6 are fixed relative to the image surface S. That is, in zooming, the second lens unit G2, the fourth lens unit G4, and the fifth lens unit G5 individually move along the optical axis so that the interval between the first lens unit G1 and the second lens unit G2 and the interval between the fifth lens unit G5 and the sixth lens unit G6 increase, the interval between the second lens unit G2 and the third lens unit G3 decreases, and the interval between the third lens unit G3 and the fourth lens unit G4 and the interval between the fourth lens unit G4 and the fifth lens unit G5 vary.

Further, in the zoom lens system according to Embodiment 14, in focusing from an infinity in-focus situation to a close-object in-focus situation, the fourth lens unit G4 as one focusing lens unit moves to the image side along the optical axis in any zooming situation. On the other hand, in focusing from an infinity in-focus situation to a close-object in-focus situation, the fifth lens unit G5 as the other focusing lens unit moves to the object side along the optical axis at a telephoto limit, and moves to the image side along the optical axis in other zooming conditions.

In the zoom lens systems according to Embodiments 1 to 14, since the lens unit located closest to the object side, i.e., the first lens unit G1, has positive optical power, the lens system is downsized. In addition, the amount of generated aberrations due to decentering of lens elements is reduced.

In the zoom lens systems according to Embodiments 1 to 14, among the lens units located on the image side relative to the aperture diaphragm, the lens unit having negative optical power is at least one focusing lens unit which moves along the optical axis in focusing from an infinity in-focus situation to a close-object in-focus situation on at least one zooming position from a wide-angle limit to a telephoto limit. That is, the fifth lens unit G5 in Embodiments 1 and 2, or the fourth lens unit G4 in Embodiments 3 to 9 and 12 is the focusing lens unit, while the fourth lens unit G4 and the fifth lens unit G5 in Embodiments 10, 11, 13 and 14 are the focusing lens units. Therefore, the overall length of lens system is shortened. For example, by increasing the negative optical power, the overall length of lens system is further shortened, and thereby the amount of lens movement in focusing is further reduced, resulting in an advantage to size reduction of the lens system.

The zoom lens systems according to Embodiments 1 to 14 are each provided with an image blur compensating lens unit which moves in a direction perpendicular to the optical axis. The image blur compensating lens unit compensates image point movement caused by vibration of the entire system, that is, optically compensates image blur caused by hand blurring, vibration and the like.

When image point movement caused by vibration of the entire system is to be compensated, the image blur compensating lens unit moves in the direction perpendicular to the optical axis, so that image blur is compensated in a state that size increase in the entire zoom lens system is suppressed to realize a compact construction and that excellent imaging characteristics such as small decentering coma aberration and small decentering astigmatism are satisfied.

The image blur compensating lens unit according to the present invention may be a single lens unit. If a single lens unit is composed of a plurality of lens elements, the image blur compensating lens unit may be any one lens element or a plurality of adjacent lens elements among the plurality of lens elements.

When the image blur compensating lens unit and the above-mentioned at least one focusing lens unit are arranged adjacent to each other, in the case that the image blur compensating lens unit has positive optical power, since the optical power of the image blur compensating lens unit is enhanced, the amount of movement of the image blur compensating lens unit in the direction perpendicular to the optical axis is reduced. In the case that the image blur compensating lens unit has negative optical power, the amount of generated coma aberration is reduced in image blur compensation.

In the zoom lens systems according to Embodiments 1 to 14, the image blur compensating lens unit has positive optical power while the at least one focusing lens unit has negative optical power. Therefore, the optical powers thereof are enhanced with each other, and thereby the amount of lens movement in focusing is reduced. Moreover, the amount of movement of the image blur compensating lens unit in the direction perpendicular to the optical axis is also reduced.

In the zoom lens systems according to Embodiments 1 to 14, in zooming from a wide-angle limit to a telephoto limit at the time of image taking, the lens unit located closest to the image side, i.e., the sixth lens unit G6 in Embodiments 1 to 4 and 9 to 14, or the fifth lens unit G5 in Embodiments 5 to 8, is fixed relative to the image surface. Therefore, entry of dust or the like into the lens system is sufficiently prevented.

In the zoom lens systems according to Embodiments 1 and 2, a lens unit having positive optical power is provided on each of the object side and the image side of the fifth lens unit G5 which is the one focusing lens unit. In the zoom lens systems according to Embodiments 5 to 8, a lens unit having positive optical power is provided on each of the object side and the image side of the fourth lens unit G4 which is the one focusing lens unit. In the zoom lens systems according to Embodiments 10, 11, 13 and 14, one lens unit having positive optical power is provided on the object side of the fourth lens unit G4 which is one of the two focusing lens units, and the other lens unit having positive optical power is provided on the image side of the fifth lens unit G5 which is the other of the two focusing lens units. Therefore, the optical power of each focusing lens unit is increased, and thereby the amount of lens movement in focusing is reduced, resulting in a further advantage to size reduction of the lens system.

In the zoom lens systems according to Embodiments 1 to 4 and 9 to 14, in zooming from a wide-angle limit to a telephoto limit at the time of image taking, the image blur compensating lens unit is fixed relative to the image surface. Therefore, an increase in the size of the entire zoom lens system is suppressed, and thereby the compact zoom lens system can be realized. In addition, since a unit including the image blur compensating lens unit which is heavy weight is not moved, actuators can be arranged inexpensively.

In the zoom lens systems according to Embodiments 7 to 10, 12 and 13, in zooming from a wide-angle limit to a telephoto limit at the time of image taking, since the lens unit located closest to the object side, i.e., the first lens unit G1, moves to the object side, the overall length of lens system at a wide-angle limit can be shortened.

In the zoom lens systems according to Embodiments 1 to 4 and 9 to 14, in zooming from a wide-angle limit to a telephoto limit at the time of image taking, the lens unit having the aperture diaphragm, i.e., the fourth lens unit G4 in Embodiments 1 and 2, or the third lens unit G3 in Embodiments 3, 4 and 9 to 14, is fixed relative to the image surface. Therefore, actuators can be arranged inexpensively since a unit including the lens unit having the aperture diaphragm which is heavy weight is not moved.

In the zoom lens systems according to Embodiments 10, 11, 13 and 14, among the lens units located on the image side relative to the aperture diaphragm, further one lens unit is the focusing lens unit which moves along the optical axis in focusing from an infinity in-focus situation to a close-object in-focus situation, on at least one zooming position from a wide-angle limit to a telephoto limit. Therefore, aberration fluctuation in focusing can be further decreased.

Also, in the zoom lens systems according to Embodiments 10, 11, 13 and 14, two focusing lens units, i.e., the fourth lens unit G4 and the fifth lens unit G5, are arranged adjacent to each other, and the two focusing lens units are arranged between two lens units, i.e., the third lens unit G3 and the sixth lens unit G6, which are fixed relative to the image surface in zooming from a wide-angle limit to a telephoto limit at the time of image taking. Therefore, in the case that the first lens unit G1 and the second lens unit G2 are manually moved in zooming from a wide-angle limit to a telephoto limit at the time of image taking, interference can be easily avoided.

Moreover, in the zoom lens systems according to Embodiments 10, 11, 13 and 14, the further one focusing lens unit has negative optical power. Therefore, the negative optical powers of respective two focusing lens units can be reduced, and thereby aberration fluctuation in focusing can be reduced. In addition, the total negative optical powers of the lens units located on the image side relative to the aperture diaphragm can be enhanced, which results in an advantage for decrease in the overall length of lens system.

The zoom lens systems according to Embodiments 1 to 4 and 9 to 14 each have a six-unit construction including first to sixth lens units G1 to G6. The zoom lens systems according to Embodiments 5 to 8 each have a five-unit construction including first to fifth lens units G1 to G5. In the present invention, however, the number of lens units constituting the zoom lens system is not particularly limited so long as the lens unit located closest to the object side has positive optical power, among the lens units located on the image side relative to the aperture diaphragm, the lens unit having negative optical power is the at least one focusing lens unit, the image blur compensating lens unit is provided, and the image blur compensating lens unit and the at least one focusing lens unit are arranged adjacent to each other. Further, the optical powers of the respective lens units constituting the zoom lens system are not particularly limited.

The following description is given for conditions preferably satisfied by a zoom lens system like the zoom lens systems according to Embodiments 1 to 14. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect is obtained.

For example, a zoom lens system like the zoom lens systems according to Embodiments 1 to 14, which includes a plurality of lens units each comprising at least one lens element, in which a lens unit located closest to an object side has positive optical power, among lens units located on the image side relative to an aperture diaphragm, a lens unit having negative optical power is at least one focusing lens unit which moves along an optical axis in focusing from an infinity in-focus situation to a close-object in-focus situation, on at least one zooming position from a wide-angle limit to a telephoto limit, an image blur compensating lens unit is provided, which moves in a direction perpendicular to the optical axis, in order to optically compensate image blur, the image blur compensating lens unit and the at least one focusing lens unit are arranged adjacent to each other (this lens configuration is referred to as a basic configuration of the embodiments, hereinafter), satisfies the following condition (6).

$$0.1 < (T_1 + T_2)/H < 2.0 \quad (6)$$

where $T_1$ is an axial thickness of the lens unit located closest to the object side, $T_2$ is an axial thickness of a lens unit located having one air space toward the image side from the lens unit located closest to the object side, and H is the image height.

The condition (6) sets forth the relationship between the sum of the axial thickness of the lens unit located closest to the object side, i.e., the first lens unit and the axial thickness of the lens unit located just on the image side of the first lens unit, i.e., the second lens unit, and the image height. When the value goes below the lower limit of the condition (6), the optical powers of the lens units cannot be increased, which causes an increase in the size of the zoom lens system. On the other hand, when the value exceeds the upper limit of the condition (6), the thicknesses of the lens units are increased. Also in this case, the size of the zoom lens system is increased.

When at least one of the following conditions (6)' and (6)" is satisfied, the above-mentioned effect is achieved more successfully.

$$1.0 < (T_1 + T_2)/H \quad (6)'$$

$$(T_1 + T_2)/H < 1.9 \quad (6)"$$

For example, a zoom lens system having the basic configuration like the zoom lens systems according to Embodiments 1 to 14 preferably satisfies the following condition (1).

$$-1.8 < f_n/f_W < -0.3 \quad (1)$$

where $f_n$ is a composite focal length of the lens unit having negative optical power, which is the at least one focusing lens unit, and $f_W$ is a focal length of the entire system at a wide-angle limit.

The condition (1) sets forth the relationship between the focal length of the lens unit having negative optical power, which is the at least one focusing lens unit, and the focal length of the entire system at a wide-angle limit. When the value goes below the lower limit of the condition (1), the amount of lens movement in focusing increases, which might cause an increase in the overall length of lens system. On the other hand, when the value exceeds the upper limit of the condition (1), the optical power of the at least one focusing lens unit excessively increases, and spherical aberration and curvature of field occur in focusing. Thus, the performance in a close-object in-focus situation is deteriorated. In addition, generation of aberration due to decentering of the at least one focusing lens unit might be increased.

When at least one of the following conditions (1)' and (1)" is satisfied, the above-mentioned effect is achieved more successfully.

$$-1.6 < f_n/f_W \quad (1)'$$

$$f_n/f_W < -0.4 \quad (1)"$$

For example, a zoom lens system having the basic configuration like the zoom lens systems according to Embodiments 1 to 14 preferably satisfies the following condition (2).

$$0.1 < T_1/f_W < 1.5 \quad (2)$$

where $T_1$ is an axial thickness of the lens unit located closest to the object side, and $f_W$ is a focal length of the entire system at a wide-angle limit.

The condition (2) sets forth the relationship between the axial thickness of the first lens unit and the focal length of the entire system at a wide-angle limit. When the value goes below the lower limit of the condition (2), the optical power of the first lens unit cannot be increased, which might cause an increase in the size of the zoom lens system. On the other hand, when the value exceeds the upper limit of the condition (2), the thickness of the first lens unit is increased. Also in this case, the size of the zoom lens system might be increased.

When at least one of the following conditions (2)' and (2)" is satisfied, the above-mentioned effect is achieved more successfully.

$$0.17 < T_1/f_W \quad (2)'$$

$$T_1/f_W < 1.20 \quad (2)"$$

For example, a zoom lens system having the basic configuration like the zoom lens systems according to Embodiments 1 to 14 preferably satisfies the following condition (3).

$$1.0 < |f_1/f_W| < 4.5 \quad (3)$$

where $f_1$ is a composite focal length of the lens unit located closest to the object side, and $f_W$ is a focal length of the entire system at a wide-angle limit.

The condition (3) sets forth the relationship between the focal length of the first lens unit and the focal length of the entire system at a wide-angle limit. When the value goes below the lower limit of the condition (3), the optical power of the first lens unit increases, which might cause an increase in generation of aberration due to decentering of the first lens unit. On the other hand, when the value exceeds the upper limit of the condition (3), the thickness of the first lens unit is increased, which might cause an increase in the size of the zoom lens system.

When at least one of the following conditions (3)' and (3)" is satisfied, the above-mentioned effect is achieved more successfully.

$$1.2 < |f_1/f_W| \quad (3)'$$

$$|f_1/f_W| < 4.0 \quad (3)"$$

For example, a zoom lens system having the basic configuration like the zoom lens systems according to Embodiments 1 to 14 preferably satisfies the following condition (4).

$$0.2 < |f_2/f_W| < 1.0 \quad (4)$$

where $f_2$ is a composite focal length of the lens unit located having one air space toward the image side from the lens unit located closest to the object side, and $f_W$ is a focal length of the entire system at a wide-angle limit.

The condition (4) sets forth the relationship between the focal length of the lens unit located just on the image side of the first lens unit, i.e., the second lens unit, and the focal length of the entire system at a wide-angle limit. When the value goes below the lower limit of the condition (4), the optical power of the second lens unit increases, which might cause an increase in generation of aberration due to decentering of the second lens unit. On the other hand, when the value exceeds the upper limit of the condition (4), the amount of movement of the second lens unit increases in zooming, which might cause an increase in the overall length of lens system.

When at least one of the following conditions (4)' and (4)" is satisfied, the above-mentioned effect is achieved more successfully.

$$0.3 < |f_2/f_W| \tag{4}'$$

$$|f_2/f_W| < 0.9 \tag{4}''$$

For example, a zoom lens system having the basic configuration like the zoom lens systems according to Embodiments 1 to 14 preferably satisfies the following condition (5).

$$0.1 < (T_1 + T_2)/f_W < 2.5 \tag{5}$$

where $T_1$ is an axial thickness of the lens unit located closest to the object side, $T_2$ is an axial thickness of the lens unit located having one air space toward the image side from the lens unit located closest to the object side, and $f_W$ is a focal length of the entire system at a wide-angle limit.

The condition (5) sets forth the relationship between the sum of the axial thickness of the first lens unit and the axial thickness of the second lens unit, and the focal length of the entire system at a wide-angle limit. When the value goes below the lower limit of the condition (5), the optical powers of the lens units cannot be increased, which might cause an increase in the size of the zoom lens system. On the other hand, when the value exceeds the upper limit of the condition (5), the thicknesses of the lens units are increased. Also in this case, the size of the zoom lens system might be increased.

When at least one of the following conditions (5)' and (5)" is satisfied, the above-mentioned effect is achieved more successfully.

$$0.2 < (T_1 + T_2)/f_W \tag{5}'$$

$$(T_1 + T_2)/f_W < 2.0 \tag{5}''$$

The individual lens units constituting the zoom lens systems according to Embodiments 1 to 14 are each composed exclusively of refractive type lens elements that deflect incident light by refraction (that is, lens elements of a type in which deflection is achieved at the interface between media having different refractive indices). However, the present invention is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is preferable.

Embodiment 15

Figure 57:
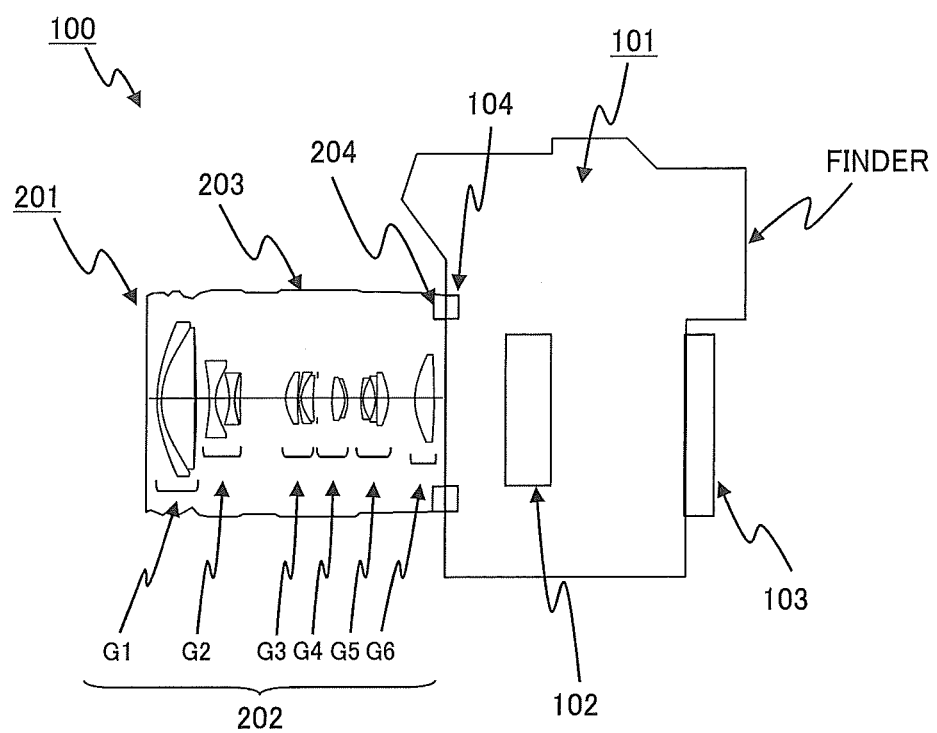
FIG. 57 is a schematic construction diagram of an interchangeable-lens type digital camera system according to Embodiment 15.

FIG. 57 is a schematic construction diagram of an interchangeable-lens type digital camera system according to Embodiment 15.

The interchangeable-lens type digital camera system 100 according to Embodiment 15 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 14; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 57, the zoom lens system according to Embodiment 1 is employed as the zoom lens system 202.

In Embodiment 15, since the zoom lens system 202 according to any of Embodiments 1 to 14 is employed, a compact interchangeable lens apparatus having excellent imaging performance can be realized at low cost. Moreover, size reduction and cost reduction of the entire camera system 100 according to Embodiment 15 can be achieved. In the zoom lens systems according to Embodiments 1 to 14, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 14.

Numerical examples are described below in which the zoom lens systems according to Embodiments 1 to 14 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1 - (1+\kappa)(h/r)^2}} + \sum A_n h^n$$

Here, the symbols in the formula represent the following quantities.

Z is the distance from a point on an aspherical surface at a height h relative to the optical axis to a tangential plane at the vertex of the aspherical surface, h is the height relative to the optical axis, r is the radius of curvature at the top, κ is a conic constant, and An is a n-th order aspherical coefficient.

FIGS. 2, 6, 10, 14, 18, 22, 26, 30, 34, 38, 42, 46, 50, and 54 are longitudinal aberration diagrams of an infinity in-focus situation of the zoom lens systems according to Examples 1 to 14, respectively.

FIGS. 3, 7, 11, 15, 19, 23, 27, 31, 35, 39, 43, 47, 51, and 55 are longitudinal aberration diagrams of a close-object in-focus situation of the zoom lens systems according to Examples 1 to 14, respectively. The object distance in each example is as follows.

Example 1 892 mm
Example 2 892 mm
Example 3 1887 mm
Example 4 1887 mm
Example 5 906 mm
Example 6 906 mm
Example 7 925 mm-915 mm-902 mm
Example 8 925 mm-915 mm-902 mm
Example 9 1905 mm-1882 mm-1870 mm
Example 10 1907 mm-1885 mm-1872 mm
Example 11 1888 mm
Example 12 1899 mm-1885 mm-1876 mm
Example 13 1903 mm-1884 mm-1871 mm
Example 14 1888 mm In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 4, 8, 12, 16, 20, 24, 28, 32, 36, 40, 44, 48, 52, and 56 are lateral aberration diagrams of the zoom lens systems at a telephoto limit according to Examples 1 to 14, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (Examples 1 and 2: the tenth lens element L10 and the eleventh lens element L11 in the fourth lens unit G4, Examples 3 to 14: the tenth lens element L10 and the eleventh lens element L11 in the third lens unit G3) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the fourth lens unit G4 (Examples 1 and 2), or the optical axis of the first lens unit G1 and the optical axis of the third lens unit G3 (Examples 3 to 14).

In the zoom lens system according to each example, the amount of movement of the image blur compensating lens unit in a direction perpendicular to the optical axis in the image blur compensation state at a telephoto limit is as follows.

Example 1 0.2 mm
Example 2 0.2 mm
Example 3 0.3 mm
Example 4 0.3 mm
Example 5 0.2 mm
Example 6 0.2 mm
Example 7 0.1 mm
Example 8 0.1 mm
Example 9 0.3 mm
Example 10 0.3 mm
Example 11 0.3 mm
Example 12 0.3 mm
Example 13 0.3 mm
Example 14 0.2 mm When the shooting distance is infinity, at a telephoto limit, the amount of image decentering in a case that the zoom lens system inclines by a prescribed angle is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to the prescribed angle without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data in an infinity in-focus situation. Table 4 shows various data in a close-object in-focus situation.

TABLE 1

Surface Data

| Surface number | r | d | nd | vd |
|---|---|---|---|---|
| Object surface | ∞ | | | |
| 1 | 47.20460 | 1.20000 | 1.84666 | 23.8 |
| 2 | 29.69880 | 8.10430 | 1.72916 | 54.7 |
| 3 | −489.55630 | 0.14360 | 1.51340 | 52.9 |
| 4* | −312.86800 | Variable | | |
| 5 | −277.35530 | 0.95000 | 1.91082 | 35.2 |
| 6 | 12.97730 | 3.83760 | | |
| 7* | −35.44210 | 1.20000 | 1.69400 | 56.3 |
| 8 | 31.67820 | 0.15000 | | |
| 9 | 22.22160 | 2.38520 | 1.94595 | 18.0 |
| 10 | 182.30180 | Variable | | |
| 11 | 13.55830 | 3.00130 | 1.68893 | 31.2 |
| 12 | 66.93350 | 0.15000 | | |
| 13 | 23.93040 | 0.60000 | 1.90366 | 31.3 |
| 14 | 9.55180 | 3.45070 | 1.50670 | 70.5 |
| 15* | 315.48540 | Variable | | |
| 16(Diaphragm) | ∞ | 3.50000 | | |
| 17* | 31.82490 | 3.20470 | 1.58700 | 59.6 |
| 18 | −10.70100 | 0.50000 | 1.84666 | 23.8 |
| 19 | −19.19890 | Variable | | |
| 20 | 60.67830 | 0.60000 | 1.91082 | 35.2 |
| 21 | 13.21100 | 2.19100 | | |
| 22 | −10.42010 | 0.50000 | 1.77250 | 49.6 |
| 23 | 775.03510 | 3.19070 | 1.74950 | 35.0 |
| 24 | −12.01310 | Variable | | |
| 25 | 22.90930 | 4.95230 | 1.50670 | 70.5 |
| 26* | −448.73650 | (BF) | | |
| Image surface | ∞ | | | |

TABLE 2

Aspherical Data

Surface No. 4

K = 0.00000E+00, A4 = 1.68276E−06, A6 = −7.01770E−10,
A8 = 0.00000E+00 A10 = 0.00000E+00

Surface No. 7

K = 0.00000E+00, A4 = 6.70850E−06, A6 = −1.69169E−07,
A8 = 2.77845E−09 A10 = −2.11675E−11

Surface No. 15

K = 0.00000E+00, A4 = 8.00986E−05, A6 = 2.24469E−07,
A8 = −7.00519E−10 A10 = 3.20233E−11

Surface No. 17

K = 0.00000E+00, A4 = −8.47688E−06, A6 = 2.02650E−07,
A8 = −1.08409E−08 A10 = 2.03356E−10

Surface No. 26

K = 0.00000E+00, A4 = 7.93948E−06, A6 = −5.27311E−08,
A8 = 1.48156E−11 A10 = 4.16705E−13

TABLE 3

Miscellaneous Data for Infinity In-Focus Situation
Zooming ratio 4.70878

| | Wide-angle limit | Middle position | Telephoto limit |
|---|---|---|---|
| Focal length | 17.5102 | 37.9943 | 82.4514 |
| F-number | 3.60560 | 4.94468 | 5.76841 |
| View angle | 34.9581 | 15.4609 | 7.1446 |
| Image height | 10.8150 | 10.8150 | 10.8150 |
| Overall length of lens system | 108.0000 | 108.0000 | 108.0000 |
| BF | 14.9500 | 14.9500 | 14.9500 |
| d4 | 1.0000 | 15.3826 | 27.5197 |
| d10 | 27.4284 | 11.9913 | 1.0000 |
| d15 | 1.6558 | 2.7102 | 1.5644 |
| d19 | 3.1000 | 7.2621 | 11.7759 |
| d24 | 16.0542 | 11.8921 | 7.3786 |

Zoom lens unit data

| Lens unit | Initial surface No. | Focal length |
|---|---|---|
| 1 | 1 | 62.71962 |
| 2 | 5 | −12.90268 |
| 3 | 11 | 26.49776 |
| 4 | 16 | 26.59654 |
| 5 | 20 | −20.48064 |
| 6 | 25 | 43.16940 |

TABLE 4

Miscellaneous Data for Close-Object In-Focus Situation
Zooming ratio 4.39311

| | Wide-angle limit | Middle position | Telephoto limit |
|---|---|---|---|
| Object distance | 892.0000 | 892.0000 | 892.0000 |
| Focal length | 17.4972 | 37.6888 | 76.8672 |
| F-number | 3.61693 | 4.98559 | 5.93736 |
| View angle | 34.8600 | 15.4148 | 6.9325 |
| Image height | 10.8150 | 10.8150 | 10.8150 |
| Overall length of lens system | 108.0000 | 108.0000 | 108.0000 |
| BF | 14.95000 | 14.95000 | 14.95000 |
| d4 | 1.0000 | 15.3826 | 27.5197 |
| d10 | 27.4284 | 11.9913 | 1.0000 |
| d15 | 1.6558 | 2.7102 | 1.5644 |
| d19 | 3.1780 | 7.6664 | 13.9616 |
| d24 | 15.9762 | 11.4878 | 5.1929 |

Zoom lens unit data

| Lens unit | Initial surface No. | Focal length |
|---|---|---|
| 1 | 1 | 62.71962 |
| 2 | 5 | −12.90268 |
| 3 | 11 | 26.49776 |
| 4 | 16 | 26.59654 |
| 5 | 20 | −20.48064 |
| 6 | 25 | 43.16940 |

Numerical Example 2

The zoom lens system of Numerical Example 2 corresponds to Embodiment 2 shown in FIG. 5. Table 5 shows the surface data of the zoom lens system of Numerical Example 2. Table 6 shows the aspherical data. Table 7 shows various data in an infinity in-focus situation. Table 8 shows various data in a close-object in-focus situation.

TABLE 5

Surface Data

| Surface number | r | d | nd | vd |
|---|---|---|---|---|
| Object surface | ∞ | | | |
| 1 | 47.25030 | 1.20000 | 1.84666 | 23.8 |
| 2 | 29.76190 | 8.75740 | 1.72916 | 54.7 |
| 3 | −533.43280 | 0.15600 | 1.51340 | 52.9 |
| 4* | −311.70500 | Variable | | |

TABLE 5-continued

Surface Data

| Surface number | r | d | nd | vd |
|---|---|---|---|---|
| 5 | −416.28100 | 0.95000 | 1.91082 | 35.2 |
| 6 | 12.35010 | 4.07760 | | |
| 7* | −36.99100 | 1.20000 | 1.69400 | 56.3 |
| 8 | 29.68400 | 0.15000 | | |
| 9 | 21.37080 | 2.45320 | 1.94595 | 18.0 |
| 10 | 152.74790 | Variable | | |
| 11 | 13.35480 | 2.97930 | 1.68893 | 31.2 |
| 12 | 94.64860 | 0.15000 | | |
| 13 | 27.10200 | 0.60000 | 1.90366 | 31.3 |
| 14 | 9.80050 | 3.18160 | 1.50670 | 70.5 |
| 15* | 190.73220 | Variable | | |
| 16(Diaphragm) | ∞ | 3.50000 | | |
| 17* | 31.37100 | 3.18280 | 1.58700 | 59.6 |
| 18 | −10.04170 | 0.50000 | 1.84666 | 23.8 |
| 19 | −17.91990 | Variable | | |
| 20 | 81.13220 | 0.60000 | 1.91082 | 35.2 |
| 21 | 13.77400 | 2.22910 | | |
| 22 | −10.46950 | 0.50000 | 1.77250 | 49.6 |
| 23 | −423.58050 | 3.20270 | 1.74950 | 35.0 |
| 24 | −12.12710 | Variable | | |
| 25 | 22.29940 | 5.31030 | 1.50670 | 70.5 |
| 26* | −198.61130 | (BF) | | |
| Image surface | ∞ | | | |

TABLE 6

Aspherical Data

Surface No. 4

K = 0.00000E+00, A4 = 1.79184E−06, A6 = −7.64307E−10,
A8 = 0.00000E+00 A10 = 0.00000E+00

Surface No. 7

K = 0.00000E+00, A4 = 9.11328E−06, A6 = −1.60174E−07,
A8 = 2.77825E−09 A10 = −1.90358E−11

Surface No. 15

K = 0.00000E+00, A4 = 9.14004E−05, A6 = 2.76016E−07,
A8 = 6.22866E−10 A10 = 2.05654E−11

Surface No. 17

K = 0.00000E+00, A4 = −8.63380E−06, A6 = 2.84986E−07,
A8 = −1.63225E−08 A10 = 3.33639E−10

Surface No. 26

K = 0.00000E+00, A4 = 1.11367E−05, A6 = −4.41687E−08,
A8 = −1.22957E−11 A10 = 4.88463E−13

TABLE 7

Miscellaneous Data for Infinity In-Focus Situation
Zooming ratio 4.70874

| | Wide-angle limit | Middle position | Telephoto limit |
|---|---|---|---|
| Focal length | 16.4800 | 35.7570 | 77.6000 |
| F-number | 3.60531 | 4.94448 | 5.76852 |
| View angle | 36.5298 | 16.3173 | 7.5853 |
| Image height | 10.8150 | 10.8150 | 10.8150 |
| Overall length of lens system | 108.0000 | 108.0000 | 108.0000 |
| BF | 14.9500 | 14.9500 | 14.9500 |
| d4 | 1.0000 | 15.1832 | 27.1818 |
| d10 | 27.0836 | 11.7542 | 1.0008 |
| d15 | 1.6818 | 2.8279 | 1.5826 |
| d19 | 3.1000 | 7.2982 | 12.0993 |
| d24 | 15.3044 | 11.1062 | 6.3054 |

TABLE 7-continued

Miscellaneous Data for Infinity In-Focus Situation
Zooming ratio 4.70874

Zoom lens unit data

| Lens unit | Initial surface No. | Focal length |
|---|---|---|
| 1 | 1 | 62.90839 |
| 2 | 5 | −12.48414 |
| 3 | 11 | 26.77067 |
| 4 | 16 | 25.39585 |
| 5 | 20 | −19.96077 |
| 6 | 25 | 39.88944 |

TABLE 8

Miscellaneous Data for Close-Object In-Focus Situation
Zooming ratio 4.43772

| | Wide-angle limit | Middle position | Telephoto limit |
|---|---|---|---|
| Object distance | 892.0000 | 892.0000 | 892.0000 |
| Focal length | 16.4757 | 35.5529 | 73.1145 |
| F-number | 3.61610 | 4.98296 | 5.92668 |
| View angle | 36.4551 | 16.2941 | 7.3811 |
| Image height | 10.8150 | 10.8150 | 10.8150 |
| Overall length of lens system | 108.0000 | 108.0000 | 108.0000 |
| BF | 14.9500 | 14.9500 | 14.9500 |
| d4 | 1.0000 | 15.1832 | 27.1818 |
| d10 | 27.0836 | 11.7542 | 1.0008 |
| d15 | 1.6818 | 2.8279 | 1.5826 |
| d19 | 3.1721 | 7.6711 | 14.1215 |
| d24 | 15.2323 | 10.7333 | 4.2831 |

Zoom lens unit data

| Lens unit | Initial surface No. | Focal length |
|---|---|---|
| 1 | 1 | 62.90839 |
| 2 | 5 | −12.48414 |
| 3 | 11 | 26.77067 |
| 4 | 16 | 25.39585 |
| 5 | 20 | −19.96077 |
| 6 | 25 | 39.88944 |

Numerical Example 3

The zoom lens system of Numerical Example 3 corresponds to Embodiment 3 shown in FIG. 9. Table 9 shows the surface data of the zoom lens system of Numerical Example 3. Table 10 shows the aspherical data. Table 11 shows various data in an infinity in-focus situation. Table 12 shows various data in a close-object in-focus situation.

TABLE 9

Surface Data

| Surface number | r | d | nd | vd |
|---|---|---|---|---|
| Object surface | ∞ | | | |
| 1 | 54.44810 | 4.14060 | 1.48749 | 70.4 |
| 2 | −293.67560 | 0.15000 | | |
| 3 | 36.97930 | 1.00000 | 1.85026 | 32.3 |
| 4 | 24.76970 | 5.00000 | 1.49700 | 81.6 |
| 5 | 117.90300 | Variable | | |
| 6 | 300.86670 | 0.80000 | 1.80610 | 33.3 |
| 7 | 13.15210 | 2.52510 | 1.94595 | 18.0 |
| 8 | 24.75450 | 1.78060 | | |

TABLE 9-continued

Surface Data

| Surface number | r | d | nd | vd |
|---|---|---|---|---|
| 9 | −39.98090 | 0.70000 | 1.80420 | 46.5 |
| 10 | 95.98970 | Variable | | |
| 11* | 18.13840 | 4.97730 | 1.73077 | 40.5 |
| 12* | −250.04830 | 1.69990 | | |
| 13(Diaphragm) | ∞ | 1.50000 | | |
| 14 | 52.45000 | 0.80000 | 1.90366 | 31.3 |
| 15 | 12.48010 | 3.65990 | 1.48749 | 70.4 |
| 16 | 40.02800 | 1.60000 | | |
| 17* | 22.23100 | 4.86470 | 1.58913 | 61.3 |
| 18 | −21.70900 | 0.70000 | 1.76182 | 26.6 |
| 19 | −34.24420 | Variable | | |
| 20 | 41.39470 | 0.70000 | 1.77250 | 49.6 |
| 21 | 15.86770 | Variable | | |
| 22 | −27.20030 | 0.80000 | 1.80420 | 46.5 |
| 23 | 95.24050 | Variable | | |
| 24 | 51.12720 | 4.04150 | 1.84666 | 23.8 |
| 25 | −54.89130 | (BF) | | |
| Image surface | ∞ | | | |

TABLE 10

Aspherical Data

Surface No. 11

K = 0.00000E+00, A4 = −1.55541E−05, A6 = −2.89455E−08,
A8 = −4.68397E−10 A10 = −1.14625E−11
Surface No. 12

K = 0.00000E+00, A4 = 4.26859E−06, A6 = 5.46129E−08,
A8 = −2.61559E−09 A10 = 2.01130E−12
Surface No. 17

K = 0.00000E+00, A4 = −2.19082E−05, A6 = 1.18133E−07,
A8 = −4.30068E−09 A10 = 3.85076E−11

TABLE 11

Miscellaneous Data for Infinity In-Focus Situation
Zooming ratio 3.66232

| | Wide-angle limit | Middle position | Telephoto limit |
|---|---|---|---|
| Focal length | 46.3505 | 88.7109 | 169.7507 |
| F-number | 4.12045 | 4.94457 | 5.76851 |
| View angle | 13.2929 | 6.8441 | 3.5698 |
| Image height | 10.8150 | 10.8150 | 10.8150 |
| Overall length of lens system | 113.0000 | 113.0000 | 113.0000 |
| BF | 15.0500 | 15.0500 | 15.0500 |
| d5 | 1.3551 | 14.9506 | 27.1014 |
| d10 | 26.7842 | 13.1887 | 1.0379 |
| d19 | 2.5948 | 6.2149 | 2.6000 |
| d21 | 24.2750 | 17.7696 | 16.9871 |
| d23 | 1.5000 | 4.3854 | 8.7829 |

Zoom lens unit data

| Lens unit | Initial surface No. | Focal length |
|---|---|---|
| 1 | 1 | 64.23003 |
| 2 | 6 | −18.67428 |
| 3 | 11 | 21.51493 |
| 4 | 20 | −33.71180 |
| 5 | 22 | −26.23266 |
| 6 | 24 | 31.82149 |

TABLE 12

Miscellaneous Data for Close-Object In-Focus Situation
Zooming ratio 3.31774

| | Wide-angle limit | Middle position | Telephoto limit |
|---|---|---|---|
| Object distance | 1887.0000 | 1887.0000 | 1887.0000 |
| Focal length | 45.5515 | 84.1167 | 151.1281 |
| F-number | 4.13432 | 4.97079 | 5.89224 |
| View angle | 13.2598 | 6.8093 | 3.4896 |
| Image height | 10.8150 | 10.8150 | 10.8150 |
| Overall length of lens system | 113.0000 | 113.0000 | 113.0000 |
| BF | 15.0500 | 15.0500 | 15.0500 |
| d5 | 1.3551 | 14.9506 | 27.1014 |
| d10 | 26.7842 | 13.1887 | 1.0379 |
| d19 | 2.8199 | 7.1560 | 5.7513 |
| d21 | 24.0498 | 16.8285 | 13.8359 |
| d23 | 1.5000 | 4.3854 | 8.7829 |

Zoom lens unit data

| Lens unit | Initial surface No. | Focal length |
|---|---|---|
| 1 | 1 | 64.23003 |
| 2 | 6 | −18.67428 |
| 3 | 11 | 21.51493 |
| 4 | 20 | −33.71180 |
| 5 | 22 | −26.23266 |
| 6 | 24 | 31.82149 |

Numerical Example 4

The zoom lens system of Numerical Example 4 corresponds to Embodiment 4 shown in FIG. 13. Table 13 shows the surface data of the zoom lens system of Numerical Example 4. Table 14 shows the aspherical data. Table 15 shows various data in an infinity in-focus situation. Table 16 shows various data in a close-object in-focus situation.

TABLE 13

Surface Data

| Surface number | r | d | nd | vd |
|---|---|---|---|---|
| Object surface | ∞ | | | |
| 1 | 52.44910 | 4.16490 | 1.48749 | 70.4 |
| 2 | −406.38170 | 0.15000 | | |
| 3 | 38.20110 | 1.00000 | 1.85026 | 32.3 |
| 4 | 25.18950 | 5.00000 | 1.49700 | 81.6 |
| 5 | 129.03810 | Variable | | |
| 6 | 3113.95460 | 0.80000 | 1.80610 | 33.3 |
| 7 | 13.09450 | 2.75650 | 1.94595 | 18.0 |
| 8 | 25.71730 | 1.82890 | | |
| 9 | −42.73270 | 0.70000 | 1.80420 | 46.5 |
| 10 | 86.23710 | Variable | | |
| 11* | 17.85620 | 4.47360 | 1.73077 | 40.5 |
| 12* | −555.93570 | 1.50000 | | |
| 13(Diaphragm) | ∞ | 1.80950 | | |
| 14 | 47.10430 | 0.80000 | 1.90366 | 31.3 |
| 15 | 12.30330 | 3.25840 | 1.48749 | 70.4 |
| 16 | 33.01880 | 1.60000 | | |
| 17* | 21.16580 | 4.77200 | 1.58913 | 61.3 |
| 18 | −20.48400 | 0.70000 | 1.76182 | 26.6 |
| 19 | −32.12200 | Variable | | |
| 20 | 41.53050 | 0.70000 | 1.77250 | 49.6 |
| 21 | 15.94070 | Variable | | |
| 22 | −25.75660 | 0.80000 | 1.80420 | 46.5 |
| 23 | 155.42820 | Variable | | |
| 24 | 48.68500 | 3.85860 | 1.84666 | 23.8 |
| 25 | −62.89940 | (BF) | | |
| Image surface | ∞ | | | |

TABLE 14

Aspherical Data

Surface No. 11

K = 0.00000E+00, A4 = −1.42197E−05, A6 = −3.87023E−08,
A8 = −7.25139E−10 A10 = −1.69659E−11
Surface No. 12

K = 0.00000E+00, A4 = 5.33503E−06, A6 = 5.61400E−08,
A8 = −3.64586E−09 A10 = 3.30029E−12
Surface No. 17

K = 0.00000E+00, A4 = −2.54570E−05, A6 = 1.62685E−07,
A8 = −6.47257E−09 A10 = 6.23772E−11

TABLE 15

Miscellaneous Data for Infinity In-Focus Situation

Zooming ratio 4.12013

|  | Wide-angle limit | Middle position | Telephoto limit |
|---|---|---|---|
| Focal length | 41.2001 | 83.6369 | 169.7500 |
| F-number | 4.12045 | 4.94460 | 5.76841 |
| View angle | 15.0729 | 7.2771 | 3.5688 |
| Image height | 10.8150 | 10.8150 | 10.8150 |
| Overall length of lens system | 113.0000 | 113.0000 | 113.0000 |
| BF | 15.0500 | 15.0500 | 15.0500 |
| d5 | 1.2796 | 16.2394 | 29.2429 |
| d10 | 29.1073 | 14.1475 | 1.1440 |
| d19 | 2.6029 | 6.5552 | 2.5686 |
| d21 | 22.7865 | 16.2852 | 15.6044 |
| d23 | 1.5000 | 4.0490 | 8.7164 |

Zoom lens unit data

| Lens unit | Initial surface No. | Focal length |
|---|---|---|
| 1 | 1 | 65.46808 |
| 2 | 6 | −18.36922 |
| 3 | 11 | 21.30591 |
| 4 | 20 | −33.89361 |
| 5 | 22 | −27.42072 |
| 6 | 24 | 32.93578 |

TABLE 16

Miscellaneous Data for Close-Object In-Focus Situation

Zooming ratio 3.66923

|  | Wide-angle limit | Middle position | Telephoto limit |
|---|---|---|---|
| Object distance | 1887.0000 | 1887.0000 | 1887.0000 |
| Focal length | 40.6196 | 79.4290 | 149.0426 |
| F-number | 4.13151 | 4.96704 | 5.89169 |
| View angle | 15.0399 | 7.2477 | 3.4895 |
| Image height | 10.8150 | 10.8150 | 10.8150 |
| Overall length of lens system | 113.0000 | 113.0000 | 113.0000 |
| BF | 15.0500 | 15.0500 | 15.0500 |
| d5 | 1.2796 | 16.2394 | 29.2429 |
| d10 | 29.1073 | 14.1475 | 1.1440 |
| d19 | 2.7946 | 7.4706 | 5.9741 |
| d21 | 22.5948 | 15.3698 | 12.1989 |
| d23 | 1.5000 | 4.0490 | 8.7164 |

TABLE 16-continued

Miscellaneous Data for Close-Object In-Focus Situation

Zoom lens unit data

| Lens unit | Initial surface No. | Focal length |
|---|---|---|
| 1 | 1 | 65.46808 |
| 2 | 6 | −18.36922 |
| 3 | 11 | 21.30591 |
| 4 | 20 | −33.89361 |
| 5 | 22 | −27.42072 |
| 6 | 24 | 32.93578 |

Numerical Example 5

The zoom lens system of Numerical Example 5 corresponds to Embodiment 5 shown in FIG. 17. Table 17 shows the surface data of the zoom lens system of Numerical Example 5. Table 18 shows the aspherical data. Table 19 shows various data in an infinity in-focus situation. Table 20 shows various data in a close-object in-focus situation.

TABLE 17

Surface Data

| Surface number | r | d | nd | vd |
|---|---|---|---|---|
| Object surface | ∞ |  |  |  |
| 1 | 34.00680 | 1.30000 | 1.84666 | 23.8 |
| 2 | 22.45450 | 8.32790 | 1.72916 | 54.7 |
| 3 | 422.60240 | 0.10000 | 1.51340 | 52.9 |
| 4* | 574.50950 | Variable |  |  |
| 5 | 251.12810 | 1.15000 | 1.91082 | 35.2 |
| 6 | 11.80570 | 5.44540 |  |  |
| 7 | −32.28520 | 0.85000 | 1.69680 | 55.5 |
| 8 | 46.23170 | 0.15000 |  |  |
| 9 | 24.34680 | 2.28150 | 1.94595 | 18.0 |
| 10 | 105.65520 | Variable |  |  |
| 11(Diaphragm) | ∞ | 1.50000 |  |  |
| 12 | 10.47120 | 2.35560 | 1.71736 | 29.5 |
| 13 | 15.58500 | 0.15000 |  |  |
| 14 | 11.74320 | 0.50000 | 1.90366 | 31.3 |
| 15 | 6.88020 | 4.45380 | 1.50670 | 70.5 |
| 16* | 105.06080 | 2.20210 |  |  |
| 17* | 33.31900 | 2.91280 | 1.58700 | 59.6 |
| 18 | −10.93590 | 0.50000 | 1.80610 | 33.3 |
| 19 | −18.93090 | Variable |  |  |
| 20 | 920.63270 | 0.60000 | 1.80450 | 39.6 |
| 21 | 11.78560 | Variable |  |  |
| 22 | 54.18730 | 4.01220 | 1.50670 | 70.5 |
| 23* | −40.55810 | (BF) |  |  |
| Image surface | ∞ |  |  |  |

TABLE 18

Aspherical Data

Surface No. 4

K = 0.00000E+00, A4 = 1.57114E−06, A6 = 0.00000E+00
Surface No. 16

K = 0.00000E+00, A4 = 1.51261E−04, A6 = 0.00000E+00
Surface No. 17

K = 0.00000E+00, A4 = −2.17837E−05, A6 = −9.63960E−08
Surface No. 23

K = 0.00000E+00, A4 = −2.17009E−05, A6 = −1.16487E−07

TABLE 19

Miscellaneous Data for Infinity In-Focus Situation

Zooming ratio 4.70872

|  | Wide-angle limit | Middle position | Telephoto limit |
|---|---|---|---|
| Focal length | 14.4199 | 31.2913 | 67.8994 |
| F-number | 3.60542 | 5.15047 | 5.76893 |
| View angle | 39.8151 | 19.2717 | 8.8722 |
| Image height | 10.8150 | 10.8150 | 10.8150 |
| Overall length of lens system | 94.0000 | 94.0000 | 94.0000 |
| BF | 14.9500 | 14.9500 | 14.9500 |
| d4 | 1.0000 | 8.8472 | 17.2942 |
| d10 | 29.6858 | 14.1186 | 2.1051 |
| d19 | 3.1000 | 5.2584 | 9.0148 |
| d21 | 6.4729 | 12.0343 | 11.8445 |

Zoom lens unit data

| Lens unit | Initial surface No. | Focal length |
|---|---|---|
| 1 | 1 | 54.02245 |
| 2 | 5 | −12.16838 |
| 3 | 11 | 15.28693 |
| 4 | 20 | −14.84386 |
| 5 | 22 | 46.44071 |

TABLE 20

Miscellaneious Data for Close-Object In-Focus Situation

Zooming ratio 4.39313

|  | Wide-angle limit | Middle position | Telephoto limit |
|---|---|---|---|
| Object distance | 906.0000 | 906.0000 | 906.0000 |
| Focal length | 14.3502 | 30.8082 | 63.0422 |
| F-number | 3.60753 | 5.16145 | 5.80807 |
| View angle | 39.8526 | 19.2579 | 8.7691 |
| Image height | 10.8150 | 10.8150 | 10.8150 |
| Overall length of lens system | 94.0000 | 93.9996 | 93.9996 |
| BF | 14.94999 | 14.94985 | 14.94965 |
| d4 | 1.0000 | 8.8472 | 17.2942 |
| d10 | 29.6858 | 14.1186 | 2.1051 |
| d19 | 3.1567 | 5.4652 | 9.9920 |
| d21 | 6.4162 | 11.8275 | 10.8673 |

Zoom lens unit data

| Lens unit | Initial surface No. | Focal length |
|---|---|---|
| 1 | 1 | 54.02245 |
| 2 | 5 | −12.16838 |
| 3 | 11 | 15.28693 |
| 4 | 20 | −14.84386 |
| 5 | 22 | 46.44071 |

Numerical Example 6

The zoom lens system of Numerical Example 6 corresponds to Embodiment 6 shown in FIG. 21. Table 21 shows the surface data of the zoom lens system of Numerical Example 6. Table 22 shows the aspherical data. Table 23 shows various data in an infinity in-focus situation. Table 24 shows various data in a close-object in-focus situation.

TABLE 21

Surface Data

| Surface number | r | d | nd | vd |
|---|---|---|---|---|
| Object surface | ∞ |  |  |  |
| 1 | 33.07100 | 1.30000 | 1.84666 | 23.8 |
| 2 | 21.69310 | 7.45150 | 1.72916 | 54.7 |
| 3 | 545.35040 | 0.10000 | 1.51340 | 52.9 |
| 4* | 793.01880 | Variable |  |  |
| 5 | 385.58100 | 1.15000 | 1.91082 | 35.2 |
| 6 | 11.99350 | 5.09580 |  |  |
| 7 | −31.59260 | 0.85000 | 1.69680 | 55.5 |
| 8 | 47.74560 | 0.15000 |  |  |
| 9 | 24.83990 | 2.26280 | 1.94595 | 18.0 |
| 10 | 127.07740 | Variable |  |  |
| 11(Diaphragm) | ∞ | 1.50000 |  |  |
| 12 | 10.78860 | 2.31340 | 1.71736 | 29.5 |
| 13 | 16.02460 | 0.15000 |  |  |
| 14 | 12.20220 | 0.50000 | 1.90366 | 31.3 |
| 15 | 7.18080 | 4.61540 | 1.50670 | 70.5 |
| 16* | 161.53430 | 2.18530 |  |  |
| 17* | 33.96670 | 3.05300 | 1.58700 | 59.6 |
| 18 | −11.41870 | 0.50000 | 1.80610 | 33.3 |
| 19 | −19.51530 | Variable |  |  |
| 20 | 443.45210 | 0.60000 | 1.80450 | 39.6 |
| 21 | 11.84510 | Variable |  |  |
| 22 | 57.33720 | 3.95270 | 1.50670 | 70.5 |
| 23* | −43.30360 | (BF) |  |  |
| Image surface | ∞ |  |  |  |

TABLE 22

Aspherical Data

Surface No. 4

K = 0.00000E+00, A4 = 1.70243E−06, A6 = 0.00000E+00

Surface No. 16

K = 0.00000E+00, A4 = 1.42185E−04, A6 = 0.00000E+00

Surface No. 17

K = 0.00000E+00, A4 = −1.97980E−05, A6 = −1.62905E−07

Surface No. 23

K = 0.00000E+00, A4 = −1.96388E−05, A6 = −9.98887E−08

TABLE 23

Miscellaneous Data for Infinity In-Focus Situation

Zooming ratio 4.70874

|  | Wide-angle limit | Middle position | Telephoto limit |
|---|---|---|---|
| Focal length | 15.4499 | 33.5260 | 72.7493 |
| F-number | 3.60501 | 5.15015 | 5.76899 |
| View angle | 38.0736 | 18.0293 | 8.2906 |
| Image height | 10.8150 | 10.8150 | 10.8150 |
| Overall length of lens system | 94.0000 | 94.0000 | 94.0000 |
| BF | 14.9500 | 14.9500 | 14.9500 |
| d4 | 1.0000 | 8.8945 | 17.7046 |
| d10 | 29.2037 | 13.8181 | 2.0865 |
| d19 | 3.1000 | 5.2151 | 8.2694 |
| d21 | 8.0163 | 13.3922 | 13.2594 |

Zoom lens unit data

| Lens unit | Initial surface No. | Focal length |
|---|---|---|
| 1 | 1 | 51.67914 |
| 2 | 5 | −12.35737 |

TABLE 23-continued

Miscellaneous Data for Infinity In-Focus Situation

| 3 | 11 | 15.41868 |
| 4 | 20 | −15.13694 |
| 5 | 22 | 49.34162 |

TABLE 24

Miscellaneous Data for Close-Object In-Focus situation

Zooming ratio 4.36565

|  | Wide-angle limit | Middle position | Telephoto limit |
| --- | --- | --- | --- |
| Object distance | 906.0000 | 906.0000 | 906.0000 |
| Focal length | 15.3700 | 32.9589 | 67.1001 |
| F-number | 3.60728 | 5.16198 | 5.81421 |
| View angle | 38.0658 | 18.0103 | 8.1909 |
| Image height | 10.8150 | 10.8150 | 10.8150 |
| Overall length of lens system | 93.9999 | 93.9995 | 93.9998 |
| BF | 14.95004 | 14.94973 | 14.94997 |
| d4 | 1.0000 | 8.8945 | 17.7046 |
| d10 | 29.2037 | 13.8181 | 2.0865 |
| d19 | 3.1609 | 5.4402 | 9.3301 |
| d21 | 7.9554 | 13.1671 | 12.1987 |

Zoom lens unit data

| Lens unit | Initial surface No. | Focal length |
| --- | --- | --- |
| 1 | 1 | 51.67914 |
| 2 | 5 | −12.35737 |
| 3 | 11 | 15.41868 |
| 4 | 20 | −15.13694 |
| 5 | 22 | 49.34162 |

Numerical Example 7

The zoom lens system of Numerical Example 7 corresponds to Embodiment 7 shown in FIG. 25. Table 25 shows the surface data of the zoom lens system of Numerical Example 7. Table 26 shows the aspherical data. Table 27 shows various data in an infinity in-focus situation. Table 28 shows various data in a close-object in-focus situation.

TABLE 25

Surface Data

| Surface number | r | d | nd | vd |
| --- | --- | --- | --- | --- |
| Object surface | ∞ | | | |
| 1 | 31.96080 | 1.00000 | 1.84666 | 23.8 |
| 2 | 20.43210 | 5.68820 | 1.77200 | 50.0 |
| 3* | 409.95250 | Variable | | |
| 4 | 401.62900 | 0.85000 | 1.91082 | 35.2 |
| 5 | 9.78210 | 3.96540 | | |
| 6* | −24.90050 | 1.00000 | 1.69400 | 56.3 |
| 7 | 31.56450 | 0.15000 | | |
| 8 | 20.33800 | 1.99910 | 1.94595 | 18.0 |
| 9 | 130.77200 | Variable | | |
| 10 | 10.43560 | 2.11890 | 1.70154 | 41.1 |
| 11 | 19.52830 | 0.15000 | | |
| 12 | 9.97630 | 0.50000 | 1.90366 | 31.3 |
| 13 | 6.49910 | 2.37930 | 1.51200 | 52.1 |
| 14* | 12.97350 | 2.26360 | | |
| 15(Diaphragm) | ∞ | 3.50000 | | |
| 16* | 17.05230 | 3.18930 | 1.54250 | 62.9 |
| 17 | −10.18790 | 0.50000 | 1.78472 | 25.7 |
| 18 | −16.03740 | Variable | | |
| 19 | 18.52540 | 0.60000 | 1.80610 | 33.3 |
| 20 | 10.98530 | 4.32310 | | |
| 21 | −17.02970 | 0.60000 | 1.80610 | 33.3 |
| 22 | −32.95610 | Variable | | |
| 23 | 131.40280 | 3.86360 | 1.81000 | 41.0 |
| 24* | −34.02040 | (BF) | | |
| Image surface | ∞ | | | |

TABLE 26

Aspherical Data

Surface No. 3

K = 0.00000E+00, A4 = 1.44108E−06, A6 = 0.00000E+00

Surface No. 6

K = 0.00000E+00, A4 = 1.44389E−05, A6 = 1.22266E−07

Surface No. 14

K = 0.00000E+00, A4 = 1.70402E−04, A6 = 1.61644E−06

Surface No. 16

K = 0.00000E+00, A4 = −8.37860E−05, A6 = 3.14354E−07

Surface No. 24

K = 0.00000E+00, A4 = 3.17288E−06, A6 = −1.72491E−08

TABLE 27

Miscellaneous Data for Infinity In-Focus Situation
Zooming ratio 4.70878

|  | Wide-angle limit | Middle position | Telephoto limit |
| --- | --- | --- | --- |
| Focal length | 14.4199 | 31.2919 | 67.8999 |
| F-number | 3.60521 | 5.15009 | 5.76904 |
| View angle | 39.9647 | 18.8596 | 8.8711 |
| Image height | 10.8150 | 10.8150 | 10.8150 |
| Overall length of lens system | 75.0000 | 85.0900 | 98.0000 |
| BF | 14.9500 | 14.9500 | 14.9500 |
| d3 | 1.0644 | 7.6274 | 17.7848 |
| d9 | 14.9577 | 6.1047 | 1.0000 |
| d18 | 3.1000 | 7.1724 | 9.4753 |
| d22 | 2.2873 | 10.5919 | 16.1493 |

Zoom lens unit data

| Lens unit | Initial surface No. | Focal length |
| --- | --- | --- |
| 1 | 1 | 47.23449 |
| 2 | 4 | −9.65669 |
| 3 | 10 | 15.78348 |
| 4 | 19 | −18.67833 |
| 5 | 23 | 33.71533 |

TABLE 28

Miscellaneous Data for Close-Object In-Focus Situation
Zooming ratio 4.70315

|  | Wide-angle limit | Middle position | Telephoto limit |
| --- | --- | --- | --- |
| Object distance | (Refer to d0) | | |
| Focal length | 14.3642 | 31.0973 | 67.5569 |

TABLE 28-continued

Miscellaneous Data for Close-Object In-Focus Situation
Zooming ratio 4.70315

|  | | | |
|---|---|---|---|
| F-number | 3.61105 | 5.17462 | 5.86612 |
| View angle | 39.9172 | 18.7806 | 8.6930 |
| Image height | 10.8150 | 10.8150 | 10.8150 |
| Overall length of lens system | 75.0000 | 85.0900 | 98.0000 |
| BF | 14.9500 | 14.9500 | 14.9500 |
| d0 | 925.0000 | 915.1450 | 902.0000 |
| d3 | 1.0644 | 7.6274 | 17.7848 |
| d9 | 14.9577 | 6.1047 | 1.0000 |
| d18 | 3.2037 | 7.5276 | 10.8625 |
| d22 | 2.1836 | 10.2367 | 14.7621 |

Zoom lens unit data

| Lens unit | Initial surface No. | Focal length |
|---|---|---|
| 1 | 1 | 47.23449 |
| 2 | 4 | −9.65669 |
| 3 | 10 | 15.78348 |
| 4 | 19 | −18.67833 |
| 5 | 23 | 33.71533 |

Numerical Example 8

The zoom lens system of Numerical Example 8 corresponds to Embodiment 8 shown in FIG. 29. Table 29 shows the surface data of the zoom lens system of Numerical Example 8. Table 30 shows the aspherical data. Table 31 shows various data in an infinity in-focus situation. Table 32 shows various data in a close-object in-focus situation.

TABLE 29

Surface Data

| Surface number | r | d | nd | vd |
|---|---|---|---|---|
| Object surface | ∞ | | | |
| 1 | 31.42750 | 1.00000 | 1.84666 | 23.8 |
| 2 | 19.90360 | 5.45950 | 1.77200 | 50.0 |
| 3* | 789.18700 | Variable | | |
| 4 | −1212.73360 | 0.85000 | 1.91082 | 35.2 |
| 5 | 9.99500 | 3.71970 | | |
| 6* | −24.58490 | 1.00000 | 1.69400 | 56.3 |
| 7 | 36.13310 | 0.15000 | | |
| 8 | 21.13770 | 1.93970 | 1.94595 | 18.0 |
| 9 | 155.33150 | Variable | | |
| 10 | 10.00700 | 2.15540 | 1.70154 | 41.1 |
| 11 | 17.00940 | 0.15000 | | |
| 12 | 9.59170 | 0.50000 | 1.90366 | 31.3 |
| 13 | 6.21160 | 2.57220 | 1.51200 | 52.1 |
| 14* | 13.31040 | 2.27980 | | |
| 15(Diaphragm) | ∞ | 3.50000 | | |
| 16* | 16.60010 | 3.17140 | 1.54250 | 62.9 |
| 17 | −10.93980 | 0.50000 | 1.78472 | 25.7 |
| 18 | −16.79140 | Variable | | |
| 19 | 19.99950 | 0.60000 | 1.80610 | 33.3 |
| 20 | 11.34600 | 4.68260 | | |
| 21 | −17.80520 | 0.60000 | 1.80610 | 33.3 |
| 22 | −37.26070 | Variable | | |
| 23 | 95.88080 | 3.89660 | 1.81000 | 41.0 |
| 24* | −38.54830 | (BF) | | |
| Image surface | ∞ | | | |

TABLE 30

Aspherical Data

Surface No. 3

K = 0.00000E+00, A4 = 1.69002E−06, A6 = 0.00000E+00

Surface No. 6

K = 0.00000E+00, A4 = 1.32707E−05, A6 = 1.78869E−07

Surface No. 14

K = 0.00000E+00, A4 = 1.86448E−04, A6 = 1.70072E−06

Surface No. 16

K = 0.00000E+00, A4 = −8.76199E−05, A6 = 3.00389E−07

Surface No. 24

K = 0.00000E+00, A4 = 2.15266E−06, A6 = −1.17156E−08

TABLE 31

Miscellaneous Data for Infinity In-Focus Situation
Zooming ratio 4.70874

|  | Wide-angle limit | Middle position | Telephoto limit |
|---|---|---|---|
| Focal length | 15.4499 | 33.5264 | 72.7497 |
| F-number | 3.60552 | 5.15063 | 5.76890 |
| View angle | 38.1157 | 17.7285 | 8.3020 |
| Image height | 10.8150 | 10.8150 | 10.8150 |
| Overall length of lens system | 75.0000 | 84.9500 | 98.0000 |
| BF | 14.9500 | 14.9500 | 14.9500 |
| d3 | 1.1121 | 7.1770 | 17.0828 |
| d9 | 14.8073 | 5.9282 | 1.0000 |
| d18 | 3.1000 | 7.0432 | 8.3757 |
| d22 | 2.3035 | 11.1298 | 17.8644 |

Zoom lens unit data

| Lens unit | Initial surface No. | Focal length |
|---|---|---|
| 1 | 1 | 44.74346 |
| 2 | 4 | −9.81882 |
| 3 | 10 | 15.86679 |
| 4 | 19 | −17.91170 |
| 5 | 23 | 34.38987 |

TABLE 32

Miscellaneous Data for Close-Object In-Focus Situation
Zooming ratio 4.72183

|  | Wide-angle limit | Middle position | Telephoto limit |
|---|---|---|---|
| Object distance | (Refer to d0) | | |
| Focal length | 15.3789 | 33.2778 | 72.6167 |
| F-number | 3.61174 | 5.17687 | 5.87804 |
| View angle | 38.0493 | 17.6453 | 8.1285 |
| Image height | 10.8150 | 10.8150 | 10.8150 |
| Overall length of lens system | 75.0000 | 84.9500 | 98.0000 |
| BF | 14.9500 | 14.9500 | 14.9500 |
| d0 | 924.9999 | 914.6495 | 902.0000 |
| d3 | 1.1121 | 7.1770 | 17.0828 |
| d9 | 14.8073 | 5.9282 | 1.0000 |
| d18 | 3.2096 | 7.4118 | 9.7642 |
| d22 | 2.1939 | 10.7612 | 16.4759 |

TABLE 32-continued

Miscellaneous Data for Close-Object In-Focus Situation
Zooming ratio 4.72183

Zoom lens unit data

| Lens unit | Initial surface No. | Focal length |
|---|---|---|
| 1 | 1 | 44.74346 |
| 2 | 4 | −9.81882 |
| 3 | 10 | 15.86679 |
| 4 | 19 | −17.91170 |
| 5 | 23 | 34.38987 |

Numerical Example 9

The zoom lens system of Numerical Example 9 corresponds to Embodiment 9 shown in FIG. 33. Table 33 shows the surface data of the zoom lens system of Numerical Example 9. Table 34 shows the aspherical data. Table 35 shows various data in an infinity in-focus situation. Table 36 shows various data in a close-object in-focus situation.

TABLE 33

Surface Data

| Surface number | r | d | nd | vd |
|---|---|---|---|---|
| Object surface | ∞ | | | |
| 1 | 79.75820 | 4.01020 | 1.48749 | 70.4 |
| 2 | −356.47490 | 0.15000 | | |
| 3 | 51.68600 | 1.00000 | 1.85026 | 32.3 |
| 4 | 35.06410 | 5.00000 | 1.49700 | 81.6 |
| 5 | 164.33040 | Variable | | |
| 6 | −1539.92530 | 0.80000 | 1.80610 | 33.3 |
| 7 | 12.42260 | 2.10400 | 1.94595 | 18.0 |
| 8 | 24.23510 | 1.40390 | | |
| 9 | −29.79290 | 0.70000 | 1.80420 | 46.5 |
| 10 | 5547.26370 | Variable | | |
| 11* | 16.97180 | 3.93880 | 1.73077 | 40.5 |
| 12* | 200.18840 | 1.57160 | | |
| 13(Diaphragm) | ∞ | 1.50000 | | |
| 14 | 30.80630 | 0.80000 | 1.90366 | 31.3 |
| 15 | 11.42360 | 3.94660 | 1.48749 | 70.4 |
| 16 | 42.09740 | 1.60000 | | |
| 17* | 20.98960 | 5.00000 | 1.58913 | 61.3 |
| 18 | −20.12990 | 0.70000 | 1.76182 | 26.6 |
| 19 | −30.69070 | Variable | | |
| 20 | 36.91110 | 0.70000 | 1.77250 | 49.6 |
| 21 | 17.46220 | Variable | | |
| 22 | −21.10090 | 0.80000 | 1.80420 | 46.5 |
| 23 | 157.40960 | Variable | | |
| 24 | 49.22760 | 3.67990 | 1.84666 | 23.8 |
| 25 | −59.94950 | (BF) | | |
| Image surface | ∞ | | | |

TABLE 34

Aspherical Data

Surface No. 11

K = 0.00000E+00, A4 = −2.43371E−05, A6 = −5.28356E−08,
A8 = −1.80635E−09 A10 = −1.88606E−11

Surface No. 12

K = 0.00000E+00, A4 = −3.44912E−06, A6 = 4.36943E−08,
A8 = −4.32791E−09 A10 = −6.52259E−13

Surface No. 17

K = 0.00000E+00, A4 = −3.15749E−05, A6 = 1.11709E−07,
A8 = −2.33213E−09 A10 = 2.11566E−11

TABLE 35

Miscellaneous Data for Infinity In-Focus Situation
Zooming ratio 3.66231

| | Wide-angle limit | Middle position | Telephoto limit |
|---|---|---|---|
| Focal length | 46.3507 | 88.7065 | 169.7505 |
| F-number | 4.12034 | 4.94462 | 5.76892 |
| View angle | 13.4054 | 6.8694 | 3.5704 |
| Image height | 10.8150 | 10.8150 | 10.8150 |
| Overall length of lens system | 95.0000 | 117.7000 | 129.9800 |
| BF | 15.0500 | 15.0500 | 15.0500 |
| d5 | 1.1384 | 29.4894 | 48.0679 |
| d10 | 12.9709 | 7.3163 | 1.0233 |
| d19 | 3.5497 | 5.9572 | 2.6000 |
| d21 | 21.3847 | 16.1080 | 16.7834 |
| d23 | 1.5000 | 4.3692 | 7.0511 |

Zoom lens unit data

| Lens unit | Initial surface No. | Focal length |
|---|---|---|
| 1 | 1 | 90.44395 |
| 2 | 6 | −17.93884 |
| 3 | 11 | 19.17493 |
| 4 | 20 | −43.58416 |
| 5 | 22 | −23.09074 |
| 6 | 24 | 32.42766 |

TABLE 36

Miscellaneous Data for Close-Object In-Focus Situation
Zooming ratio 3.17496

| | Wide-angle limit | Middle position | Telephoto limit |
|---|---|---|---|
| Object distance | (Refer to d0) | | |
| Focal length | 45.4130 | 83.4079 | 144.1847 |
| F-number | 4.13322 | 4.96451 | 5.86478 |
| View angle | 13.3745 | 6.8476 | 3.5133 |
| Image height | 10.8150 | 10.8150 | 10.8150 |
| Overall length of lens system | 95.0000 | 117.7000 | 129.9800 |
| BF | 15.0500 | 15.0500 | 15.0500 |
| d0 | 1905.0000 | 1882.2080 | 1870.0000 |
| d5 | 1.1384 | 29.4894 | 48.0679 |
| d10 | 12.9709 | 7.3163 | 1.0233 |
| d19 | 3.8625 | 7.2133 | 6.7627 |
| d21 | 21.0719 | 14.8519 | 12.6207 |
| d23 | 1.5000 | 4.3692 | 7.0511 |

Zoom lens unit data

| Lens unit | Initial surface No. | Focal length |
|---|---|---|
| 1 | 1 | 90.44395 |
| 2 | 6 | −17.93884 |
| 3 | 11 | 19.17493 |
| 4 | 20 | −43.58416 |
| 5 | 22 | −23.09074 |
| 6 | 24 | 32.42766 |

Numerical Example 10

The zoom lens system of Numerical Example 10 corresponds to Embodiment 10 shown in FIG. 37. Table 37 shows the surface data of the zoom lens system of Numerical Example 10. Table 38 shows the aspherical data. Table 39 shows various data in an infinity in-focus situation. Table 40 shows various data in a close-object in-focus situation.

TABLE 37

Surface Data

| Surface number | r | d | nd | vd |
|---|---|---|---|---|
| Object surface | ∞ | | | |
| 1 | 73.55090 | 3.97550 | 1.48749 | 70.4 |
| 2 | −519.19100 | 0.15000 | | |
| 3 | 51.78200 | 1.00000 | 1.85026 | 32.3 |
| 4 | 34.95990 | 5.00000 | 1.49700 | 81.6 |
| 5 | 174.29560 | Variable | | |
| 6 | 816.57660 | 0.80000 | 1.80610 | 33.3 |
| 7 | 12.37060 | 2.04680 | 1.94595 | 18.0 |
| 8 | 23.67550 | 1.37280 | | |
| 9 | −29.71280 | 0.70000 | 1.80420 | 46.5 |
| 10 | 963.81270 | Variable | | |
| 11* | 17.05830 | 3.89490 | 1.73077 | 40.5 |
| 12* | 250.11860 | 1.55450 | | |
| 13(Diaphragm) | ∞ | 1.50000 | | |
| 14 | 32.08500 | 0.80000 | 1.90366 | 31.3 |
| 15 | 11.54610 | 3.95640 | 1.48749 | 70.4 |
| 16 | 50.38700 | 1.60000 | | |
| 17* | 20.60140 | 5.00000 | 1.58913 | 61.3 |
| 18 | −19.62060 | 0.70000 | 1.76182 | 26.6 |
| 19 | −30.18350 | Variable | | |
| 20 | 34.78860 | 0.70000 | 1.77250 | 49.6 |
| 21 | 15.56360 | Variable | | |
| 22 | −19.90730 | 0.80000 | 1.80420 | 46.5 |
| 23 | 549.02790 | Variable | | |
| 24 | 48.02910 | 3.68630 | 1.84666 | 23.8 |
| 25 | −65.01830 | (BF) | | |
| Image surface | ∞ | | | |

TABLE 38

Aspherical Data

Surface No. 11

K = 0.00000E+00, A4 = −2.49807E−05, A6 = −1.54639E−08,
A8 = −2.07445E−09 A10 = −1.62546E−11
Surface No. 12

K = 0.00000E+00, A4 = −4.11674E−06, A6 = 1.04608E−07,
A8 = −4.69379E−09 A10 = 1.31157E−12
Surface No. 17

K = 0.00000E+00, A4 = −3.28399E−05, A6 = 1.13610E−07,
A8 = −2.10255E−09 A10 = 1.70015E−11

TABLE 39

Miscellaneous Data for Infinity In-Focus Situation
Zooming ratio 3.66232

| | Wide-angle limit | Middle position | Telephoto limit |
|---|---|---|---|
| Focal length | 46.3509 | 88.7064 | 169.7519 |
| F-number | 4.12014 | 4.94470 | 5.76836 |
| View angle | 13.3999 | 6.8694 | 3.5684 |
| Image height | 10.8150 | 10.8150 | 10.8150 |
| Overall length of lens system | 93.0000 | 115.2400 | 127.9800 |
| BF | 15.0500 | 15.0500 | 15.0500 |
| d5 | 1.0928 | 29.1050 | 47.7157 |
| d10 | 12.7265 | 6.9507 | 1.0874 |
| d19 | 4.4470 | 6.6552 | 2.6000 |
| d21 | 18.1701 | 12.7473 | 14.2289 |
| d23 | 2.2750 | 5.4897 | 8.0635 |

TABLE 39-continued

Miscellaneous Data for Infinity In-Focus Situation
Zooming ratio 3.66232

Zoom lens unit data

| Lens unit | Initial surface No. | Focal length |
|---|---|---|
| 1 | 1 | 88.91637 |
| 2 | 6 | −17.94743 |
| 3 | 11 | 18.68736 |
| 4 | 20 | −37.04496 |
| 5 | 22 | −23.87305 |
| 6 | 24 | 33.12154 |

TABLE 40

Miscellaneous Data for Close-Object In-Focus Situation
Zooming ratio 3.18737

| | Wide-angle limit | Middle position | Telephoto limit |
|---|---|---|---|
| Object distance | (Refer to d0) | | |
| Focal length | 45.3973 | 83.4308 | 144.6978 |
| F-number | 4.13207 | 4.97196 | 5.84771 |
| View angle | 13.3744 | 6.8366 | 3.5212 |
| Image height | 10.8150 | 10.8150 | 10.8150 |
| Overall length of lens system | 93.0000 | 115.2400 | 127.9800 |
| BF | 15.0500 | 15.0500 | 15.0500 |
| d0 | 1907.0000 | 1884.6820 | 1872.0000 |
| d5 | 1.0928 | 29.1050 | 47.7157 |
| d10 | 12.7265 | 6.9507 | 1.0874 |
| d19 | 4.6031 | 7.4907 | 6.2864 |
| d21 | 18.3851 | 12.6212 | 10.4453 |
| d23 | 1.9039 | 4.7803 | 8.1607 |

Zoom lens unit data

| Lens unit | Initial surface No. | Focal length |
|---|---|---|
| 1 | 1 | 88.91637 |
| 2 | 6 | −17.94743 |
| 3 | 11 | 18.68736 |
| 4 | 20 | −37.04496 |
| 5 | 22 | −23.87305 |
| 6 | 24 | 33.12154 |

Numerical Example 11

The zoom lens system of Numerical Example 11 corresponds to Embodiment 11 shown in FIG. 41. Table 41 shows the surface data of the zoom lens system of Numerical Example 11. Table 42 shows the aspherical data. Table 43 shows various data in an infinity in-focus situation. Table 44 shows various data in a close-object in-focus situation.

TABLE 41

Surface Data

| Surface number | r | d | nd | vd |
|---|---|---|---|---|
| Object surface | ∞ | | | |
| 1 | 53.22400 | 4.16250 | 1.48749 | 70.4 |
| 2 | −320.57030 | 0.15000 | | |
| 3 | 36.80240 | 1.00000 | 1.85026 | 32.3 |
| 4 | 24.59630 | 5.00000 | 1.49700 | 81.6 |
| 5 | 113.64850 | Variable | | |
| 6 | 204.97890 | 0.80000 | 1.80610 | 33.3 |
| 7 | 13.08190 | 2.53080 | 1.94595 | 18.0 |

TABLE 41-continued

Surface Data

| Surface number | r | d | nd | vd |
|---|---|---|---|---|
| 8 | 24.36720 | 1.80680 | | |
| 9 | −39.56750 | 0.70000 | 1.80420 | 46.5 |
| 10 | 91.04870 | Variable | | |
| 11* | 17.81470 | 4.83760 | 1.73077 | 40.5 |
| 12* | −238.69340 | 1.57350 | | |
| 13(Diaphragm) | ∞ | 1.50000 | | |
| 14 | 53.37190 | 0.80000 | 1.90366 | 31.3 |
| 15 | 12.36540 | 3.67590 | 1.48749 | 70.4 |
| 16 | 39.64830 | 1.60000 | | |
| 17* | 21.99770 | 4.87600 | 1.58913 | 61.3 |
| 18 | −21.46140 | 0.70000 | 1.76182 | 26.6 |
| 19 | −34.45760 | Variable | | |
| 20 | 38.45340 | 0.70000 | 1.77250 | 49.6 |
| 21 | 15.26480 | Variable | | |
| 22 | −24.20690 | 0.80000 | 1.80420 | 46.5 |
| 23 | 137.20310 | Variable | | |
| 24 | 54.81890 | 4.02660 | 1.84666 | 23.8 |
| 25 | −50.73940 | (BF) | | |
| Image surface | ∞ | | | |

TABLE 42

Aspherical Data

Surface No. 11

K = 0.00000E+00, A4 = −1.65606E−05, A6 = 2.96094E−09,
A8 = −5.51539E−10 A10 = −1.23508E−11

Surface No. 12

K = 0.00000E+00, A4 = 3.95684E−06, A6 = 1.17275E−07,
A8 = −3.10820E−09 A10 = 3.06075E−12

Surface No. 17

K = 0.00000E+00, A4 = −2.21444E−05, A6 = 1.36060E−07,
A8 = −4.73887E−09 A10 = 4.21207E−11

TABLE 43

Miscellaneous Data for Infinity In-Focus Situation
Zooming ratio 3.66239

| | Wide-angle limit | Middle position | Telephoto limit |
|---|---|---|---|
| Focal length | 46.3497 | 88.7127 | 169.7506 |
| F-number | 4.12039 | 4.94435 | 5.76880 |
| View angle | 13.2846 | 6.8431 | 3.5702 |
| Image height | 10.8150 | 10.8150 | 10.8150 |
| Overall length of lens system | 111.9997 | 112.0000 | 112.0008 |
| BF | 15.05095 | 15.05119 | 15.05183 |
| d5 | 1.3140 | 15.0273 | 27.2023 |
| d10 | 26.9275 | 13.2142 | 1.0393 |
| d19 | 2.8399 | 6.5131 | 2.6000 |
| d21 | 22.5378 | 15.8042 | 16.1489 |
| d23 | 2.0899 | 5.1503 | 8.7188 |

Zoom lens unit data

| Lens unit | Initial surface No. | Focal length |
|---|---|---|
| 1 | 1 | 64.48054 |
| 2 | 6 | −18.74448 |
| 3 | 11 | 21.34606 |
| 4 | 20 | −33.20507 |
| 5 | 22 | −25.52997 |
| 6 | 24 | 31.67634 |

TABLE 44

Miscellaneous Data for Close-Object In-Focus Situation
Zooming ratio 3.30297

| | Wide-angle limit | Middle position | Telephoto limit |
|---|---|---|---|
| Object distance | 1888.0000 | 1888.0000 | 1888.0000 |
| Focal length | 45.5299 | 84.0507 | 150.3837 |
| F-number | 4.13224 | 4.97947 | 5.88344 |
| View angle | 13.2577 | 6.7952 | 3.4950 |
| Image height | 10.8150 | 10.8150 | 10.8150 |
| Overall length of lens system | 111.9998 | 112.0000 | 112.0009 |
| BF | 15.05098 | 15.05124 | 15.05192 |
| d5 | 1.3140 | 15.0273 | 27.2023 |
| d10 | 26.9275 | 13.2142 | 1.0393 |
| d19 | 2.9980 | 7.1711 | 5.7787 |
| d21 | 22.6614 | 16.0959 | 12.8691 |
| d23 | 1.8082 | 4.2006 | 8.8199 |

Zoom lens unit data

| Lens unit | Initial surface No. | Focal length |
|---|---|---|
| 1 | 1 | 64.48054 |
| 2 | 6 | −18.74448 |
| 3 | 11 | 21.34606 |
| 4 | 20 | −33.20507 |
| 5 | 22 | −25.52997 |
| 6 | 24 | 31.67634 |

Numerical Example 12

The zoom lens system of Numerical Example 12 corresponds to Embodiment 12 shown in FIG. 45. Table 45 shows the surface data of the zoom lens system of Numerical Example 12. Table 46 shows the aspherical data. Table 47 shows various data in an infinity in-focus situation. Table 48 shows various data in a close-object in-focus situation.

TABLE 45

Surface Data

| Surface number | r | d | nd | vd |
|---|---|---|---|---|
| Object surface | ∞ | | | |
| 1 | 68.13630 | 4.57470 | 1.48749 | 70.4 |
| 2 | −287.82300 | 0.15000 | | |
| 3 | 42.46430 | 1.00000 | 1.85026 | 32.3 |
| 4 | 29.17410 | 5.00000 | 1.49700 | 81.6 |
| 5 | 89.61290 | Variable | | |
| 6 | −1358.64940 | 0.80000 | 1.80610 | 33.3 |
| 7 | 12.92410 | 2.28270 | 1.94595 | 18.0 |
| 8 | 26.68500 | 1.44680 | | |
| 9 | −33.80940 | 0.70000 | 1.80420 | 46.5 |
| 10 | 144.85140 | Variable | | |
| 11* | 17.63990 | 3.90210 | 1.73077 | 40.5 |
| 12* | 1055.63200 | 1.50010 | | |
| 13(Diaphragm) | ∞ | 1.50010 | | |
| 14 | 32.03230 | 0.80000 | 1.90366 | 31.3 |
| 15 | 11.60110 | 3.16080 | 1.48749 | 70.4 |
| 16 | 27.48780 | 1.60000 | | |
| 17* | 19.65080 | 4.97940 | 1.58913 | 61.3 |
| 18 | −18.46760 | 0.70000 | 1.76182 | 26.6 |
| 19 | −29.13130 | Variable | | |
| 20 | 41.28870 | 0.70000 | 1.77250 | 49.6 |
| 21 | 17.08140 | Variable | | |
| 22 | −23.67450 | 0.80000 | 1.80420 | 46.5 |
| 23 | 220.82260 | Variable | | |
| 24 | 46.80170 | 3.56010 | 1.84666 | 23.8 |
| 25 | −70.73770 | (BF) | | |
| Image surface | ∞ | | | |

TABLE 46

Aspherical Data

Surface No. 11

K = 0.00000E+00, A4 = −2.47062E−05, A6 = −1.82890E−07,
A8 = −7.93195E−10 A10 = −4.57440E−11

Surface No. 12

K = 0.00000E+00, A4 = −8.64100E−06, A6 = −5.26895E−08,
A8 = −5.12720E−09 A10 = −8.04740E−12

Surface No. 17

K = 0.00000E+00, A4 = −3.42952E−05, A6 = 1.68516E−07,
A8 = −5.58098E−09 A10 = 5.72770E−11

TABLE 47

Miscellaneous Data for Infinity In-Focus Situation
Zooming ratio 4.12018

|  | Wide-angle limit | Middle position | Telephoto limit |
|---|---|---|---|
| Focal length | 41.1995 | 83.6382 | 169.7496 |
| F-number | 4.12009 | 4.94430 | 5.76824 |
| View angle | 15.1834 | 7.2972 | 3.5699 |
| Image height | 10.8150 | 10.8150 | 10.8150 |
| Overall length of lens system | 101.0000 | 116.2500 | 125.1200 |
| BF | 15.0500 | 15.0500 | 15.0500 |
| d5 | 1.2958 | 25.8980 | 43.5626 |
| d10 | 19.3261 | 9.9706 | 1.1802 |
| d19 | 2.6000 | 6.3885 | 3.5538 |
| d21 | 22.0703 | 15.6398 | 15.7366 |
| d23 | 1.5000 | 4.1420 | 6.8799 |

Zoom lens unit data

| Lens unit | Initial surface No. | Focal length |
|---|---|---|
| 1 | 1 | 85.43751 |
| 2 | 6 | −18.19673 |
| 3 | 11 | 19.56387 |
| 4 | 20 | −38.19599 |
| 5 | 22 | −26.54934 |
| 6 | 24 | 33.73583 |

TABLE 48

Miscellaneous Data for Close-Object In-Focus Situation
Zooming ratio 3.53919

|  | Wide-angle limit | Middle position | Telephoto limit |
|---|---|---|---|
| Object distance | (Refer to d0) | | |
| Focal length | 40.5838 | 79.2144 | 143.6337 |
| F-number | 4.13158 | 4.96580 | 5.87523 |
| View angle | 15.1483 | 7.2708 | 3.5029 |
| Image height | 10.8150 | 10.8150 | 10.8150 |
| Overall length of lens system | 101.0000 | 116.2500 | 125.1200 |
| BF | 15.0500 | 15.0500 | 15.0500 |
| d0 | 1899.0000 | 1884.8290 | 1876.0890 |
| d5 | 1.2958 | 25.8980 | 43.5626 |
| d10 | 19.3261 | 9.9706 | 1.1802 |
| d19 | 2.8223 | 7.4428 | 7.5937 |
| d21 | 21.8480 | 14.5855 | 11.6967 |
| d23 | 1.5000 | 4.1420 | 6.8799 |

TABLE 48-continued

Miscellaneous Data for Close-Object In-Focus Situation
Zooming ratio 3.53919

Zoom lens unit data

| Lens unit | Initial surface No. | Focal length |
|---|---|---|
| 1 | 1 | 85.43751 |
| 2 | 6 | −18.19673 |
| 3 | 11 | 19.56387 |
| 4 | 20 | −38.19599 |
| 5 | 22 | −26.54934 |
| 6 | 24 | 33.73583 |

Numerical Example 13

The zoom lens system of Numerical Example 13 corresponds to Embodiment 13 shown in FIG. 49. Table 49 shows the surface data of the zoom lens system of Numerical Example 13. Table 50 shows the aspherical data. Table 51 shows various data in an infinity in-focus situation. Table 52 shows various data in a close-object in-focus situation.

TABLE 49

Surface Data

| Surface number | r | d | nd | vd |
|---|---|---|---|---|
| Object surface | ∞ | | | |
| 1 | 73.39910 | 4.57040 | 1.48749 | 70.4 |
| 2 | −343.02620 | 0.15000 | | |
| 3 | 45.90940 | 1.00000 | 1.85026 | 32.3 |
| 4 | 31.95790 | 5.00000 | 1.49700 | 81.6 |
| 5 | 90.30990 | Variable | | |
| 6 | −323.98930 | 0.80000 | 1.80610 | 33.3 |
| 7 | 13.50200 | 2.16060 | 1.94595 | 18.0 |
| 8 | 29.03300 | 1.30570 | | |
| 9 | −34.75380 | 0.70000 | 1.80420 | 46.5 |
| 10 | 154.06040 | Variable | | |
| 11* | 17.44480 | 3.81920 | 1.73077 | 40.5 |
| 12* | 1224.22570 | 1.50390 | | |
| 13(Diaphragm) | ∞ | 1.50000 | | |
| 14 | 30.58700 | 0.80000 | 1.90366 | 31.3 |
| 15 | 11.47500 | 3.13280 | 1.48749 | 70.4 |
| 16 | 28.25960 | 1.60000 | | |
| 17* | 19.27140 | 5.00000 | 1.58913 | 61.3 |
| 18 | −17.26330 | 0.70000 | 1.76182 | 26.6 |
| 19 | −28.13610 | Variable | | |
| 20 | 41.75760 | 0.70000 | 1.77250 | 49.6 |
| 21 | 16.83560 | Variable | | |
| 22 | −21.36380 | 0.80000 | 1.80420 | 46.5 |
| 23 | 288.20000 | Variable | | |
| 24 | 49.60960 | 3.58260 | 1.84666 | 23.8 |
| 25 | −58.18670 | (BF) | | |
| Image surface | ∞ | | | |

TABLE 50

Aspherical Data

Surface No. 11

K = 0.00000E+00, A4 = −2.48157E−05, A6 = −1.02135E−07,
A8 = −5.32997E−10 A10 = −3.87104E−11

Surface No. 12

K = 0.00000E+00, A4 = −7.26971E−06, A6 = 5.27317E−08,
A8 = −4.12658E−09 A10 = −1.24227E−11

Surface No. 17

K = 0.00000E+00, A4 = −3.67976E−05, A6 = 1.80968E−07,
A8 = −4.33876E−09 A10 = 3.84812E−11

TABLE 51

Miscellaneous Data for Infinity In-Focus Situation
Zooming ratio 4.12014

|  | Wide-angle limit | Middle position | Telephoto limit |
|---|---|---|---|
| Focal length | 41.1998 | 83.6404 | 169.7486 |
| F-number | 4.12016 | 4.94423 | 5.76810 |
| View angle | 15.1884 | 7.2982 | 3.5686 |
| Image height | 10.8150 | 10.8150 | 10.8150 |
| Overall length of lens system | 97.0000 | 116.7500 | 130.6700 |
| BF | 15.0500 | 15.0500 | 15.0500 |
| d5 | 1.3146 | 30.0116 | 51.0493 |
| d10 | 17.2763 | 8.3320 | 1.2079 |
| d19 | 2.6000 | 6.7471 | 2.9660 |
| d21 | 20.4361 | 13.5354 | 16.0296 |
| d23 | 1.4965 | 4.2501 | 5.5374 |

Zoom lens unit data

| Lens unit | Initial surface No. | Focal length |
|---|---|---|
| 1 | 1 | 95.48041 |
| 2 | 6 | −18.65749 |
| 3 | 11 | 18.90208 |
| 4 | 20 | −36.96850 |
| 5 | 22 | −24.70350 |
| 6 | 24 | 32.11761 |

TABLE 52

Miscellaneous Data for Close-Object In-Focus Situation
Zooming ratio 3.50328

|  | Wide-angle limit | Middle position | Telephoto limit |
|---|---|---|---|
| Object distance | (Refer to d0) | | |
| Focal length | 40.5606 | 78.9858 | 142.0950 |
| F-number | 4.13171 | 4.97564 | 5.86339 |
| View angle | 15.1543 | 7.2572 | 3.5103 |
| Image height | 10.8150 | 10.8150 | 10.8150 |
| Overall length of lens system | 97.0000 | 116.7500 | 130.6700 |
| BF | 15.0500 | 15.0500 | 15.0500 |
| d0 | 1902.9999 | 1884.2306 | 1870.9173 |
| d5 | 1.3146 | 30.0116 | 51.0493 |
| d10 | 17.2763 | 8.3320 | 1.2079 |
| d19 | 2.8204 | 7.4384 | 7.0803 |
| d21 | 20.2140 | 13.7922 | 11.3760 |
| d23 | 1.4982 | 3.3020 | 6.0767 |

Zoom lens unit data

| Lens unit | Initial surface No. | Focal length |
|---|---|---|
| 1 | 1 | 95.48041 |
| 2 | 6 | −18.65749 |
| 3 | 11 | 18.90208 |
| 4 | 20 | −36.96850 |
| 5 | 22 | −24.70350 |
| 6 | 24 | 32.11761 |

Numerical Example 14

The zoom lens system of Numerical Example 14 corresponds to Embodiment 14 shown in FIG. 53. Table 53 shows the surface data of the zoom lens system of Numerical Example 14. Table 54 shows the aspherical data. Table 55 shows various data in an infinity in-focus situation. Table 56 shows various data in a close-object in-focus situation.

TABLE 53

Surface Data

| Surface number | r | d | nd | vd |
|---|---|---|---|---|
| Object surface | ∞ | | | |
| 1 | 51.87680 | 4.17760 | 1.48749 | 70.4 |
| 2 | −422.86220 | 0.15000 | | |
| 3 | 38.00090 | 1.00000 | 1.85026 | 32.3 |
| 4 | 25.08890 | 5.00000 | 1.49700 | 81.6 |
| 5 | 126.32780 | Variable | | |
| 6 | −2293.68640 | 0.80000 | 1.80610 | 33.3 |
| 7 | 13.03900 | 2.76310 | 1.94595 | 18.0 |
| 8 | 25.84970 | 1.80540 | | |
| 9 | −43.06320 | 0.70000 | 1.80420 | 46.5 |
| 10 | 84.69080 | Variable | | |
| 11* | 17.54430 | 4.52410 | 1.73077 | 40.5 |
| 12* | −347.11340 | 1.50000 | | |
| 13(Diaphragm) | ∞ | 1.62980 | | |
| 14 | 46.30400 | 0.80000 | 1.90366 | 31.3 |
| 15 | 11.98860 | 3.39620 | 1.48749 | 70.4 |
| 16 | 33.98540 | 1.60000 | | |
| 17* | 21.19040 | 4.76390 | 1.58913 | 61.3 |
| 18 | −20.11880 | 0.70000 | 1.76182 | 26.6 |
| 19 | −32.37970 | Variable | | |
| 20 | 42.11800 | 0.70000 | 1.77250 | 49.6 |
| 21 | 15.50870 | Variable | | |
| 22 | −23.95480 | 0.80000 | 1.80420 | 46.5 |
| 23 | 178.37690 | Variable | | |
| 24 | 51.06130 | 3.90750 | 1.84666 | 23.8 |
| 25 | −54.66060 | (BF) | | |
| Image surface | ∞ | | | |

TABLE 54

Aspherical Data

Surface No. 11

K = 0.00000E+00, A4 = −1.58387E−05, A6 = −1.27993E−08,
A8 = −6.83720E−10 A10 = −1.84605E−11

Surface No. 12

K = 0.00000E+00, A4 = 4.68855E−06, A6 = 1.25389E−07,
A8 = −4.23695E−09 A10 = 4.87895E−12

Surface No. 17

K = 0.00000E+00, A4 = −2.55071E−05, A6 = 2.36069E−07,
A8 = −8.19717E−09 A10 = 7.67427E−11

TABLE 55

Miscellaneous Data for Infinity In-Focus Situation
Zooming ratio 4.12015

|  | Wide-angle limit | Middle position | Telephoto limit |
|---|---|---|---|
| Focal length | 41.1996 | 83.6431 | 169.7483 |
| F-number | 4.12035 | 4.94449 | 5.76811 |
| View angle | 15.0682 | 7.2735 | 3.5690 |
| Image height | 10.8150 | 10.8150 | 10.8150 |
| Overall length of lens system | 112.0000 | 112.0000 | 112.0000 |
| BF | 15.0500 | 15.0500 | 15.0500 |
| d5 | 1.3078 | 16.2745 | 29.1281 |
| d10 | 28.9446 | 13.9779 | 1.1244 |
| d19 | 2.6426 | 6.7391 | 2.6000 |
| d21 | 21.7986 | 14.5219 | 15.6274 |
| d23 | 1.5374 | 4.7177 | 7.7514 |

Zoom lens unit data

| Lens unit | Initial surface No. | Focal length |
|---|---|---|
| 1 | 1 | 65.27752 |
| 2 | 6 | −18.20925 |
| 3 | 11 | 20.94404 |
| 4 | 20 | −32.14542 |
| 5 | 22 | −26.21432 |
| 6 | 24 | 31.71852 |

TABLE 56

Miscellaneous Data for Close-Object In-Focus Situation
Zooming ratio 3.64479

|  | Wide-angle limit | Middle position | Telephoto limit |
|---|---|---|---|
| Object distance | 1888.0000 | 1888.0000 | 1888.0000 |
| Focal length | 40.6100 | 79.4900 | 148.0150 |
| F-number | 4.13121 | 4.97955 | 5.87928 |
| View angle | 15.0359 | 7.2248 | 3.4963 |
| Image height | 10.8150 | 10.8150 | 10.8150 |
| Overall length of lens system | 112.0000 | 112.0000 | 112.0000 |
| BF | 15.0500 | 15.0500 | 15.0500 |
| d5 | 1.3078 | 16.2745 | 29.1281 |
| d10 | 28.9446 | 13.9779 | 1.1244 |
| d19 | 2.8209 | 7.3201 | 5.9794 |
| d21 | 21.6382 | 14.9367 | 11.8691 |
| d23 | 1.5195 | 3.7219 | 8.1304 |

Zoom lens unit data

| Lens unit | Initial surface No. | Focal length |
|---|---|---|
| 1 | 1 | 65.27752 |
| 2 | 6 | −18.20925 |
| 3 | 11 | 20.94404 |
| 4 | 20 | −32.14542 |
| 5 | 22 | −26.21432 |
| 6 | 24 | 31.71852 |

The following Table 57 shows values corresponding to the individual conditions in the zoom lens systems of each of the numerical examples.

TABLE 57

Condition-Corresponding Values

| Condition | Example 1 | 2 | 3 | 4 | 5 | 6 | 7 |
|---|---|---|---|---|---|---|---|
| (6) $(T_1 + T_2)/H$ | 1.662 | 1.752 | 1.488 | 1.516 | 1.813 | 1.698 | 1.355 |
| (1) $f_n/f_W$ | −1.170 | −1.211 | −0.727 | −0.823 | −1.029 | −0.980 | −1.295 |
| (2) $T_1/f_W$ | 0.540 | 0.614 | 0.222 | 0.250 | 0.675 | 0.573 | 0.464 |
| (3) $|f_1/f_W|$ | 3.582 | 3.817 | 1.386 | 1.589 | 3.746 | 3.345 | 3.276 |
| (4) $|f_2/f_W|$ | 0.737 | 0.758 | 0.403 | 0.446 | 0.844 | 0.800 | 0.670 |
| (5) $(T_1 + T_2)/f_W$ | 1.026 | 1.150 | 0.347 | 0.398 | 1.360 | 1.188 | 1.016 |

| Condition | Example 8 | 9 | 10 | 11 | 12 | 13 | 14 |
|---|---|---|---|---|---|---|---|
| (6) $(T_1 + T_2)/H$ | 1.305 | 1.403 | 1.391 | 1.493 | 1.475 | 0.988 | 1.054 |
| (1) $f_n/f_W$ | −1.159 | −0.940 | −0.799 | −0.716 | −0.927 | −0.897 | −0.780 |
| (2) $T_1/f_W$ | 0.418 | 0.219 | 0.218 | 0.222 | 0.260 | 0.139 | 0.129 |
| (3) $|f_1/f_W|$ | 2.896 | 1.951 | 1.918 | 1.391 | 2.074 | 2.317 | 1.584 |
| (4) $|f_2/f_W|$ | 0.636 | 0.387 | 0.387 | 0.404 | 0.442 | 0.453 | 0.442 |
| (5) $(T_1 + T_2)/f_W$ | 0.914 | 0.327 | 0.325 | 0.348 | 0.387 | 0.259 | 0.277 |

The zoom lens system according to the present invention is applicable to digital still cameras, digital video cameras, cameras for mobile telephones, cameras for PDAs (personal digital assistants), surveillance cameras in surveillance systems, Web cameras, vehicle-mounted cameras or the like. In particular, the zoom lens system according to the present invention is suitable for photographing optical systems where high image quality is required, such as in digital still camera systems or digital video camera systems.

Also, the zoom lens system according to the present invention is applicable to, among the interchangeable lens apparatuses according to the present invention, an interchangeable lens apparatus having motorized zoom function, i.e., activating function for the zoom lens system by a motor, with which a digital video camera system is provided.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system of lens units each constituted by at least one lens element and arranged along the lens system's optical axis to define an object side of the lens system on one end thereof, and an image side on an opposite end of the lens system from the object-side end thereof, the zoom lens system comprising, in object-side-to-image-side order:
   a first lens unit, the first lens unit having positive optical power;
   a second lens unit;
   an aperture diaphragm;
   one or more additional lens units, a first of said one or more additional lens units being a first focusing-lens unit, the first focusing-lens unit having negative optical power and moving along the optical axis in the zoom lens system focusing from an infinity in-focus condition to a close-object in-focus condition;
   an image blur compensating lens unit provided adjacent the first focusing-lens unit, the image blur compensating lens unit movable in a direction perpendicular to the optical axis in order to optically compensate image blur; wherein
   the following condition (6) is satisfied:

$$0.1 < (T_1 + T_2)/H < 2.0 \tag{6}$$

where
   $T_1$ is an axial thickness of the first lens unit,
   $T_2$ is an axial thickness of the second lens unit, and
   H is the height of an image the zoom lens system forms on an image surface on the image-side end of the zoom lens system.

2. The zoom lens system as claimed in claim 1, wherein the image blur compensating lens unit has positive optical power.

3. The zoom lens system as claimed in claim 1, wherein said additional lens units include a fixed lens unit positioned nearest the image-side end of the zoom lens system, and being stationary relative to the image surface of the zoom lens system in the system zooming from a wide-angle limit to a telephoto limit at the time of image taking.

4. The zoom lens system as claimed in claim 1, wherein a lens unit having positive optical power is provided on each of the object side and the image side of the first focusing-lens unit.

5. The zoom lens system as claimed in claim 1, wherein the image blur compensating lens unit is fixed relative to an image surface, in zooming from a wide-angle limit to a telephoto limit at the time of image taking.

6. The zoom lens system as claimed in claim 1, wherein the first lens unit moves toward the object-side end of the zoom lens system in the system zooming from a wide-angle limit to a telephoto limit at the time of image taking.

7. The zoom lens system as claimed in claim 1, wherein a lens unit having the aperture diaphragm is fixed relative to an image surface, in zooming from a wide-angle limit to a telephoto limit at the time of image taking.

8. The zoom lens system as claimed in claim 1, wherein the following condition (3) is satisfied:

$$1.0 < |f_1/f_W| < 4.5 \tag{3}$$

where
$f_1$ is a composite focal length of the first lens unit, and
$f_W$ is a focal length of the entire system at a wide-angle limit.

9. The zoom lens system as claimed in claim 1, wherein the following condition (4) is satisfied:

$$0.2 < |f_2/f_W| < 1.0 \tag{4}$$

where
$f_2$ is a composite focal length of the second lens unit, and
$f_W$ is a focal length of the entire system at a wide-angle limit.

10. An interchangeable lens apparatus comprising:
the zoom lens system as claimed in claim 1; and
a lens mount section which is connectable to a camera body including an image sensor for receiving an optical image formed by the zoom lens system and converting the optical image into an electric image signal.

11. A camera system comprising:
an interchangeable lens apparatus including the zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

12. The zoom lens system as claimed in claim 1, wherein said additional lens units include a second focusing-lens unit, the second focusing-lens unit moving along the optical axis in the zoom lens system focusing from the infinity in-focus condition to the close-object in-focus condition.

13. The zoom lens system as claimed in claim 12, wherein two focusing lens units are arranged adjacent to each other, and the two focusing lens units are arranged between two lens units which are fixed relative to an image surface, in zooming from a wide-angle limit to a telephoto limit at the time of image taking.

14. The zoom lens system as claimed in claim 12, wherein the second focusing-lens unit has negative optical power.

\* \* \* \* \*